US009111244B2

(12) United States Patent
Tsuji et al.

(10) Patent No.: US 9,111,244 B2
(45) Date of Patent: Aug. 18, 2015

(54) ORGANIZATION EVALUATION APPARATUS AND ORGANIZATION EVALUATION SYSTEM

(75) Inventors: Satomi Tsuji, Kokubunji (JP); Nobuo Sato, Saitama (JP); Kazuo Yano, Hino (JP); Koji Ara, Higashiyamato (JP)

(73) Assignee: Hitachi, Ltd., Tokyo (JP)

( * ) Notice: Subject to any disclaimer, the term of this patent is extended or adjusted under 35 U.S.C. 154(b) by 808 days.

(21) Appl. No.: 12/764,554

(22) Filed: Apr. 21, 2010

(65) Prior Publication Data
US 2010/0274639 A1 Oct. 28, 2010

(30) Foreign Application Priority Data

Apr. 24, 2009 (JP) ................................. 2009-105819

(51) Int. Cl.
G06Q 10/00 (2012.01)
G06Q 10/06 (2012.01)
(52) U.S. Cl.
CPC .............. *G06Q 10/063* (2013.01); *G06Q 10/06* (2013.01); *G06Q 10/0639* (2013.01); *G06Q 10/067* (2013.01)
(58) Field of Classification Search
CPC ... G06Q 10/063; G06Q 10/067; G06Q 50/01; H04W 4/02; H04W 4/008; H04W 4/025; H04W 4/04; H04L 29/08675; H04L 67/22
See application file for complete search history.

(56) References Cited

U.S. PATENT DOCUMENTS

| 2005/0195747 | A1* | 9/2005 | Stamps et al. | 370/241 |
|---|---|---|---|---|
| 2008/0169919 | A1* | 7/2008 | Sato et al. | 340/524 |
| 2008/0208671 | A1* | 8/2008 | Ehrlich et al. | 705/9 |
| 2009/0228318 | A1 | 9/2009 | Ara et al. | |
| 2010/0145771 | A1* | 6/2010 | Fligler et al. | 705/10 |
| 2010/0325107 | A1* | 12/2010 | Kenton et al. | 707/723 |

FOREIGN PATENT DOCUMENTS

| JP | 2008-171343 A | 7/2008 |
|---|---|---|
| JP | 2008-257539 A | 10/2008 |
| JP | 2009-211574 A | 9/2009 |

OTHER PUBLICATIONS

Mathew Laibowitz et al., "A Sensor Network for Social Dynamics", 5th International Conference on Information Processing in Sensor Networks (IPSN), Apr. 19-21, 2006, pp. 483-491, Nashville, TN, USA.

(Continued)

*Primary Examiner* — William Brockington, III
(74) *Attorney, Agent, or Firm* — Crowell & Moring LLP

(57) ABSTRACT

Provided is an organization evaluation device, including: a reception unit for receiving data indicating a physical quantity detected by a sensor of a terminal worn by each of a plurality of persons; a personal index calculation module for calculating, from at least one of the data indicating the physical quantity and a business index of each of the plurality of persons, a personal index of each of the plurality of persons; a weight coefficient calculation module for calculating a weight coefficient indicating a degree of involvement of each of the plurality of persons in the first organization from the data indicating the physical quantity; and an organization index calculation module for calculating, by obtaining a weighted average of a plurality of the personal indices using the weight coefficient, an organization index of the first organization.

13 Claims, 42 Drawing Sheets

(56) References Cited

OTHER PUBLICATIONS

Joan Morris Dimicco et al., "Using Visualizations to Review a Group's Interaction Dynamics", Conference on Human Factors in Computing Systems (CHI), Apr. 22-27, 2006, Six (6) pages, Montreal, Quebec, Canada.

Peter A. Gloor et al., "Studying Microscopic Peer-to-Peer Communication Patterns", Americas Conference on Information Systems (AMOS), Aug. 2007, Twelve (12) pages.

Daniel Olguin Olguin et al., "Wearable Communicator Badge: Designing a New Platform for Revealing Organizational Dynamics", IEEE 10th International Symposium on Wearable Computers, Oct. 2006, Montreaux, Switzerland. Three (3) pages).

* cited by examiner

ANALYSIS CONDITION SETTING WINDOW (CLISWD)

ANALYZED PERIOD SETTING (CLISPT)

[2007] YEAR [2] MONTH [1] DAY ~
 PT01    PT02     PT03

[2007] YEAR [3] MONTH [31] DAY
 PT11    PT12     PT13

DISPLAY SIZE SETTING (CLISPS)

[1024] x [1280]
 PS01     PS02

ANALYZED ORGANIZATION SETTING (CLISPM)

- PM01 — ☑ ENTIRE A CORPORATION
- PM02 — ☑ A DEPARTMENT
- PM03 — ☑ A1 SECTION
- PM04 — ☑ A2 SECTION
- PM05 — ☑ B DEPARTMENT
- PM06 — ☑ C DEPARTMENT
- PM07 — ☑ C1 SECTION

ANALYSIS CONDITION SETTING (CLISPD)

ORGANIZATION INDEX SELECTION

- PD01 — ☐ DEGREE
- PD02 — ☑ COHESION
- PD03 — ☐ FLOW LEVEL
- PD04 — ☐ SALES
- PD05 — ☐ COMPREHENSIVE ORGANIZATION POWER (FLOW x COHESION)

WEIGHTING INDEX SELECTION

- PD11 — ☐ DEGREE
- PD12 — ☑ REACH
- PD13 — ☐ BETWEENNESS

DISPLAY FORMAT

- PD21 — ☑ LINE CHART
- PD22 — ☐ BAR CHART
- PD23 — ☐ HIERARCHICAL ORGANIZATION DIAGRAM

START ANALYSIS (CLISST)

*FIG. 7*

USER ID CORRESPONDENCE TABLE (ASUIT)

| USER NUMBER (ASUIT1) | USER NAME (ASUIT2) | TERMINAL ID (ASUIT3) | DEPARTMENT (ASUIT4) | SECTION (ASUIT5) |
|---|---|---|---|---|
| 0 | TANAKA | 1000 | A DEPARTMENT | - |
| 1 | KATO | 1001 | A DEPARTMENT | A1 SECTION |
| 2 | YAMAMOTO | 1002 | A DEPARTMENT | A1 SECTION |
| 3 | SUZUKI | 1003 | A DEPARTMENT | A2 SECTION |
| 4 | FUJIWARA | 1004 | A DEPARTMENT | A2 SECTION |
| 5 | MORI | 1005 | B DEPARTMENT | - |
| 6 | HARADA | 1006 | B DEPARTMENT | - |
| 7 | TAKEUCHI | 1007 | C DEPARTMENT | C1 SECTION |
| 8 | HASEGAWA | 1008 | C DEPARTMENT | C1 SECTION |

*FIG. 9*

ACCELERATION DATA TABLE
(SSDB_ACC_1002)

| TIME<br>(DBTM) | ACCELERATION x<br>(DBAX) | ACCELERATION y<br>(DBAY) | ACCELERATION z<br>(DBAZ) |
|---|---|---|---|
| 20070224-13:37:45.00 | 0.10379 | 0.85863 | -0.16040 |
| 20070224-13:37:45.02 | 0.21701 | 1.04734 | -0.65105 |
| 20070224-13:37:47.04 | -0.00944 | 1.00959 | -0.04718 |
| 20070224-13:37:47.06 | -0.00944 | 1.00959 | -0.04718 |

MEETING TABLE (SSDB_IR_1002)

| | TIME (DBTM) | INFRARED-SENDING-SIDE ID1 (DBR1) | NUMBER OF RECEPTIONS 1 (DBN1) | ... | INFRARED-SENDING-SIDE ID10 (DBR10) | NUMBER OF RECEPTIONS 10 (DBN10) |
|---|---|---|---|---|---|---|
| RE01 | 20070219-13:37:40.00 | 1000 | 3 | ... | null | null |
| RE02 | 20070219-13:37:50.00 | null | null | ... | null | null |
| RE03 | 20070219-13:38:00.00 | null | null | ... | null | null |
| RE04 | 20070219-13:38:10.00 | 1003 | 1 | ... | null | null |
| RE05 | 20070219-13:38:20.00 | 1003 | 3 | ... | null | null |
| RE06 | 20070219-13:38:30.00 | 1003 | 6 | ... | null | null |

*FIG. 11A*

MEETING TABLE (SSDB_IR_1003)

| | TIME (DBTM) | INFRARED-SENDING-SIDE ID1(DBR1) | NUMBER OF RECEPTIONS 1 (DBN1) | ... | INFRARED-SENDING-SIDE ID10 (DBR10) | NUMBER OF RECEPTIONS 10 (DBN10) |
|---|---|---|---|---|---|---|
| RE01 | 20070219-13:37:40.00 | null | null | ... | null | null |
| RE02 | 20070219-13:38:10.00 | null | null | ... | null | null |
| RE03 | 20070219-13:38:20.00 | 1002 | 2 | ... | null | null |
| RE04 | 20070219-13:38:30.00 | 1002 | 4 | ... | null | null |

*FIG. 11B*

MEETING MATRIX (ASMM)

| USER NUMBER | 0 | 1 | 2 | 3 | 4 | 5 | 6 | 7 | 8 |
|---|---|---|---|---|---|---|---|---|---|
| 0 | 0 | 670 | 120 | 380 | 40 | 0 | 0 | 420 | 250 |
| 1 | 670 | 0 | 300 | 90 | 650 | 250 | 0 | 130 | 70 |
| 2 | 120 | 300 | 0 | 50 | 300 | 0 | 0 | 10 | 190 |
| 3 | 380 | 90 | 50 | 0 | 110 | 30 | 20 | 20 | 50 |
| 4 | 40 | 650 | 300 | 110 | 0 | 730 | 0 | 30 | 70 |
| 5 | 0 | 250 | 0 | 30 | 730 | 0 | 0 | 0 | 890 |
| 6 | 0 | 0 | 0 | 20 | 0 | 0 | 0 | 0 | 310 |
| 7 | 420 | 130 | 10 | 20 | 30 | 0 | 0 | 0 | 0 |
| 8 | 250 | 70 | 190 | 50 | 70 | 890 | 310 | 0 | 0 |

ELEMENT( MM2_3 )

SYMMETRICAL ELEMENT( MM3_2 )

[UNIT: MINUTE]

*FIG. 12*

STAR TYPE ( COHESION : 1)

MESH TYPE ( COHESION : 5)

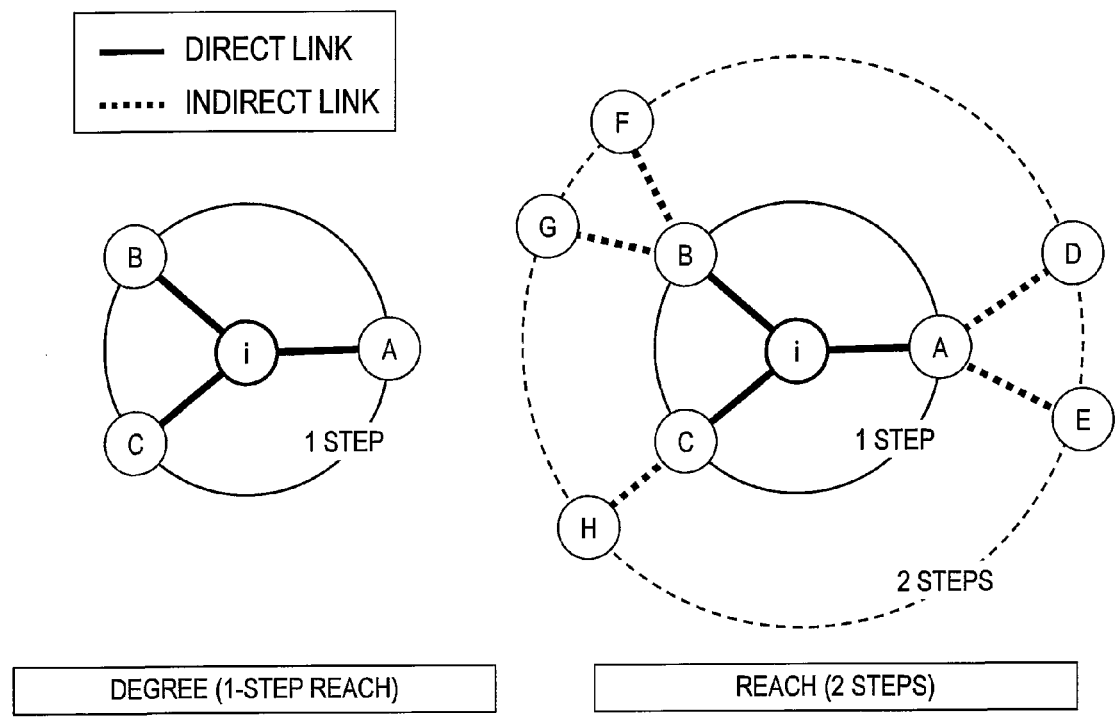
FIG. 15A
FIG. 15B
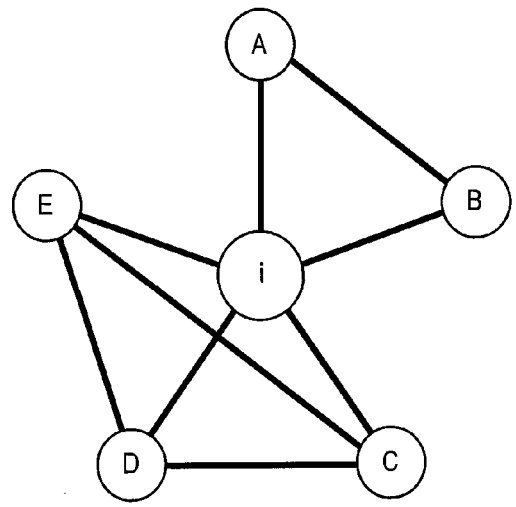
FIG. 15C

PERSONAL INDEX TABLE(ASPI)

| TERMINAL ID (PT01) | DEGREE (PT02) | REACH (PT03) | COHESION (PT04) | BETWEENNESS (PT05) | FLOW LEVEL (PT06) | SALES (PT07) |
|---|---|---|---|---|---|---|
| 1000 | 3 | 12 | 3.0 | 8.7 | 0.32 | 1.5 |
| 1001 | 5 | 10 | 4.8 | 3.1 | 0.41 | 0.2 |
| 1002 | 1 | 3 | 1.0 | 0.0 | 0.29 | 1.8 |
| 1003 | 7 | 9 | 3.5 | 2.7 | 0.49 | 0.9 |
| 1004 | 6 | 9 | 6.8 | 3.6 | 0.21 | 1.2 |
| 1005 | 4 | 8 | 4.6 | 4.4 | 0.38 | 2.6 |
| 1006 | 2 | 10 | 1.5 | 10.1 | 0.30 | 2.3 |
| 1007 | 1 | 6 | 1.0 | 0.0 | 0.51 | 1.7 |
| 1008 | 3 | 7 | 2.8 | 1.2 | 0.47 | 2.5 |

*FIG. 16*

ORGANIZATION INDEX TABLE(ASOI)

| ORGANIZATION ID (OT01) | DEGREE (OT02) | REACH (OT03) | COHESION (OT04) | BETWEENNESS (OT05) | FLOW LEVEL (OT06) | SALES (OT07) |
|---|---|---|---|---|---|---|
| A000 | 4.2 | 8.0 | 4.1 | 6.1 | 0.45 | 0.9 |
| A001 | 6.5 | 9.7 | 6.3 | 8.6 | 0.63 | 1.7 |
| A002 | 4.1 | 7.9 | 3.2 | 3.4 | 0.38 | 1.3 |
| A003 | 10.6 | 15.7 | 6.7 | 5.5 | 0.51 | 1.8 |
| A004 | 3.8 | 9.0 | 5.9 | 4.8 | 0.29 | 0.8 |
| A005 | 5.5 | 10.5 | 4.0 | 9.8 | 0.47 | 2.1 |
| A006 | 3.1 | 6.7 | 2.3 | 6.5 | 0.61 | 1.4 |
| A007 | 2.8 | 7.1 | 3.5 | 3.0 | 0.38 | 2.2 |
| A008 | 4.7 | 12.8 | 3.6 | 7.4 | 0.44 | 1.1 |

*FIG. 17*

ORGANIZATION EVALUATION APPARATUS AND ORGANIZATION EVALUATION SYSTEM

CLAIM OF PRIORITY

The present application claims priority from Japanese patent application JP2009-105819 filed on Apr. 24, 2009, the content of which is hereby incorporated by reference into this application.

BACKGROUND OF THE INVENTION

This invention relates to a technology for evaluating and analyzing an organization based on data on activities of a person wearing a sensor terminal.

Conventionally, a method of calculating an index of an organization using the variance of personal network indices (betweenness centrality and degree centrality) obtained from telephone calls and data on transmitted/received electronic mails (refer to JP 2008-257539 A, for example).

SUMMARY OF THE INVENTION

Various viewpoints exist for a standard of value of what is a good organization, and indices for evaluating an organization have greatly developed in the field of economy. For example, a profit organization is evaluated according to management indices converted in terms of money such as the stock price, the profit ratio, and the total asset. On the other hand, an organization is a group of persons, and thus, a manager pays attention to day-to-day processes such as communication, overtime hours, and motivation of subordinates, in addition to the resulting management indices. Therefore, it is necessary to encourage proper management according to organization evaluation indices based on daily activities of staff members.

However, indices focusing on individuals are basically calculated per person. For example, conversation hours, overtime hours, a level of motivation, and the like are expressed as numbers for each person. Then, by unifying the personal indices of the members of the organization into a single value, an organization evaluation index is obtained.

JP 2008-257539 A relates to a communication analysis in an organization, and, for detecting communication of subject persons in the organization, the variance of the personal indices of the subject persons are considered as an organization index. Further, for analyzing the communication, events such as meetings obtained by location information of the subject persons, electronic mails, and accesses to document file systems are used.

The inventors have involved in research on analyzing communications within the organization by directly sensing face-to-face communication of subject persons belonging to an organization. In this process, the inventors have found that a boundary of the organization has a large influence on calculation of the organization evaluation index.

In other words, the organization evaluation index is generally obtained for each division. The meetings, electronic mails, and document file systems to be analyzed according to JP 2008-257539 A are often systematized based on the division, and it is considered that the boundary of the organization infrequently pauses a problem. Conversely, when the face-to-face communication is directly sensed, the organization evaluation indices largely depend on what tasks are actually done in the organization, and it is often improper to calculate the organization evaluation index for each division. For example, when a subject person who also works for other organizations, a subject person who is usually out of the office, and a subject person who almost exclusively works with external organizations are included to obtain the organization evaluation index of an organization just because their divisions are the same, the organization evaluation index may have a value different from actual communication states of the organization initially intended to be evaluated due to the involvement of values from these subject persons.

In order to avoid this problem, a possible method is, instead of considering the division as a domain for obtaining the organization evaluation index, to use external information obtained by hearing and the like, to thereby make determination so as to relate to the actual state. However, this method poses a problem that the organization evaluation indices vary depending on the determination of analyzing persons.

For example, FIG. 18A to 18C illustrates an organization in which four persons (User 1000 to User 1003) are present, and a "flow level" indicating a degree of involvement of each subject person is considered as a personal index (flow level is described in detail in the embodiments). In this organization, while three persons Users 1000 to 1002 communicate with each other, User 1003 is linked to only one person.

When the variance of the personal indices is used as the organization evaluation index, and, based on the division, Users 1000 to 1003 are considered as subject persons belonging to the organization, the organization evaluation index of this organization is obtained as 1519. On the other hand, when an analyzing person does not consider User 1003 as a subject person, and defines Users 1000 to 1002 as members of the organization, the organization evaluation index of this organization is obtained as 0. In this way, when, based on the face-to-face communication, the evaluation index of the communication within the organization is obtained, depending on whether a subject person positioned on a border of the face-to-face communication network of the organization is counted in the organization or not, the organization evaluation index largely varies.

It should be noted that the same applies to an arithmetic average of the personal indices obtained as the organization index. In the example illustrated in FIG. 18A, when Users 1000 to 1003 are considered as subject persons belonging to the organization, the organization index of this organization is 77.5, and when Users 1000 to 1002 are defined as members of the organization, the organization index of this organization is 100.

This invention does not take the conventional approach such as the conventional communication analysis which sets boundaries (such as a division) in an organization and analyzes communications inside thereof, but takes an approach which considers boundaries ambiguous in an organization. The face-to-face communication network is considered as a network continuously changing from a center to a periphery. Therefore, by weighting subject persons from the center to the periphery of the face-to-face communication network of the subject organization so as to reflect the continuous change of the communication network to organization evaluation indices, organization evaluation indices which are more closely related to the actual status, are independent of determinations by an analyzing person, are thus objective, and are stable may be calculated.

According to an exemplary embodiment of this invention, there is provided an organization evaluation device for evaluating a first organization formed of a plurality of persons, including: a reception unit for receiving data indicating a physical quantity detected by a sensor of a terminal worn by each of the plurality of persons; a sensing data storage unit for storing the data indicating the physical quantity; a personal index calculation module for calculating, from at least one of the data indicating the physical quantity stored in the sensing data storage unit and a business index of each of the plurality of persons, a personal index of each of the plurality of persons; a personal index storage unit for storing the personal index; a weight coefficient calculation module for calculating a weight coefficient indicating a degree of involvement of each of the plurality of persons in the first organization from the data indicating the physical quantity stored in the sensing data storage unit; and an organization index calculation module for calculating, by obtaining a weighted average of a plurality of the personal indices stored in the personal index storage unit using the weight coefficient, an organization index of the first organization.

According to this invention, the organization index may be calculated from the personal indices according to importance and degree of influence of members in the organization, and a stable organization index which is hardly influenced by outliers of persons less important in the organization, and is hardly influenced by a defined domain of the organization members may thus be calculated. As a result, reliability of the organization indices increases, and comparison between organizations and time-series changes in properties of an organization may be numerically analyzed for organization management.

BRIEF DESCRIPTION OF THE DRAWINGS

FIG. 7 illustrates an example of a screen displayed for setting analysis conditions.

FIG. 9 illustrates an example of a user ID correspondence table.

FIG. 10 illustrates an example of an acceleration data table held by the sensor network server.

FIGS. 11A and 11B illustrate examples of a meeting table held by the sensor network server.

FIG. 12 illustrates an example of a meeting matrix.

FIGS. 15A to 15C illustrate examples of a degree, a reach, and betweennesses.

FIG. 16 illustrates an example of a personal index table.

FIG. 17 illustrates an example of an organization index table.

DETAILED DESCRIPTION OF THE PREFERRED EMBODIMENTS

Figure 1:
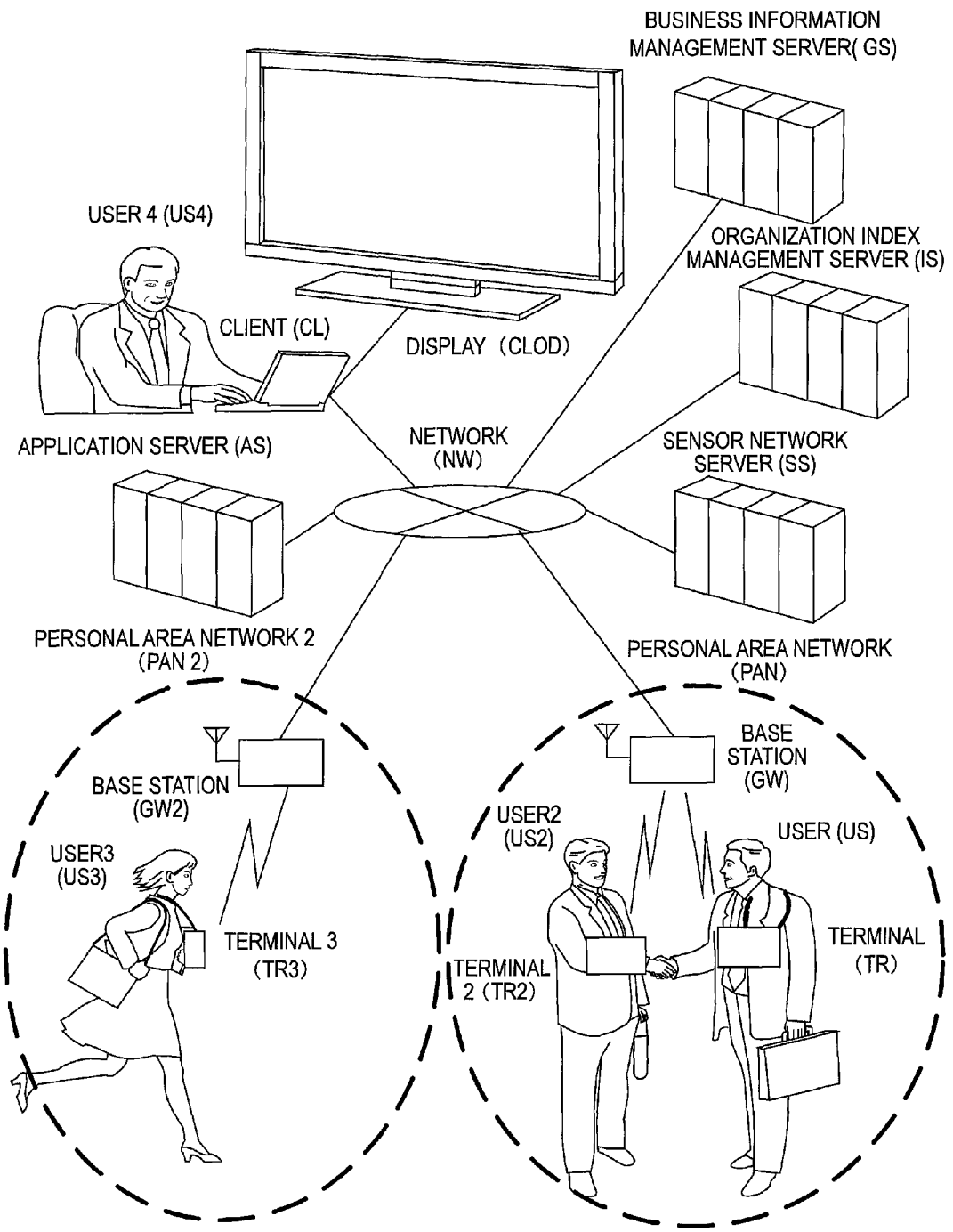
FIG. 1 illustrates an example of a configuration of a sensor network system.

According to this invention, individuals are weighted according to a degree of involvement in an organization, namely, an importance of the individual in the organization, and, by obtaining a sum of personal indices multiplied respectively by the weight coefficients (weighted average) is obtained, to thereby calculate an organization index. In particular, this invention has a feature of using, as the importance of an individual in an organization, a relationship with other persons, namely, a network index based on a structure of communication in the organization.

More specifically, a sensor terminal is worn by a subject person, so that data on motions of the body of the subject person or on a manner of meeting with other persons may be acquired, personal indices may be calculated, and the personal indices may be weighted respectively by network indices, by means of the sensor, to thereby implement a system capable of calculating an index of the organization.

First Embodiment

A description is now given of a first embodiment of this invention referring to the drawings.

<FIG. 1: Flow of Overall Processing>

FIG. 1 illustrates a system outline according to the first embodiment. According to the first embodiment, each of members of an organization as users (USs) wears a sensor terminal (TR) including a wireless transmitter/receiver, and, by means of the sensor terminals (TRs), sensing data on movements of each of the members and interactions between the members is acquired. As for the interaction, users transmit and receive an infrared ray between the terminals (TRs) when the users (USs) meet each other, so that the meeting is detected. The acquired sensing data is wirelessly transmitted to the base station (GW), and is stored via a network (NW) in a sensor network server (SS). In order to calculate an organization index based on this sensing data, a client (CL) requests an application server (AS) to extract sensing data of the subject members from the sensor network server (SS).

Further, a business information management server (GS) stores, other than the sensing data, data relating to personal tasks such as a sales amount, working hours, the number of patents, the number of meetings, the number of held PCs, and the like, in numerical form associated with a personal ID and a subject time range of the data. When an organization index is calculated based on personal indices other than the sensing data, the application server (AS) makes a request to the business information management server (GS), so as to obtain business information on the subject members. The sensing data or the business information is processed and analyzed by the application server (AS), so that the personal indices and the organization index may be calculated, and images may be further produced as necessary.

Further, similarly, on the application server (AS), organization commitment indices serving as indices of commitment of persons to the organization may be calculated based on the sensing data, and the personal indices may be respectively weighted by using the organization commitment indices, to thereby calculate an organization index. The organization commitment index may include an organization network index (such as a degree, a reach, a betweenness, and a cohesion) obtained from meeting data, a terminal (TR) drive period, and a communication activity level. Then, the organization index thus obtained is accumulated in an organization index management server (IS).

When, for analyzing another organization, comparison between organizations becomes necessary, indices of other organizations are obtained from the organization index management server (IS), and an image is produced based on the obtained indices along with that of the organization to be analyzed. Further, the image is returned to the client (CL), and is displayed (CLDP) on a display device (CLOD). An organization evaluation system carrying out of the series of processing described above is realized.

Further, though the application server, the sensor network server, the organization index management server, and the business information management server are illustrated and described as independent devices, they may be implemented as one or more devices.

The data acquired by the terminal (TR) may be accumulated in the terminal (TR), rather than being sequentially transmitted wirelessly, and may be transmitted to the base station (GW) when the terminal (TR) is connected to a wired network.

<FIGS. 2 to 4B: Flows in Overall System>

FIGS. 2 to 4B are block diagrams illustrating an overall configuration of a sensor network system for implementing the organization evaluation system according to the first embodiment of this invention. For the sake of illustration, the overall configuration is divided, but respective processing portions illustrated in the respective drawings operate in cooperation. Further, respective functions in the drawings are realized by hardware, software, or a combination thereof, and functional blocks do not necessarily have hardware entities.

The respective components, as apparent from FIGS. 2 to 4B, include a control unit, a storage unit, and a transmission/reception unit. The control unit is formed of a central processing unit (CPU) (not shown), which is a processing unit of an ordinary computer or the like, the storage unit is formed of a memory device such as a semiconductor storage device or a magnetic storage device, and the transmission/reception unit is formed of a network interface of a wired type, a wireless type, or the like. Additionally, a clock (GWCK) and the like may be provided as necessary.

The terminal (TR) acquires the sensing data on movements and communications of a person wearing the terminal (TR), and the sensing data is stored, via the base station (GW), in the sensor network server (SS). Further, the application server (AS) analyzes the sensing data, calculates organization indices, and outputs numbers and drawings as the analysis results on the client (CL) side. If necessary, the calculated organization indices may be stored in the organization index management server (IS). Further, in order to display the analysis result for comparison with other organizations, indices of the other organizations are obtained from the organization index management server (IS), and transmitted to the application server (AS). FIGS. 2 to 4B illustrate a series of the flow described above.

Five types of arrows different in shape of FIGS. 2 to 4B respectively represent time synchronization, association, storage of acquired sensing data, data analysis, and data or signal flow for control signals.

Figure 2:
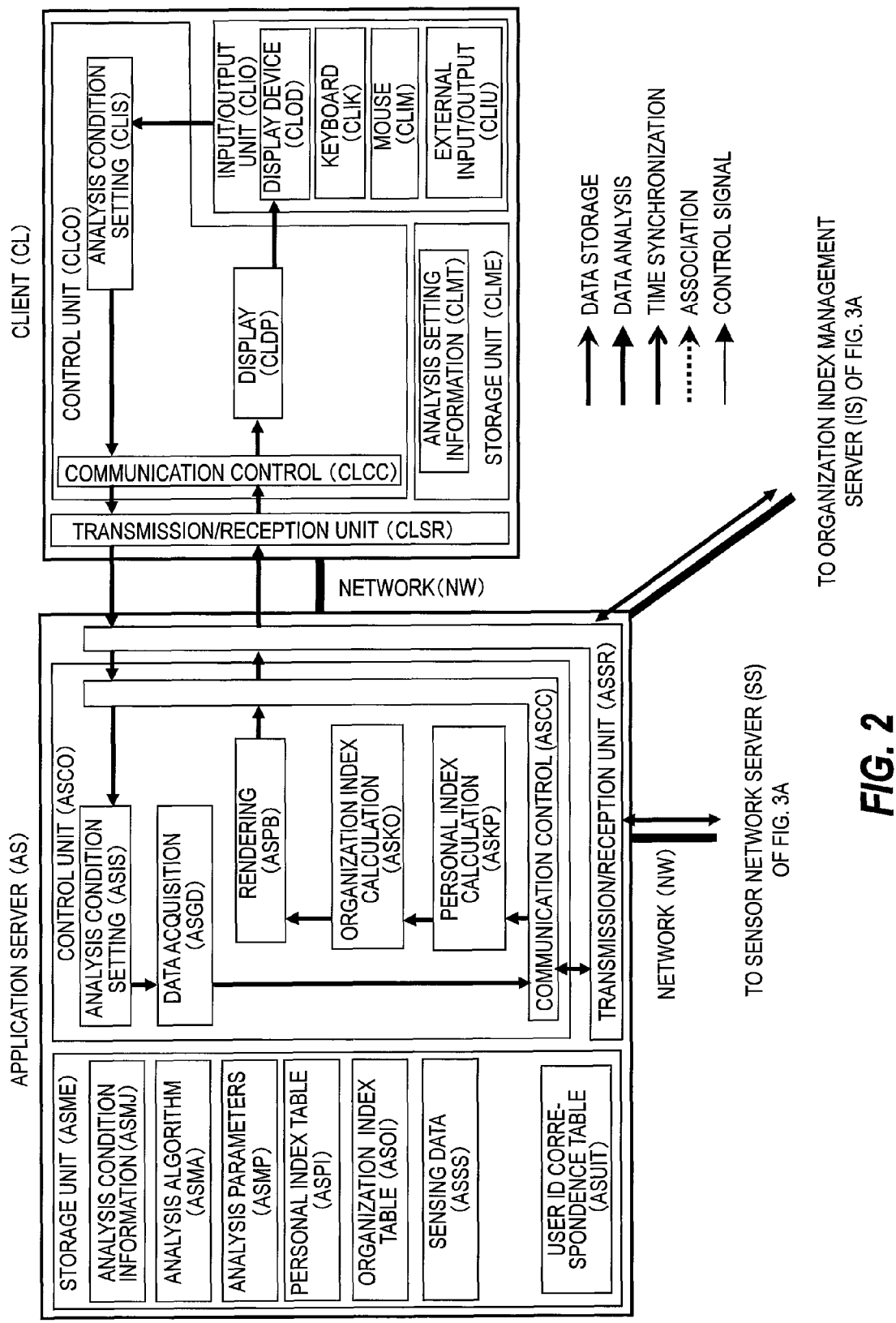
FIG. 2 illustrates an example of configurations of an application server and a client.

<FIG. 2: Overall System (1) (CL/AS)>

FIG. 2 illustrates a configuration of the client (CL) and the application server (AS) according to this embodiment.

<Client (CL)>

The client (CL) serves as a contact point provided for the user (US), and inputs/outputs data. The client (CL) includes an input/output unit (CLIO), a transmission/reception unit (CLSR), a storage unit (CLME), and a control unit (CLCO).

The input/output unit (CLIO) serves as an interface to the user (US). The input/output unit (CLIO) includes a display device (CLOD), a keyboard (CLIK), a mouse (CUM), and the like. If necessary, other input/output devices may be connected, in addition to an external input/output (CLIO).

The display device (CLOD) is an image display device such as a cathode-ray tube (CRT) display or a liquid crystal display. The display device (CLOD) may include a printer and the like.

The transmission/reception unit (CLSR) transmits and receives data to and from the application server (AS) and the sensor network server (SS). Specifically, the transmission/reception unit (CLSR) transmits analysis conditions to the application server (AS), and receives a result of the analysis.

The storage unit (CLME) is formed of a hard disk, a memory, or an external storage device such as an SD card. The storage unit (CLME) records information such as analysis setting information (CLMT), which is necessary for index calculation and image rendering. The analysis setting information (CLMT) records conditions such as an organization to be analyzed and a selection of an analysis method, which are set by the user (US), and information on images received from the application server (AS) such as sizes of the images and display positions thereof on a screen. Further, the storage unit (CLME) may store programs to be executed by a CPU (not shown) of the control unit (CLCO).

The control unit (CLCO) includes the CPU (not shown), and carries out control of communication, input of the analysis conditions from the user (US), display for presenting the analysis result to the user (US), and the like. Specifically, the CPU executes the program stored in the storage unit (CLME), to thereby carry out processing such as communication control (CLCC), analysis condition setting (CLIS), display (CLDP), and the like.

The communication control (CLCC) controls timings of wireless or wired communication with the application server (AS) or the sensor network server (SS). Further, the communication control (CLCC) converts a format of data, and assigns the data with a destination according the type of the data.

The analysis condition setting (CLIS) receives, via the input/output unit (CLIO), the specified analysis conditions from the user (US), and records the analysis conditions to analysis setting information (CLMT) of the storage unit (CLME). In this case, a period of data used for the analysis, a subject organization, subject members, a type of the analysis, parameters for the analysis, and the like are set. The client (CL) transmits the setting to the application server (AS), to thereby make a request for the analysis.

The display (CLDP) outputs numerical values and graphics, which are results of the analysis obtained from the application server (AS), to an output device such as the display device (CLOD). In this case, when the application server (AS) has given an instruction regarding a display method along with the image so as to designate a display size and a position, the display (CLDP) carries out the display accordingly. The user (US) may use the input device such as the mouse (CLIM) to finely adjust the size and the position of the image.

<Application Server (AS)>

The application server (AS) processes and analyzes the sensing data. An analysis application is started when a request is received from the client (CL) or automatically at a set time. The analysis application transmits a request to the sensor network server (SS) or the organization index management server (IS), to thereby obtain index data of other organizations and necessary sensing data. Further, the analysis application analyzes obtained data, and returns a result thereof to the client (CL). Alternatively, the analysis application may directly record the analysis result in the storage unit (ASME) in the application server (AS).

The application server (AS) includes a transmission/reception unit (ASSR), a storage unit (ASME), and a control unit (ASCO).

The transmission/reception unit (ASSR) transmits and receives data to and from the sensor network server (SS), the organization index management server (IS), and the client (CL). Specifically, the transmission/reception unit (ASSR) receives a command transmitted from the client (CL), and transmits a data acquisition request to the sensor network server (SS). Further, the transmission reception unit (ASSR) receives sensing data from the sensor network server (SS), and transmits images and data of a result of the analysis to the client (CL). When indices of other organizations are necessary, the transmission reception unit (ASSR) receives organization index data from the organization index management server (IS), as in case of the sensor network server (SS).

The storage unit (ASME) is formed of a hard disk, a memory, or an external storage device such as an SD card. The storage unit (ASME) stores set conditions for the analysis, and data on intermediate or final result of the analysis. Specifically, the storage unit (ASME) stores analysis condition information (ASMJ), analysis algorithms (ASMAs), analysis parameters (ASMPs), personal index tables (ASPIs), an organization index table (ASOI), and a user ID correspondence table (ASUIT).

The analysis condition information (ASMJ) temporarily stores conditions and settings for the analysis requested by the client (CL).

The analysis algorithm (ASMA) records programs for carrying out the analysis. According to the first embodiment, the analysis algorithm (ASMA) records programs for a method of producing a meeting matrix, a method of calculating network indices, a method of calculating the flow level, and a rendering (ASPB) method. According to a request from the client (CL), a proper program is selected from the analysis algorithms (ASMAs), and the selected program carries out the analysis.

The analysis parameters (ASMPs) record, for example, parameters such as a threshold used for determining whether a link is present from the meeting matrix (ASMM), and how to divide time for obtaining a characteristic quantity for obtaining the flow level. When changing a parameter by request from the client (CL), the analysis parameters (ASMPs) are rewritten.

The user ID correspondence table (ASUIT) is a correspondence table illustrating correspondences between an ID of a terminal (TR) and a name, a user number, a belonging division, attributes, and the like of a user (US) wearing the terminal (TR). A terminal ID corresponding to a member subjected to the analysis requested by the client (CL) is referred in the user ID correspondence table (ASUIT), and, a data acquisition request is transmitted to the sensor network server (SS). An example of the user ID correspondence table (ASUIT) is illustrated in FIG. 9.

The control unit (ASCO) includes a CPU (not shown), and carries out control for transmission/reception of data, and analysis of the data. Specifically, the CPU (not shown) executes a program stored in the storage unit (ASME), to thereby carry out processing such as communication control (ASCC), analysis condition setting (ASIS), data acquisition (ASGD), personal index calculation, organization index calculation (ASKO), rendering (ASPB), and the like.

The communication control (ASCC) controls timings of wireless or wired communication with the sensor network server (SS), the organization index management server (IS), and the client (CL). Further, the communication control (ASCC) properly converts a format of data, and assigns the data with a destination according to the type of the data.

The analysis condition setting (ASIS) receives, via the client (CL), the analysis conditions specified by the user (US), and records the analysis conditions as analysis setting information (ASMJ) of the storage unit (ASME).

The data acquisition (ASGD) determines, according to the analysis condition information (ASMJ), data necessary for the analysis, requests the sensor network server (SS) to send data relating to behaviors and meeting, and requests index data of other organizations from the organization index management server (IS). Then, the data acquisition (ASGD) receives the requested data.

The personal index calculation (ASKP) is a process of calculating indices relating to each individual user based on the sensing data. The calculation steps are described in the analysis algorithm (ASMA), and the calculation is carried out using specified analysis parameters (ASMPs). Examples of the personal indices include, as illustrated in FIG. 16, the degree, the reach, the cohesion, and the betweenness, which are network indices obtained from the meeting data, the flow level which is a degree of a personal mental condition (degree of absorption) obtained from slight motions, and data such as sales which is not obtained by the sensor. Business indices such as sales may be used for analyzing connection to the behavior data obtained by the sensor, to thereby find behavior patterns effective for an increase in productivity.

The organization index calculation (ASKO) is a process of calculating, based on the personal index data of each of members belonging to an organization, an organization index. An example of such a method includes means for obtaining an organization index by averaging personal indices. However, when an average is used, there arises the following problem. That is, when an unimportant person has an outlier, the value largely affects the organization index, with the result that a value of an important person is not emphasized. To address this problem, according to this embodiment, the organization index is calculated by summing personal indices weighted by network indices of the subject organization obtained from the meeting data. Steps of obtaining the organization index is described in detail referring to FIG. 8.

The rendering (ASPB) is processing of producing tables, graphs, and graphics for presenting the calculated organization index to the user. The rendering (ASPB) may render, as necessary, index data of other organizations collected from the organization index management server (IS) as subjects of comparison, in addition to the index of the subject organization obtained by the organization index calculation (ASKO). Examples of the drawings to be rendered are illustrated in FIGS. 19 to 21, and 23 to 25. The produced images (including tables and graphs) are transmitted to the client (CL).

Figure 3A:
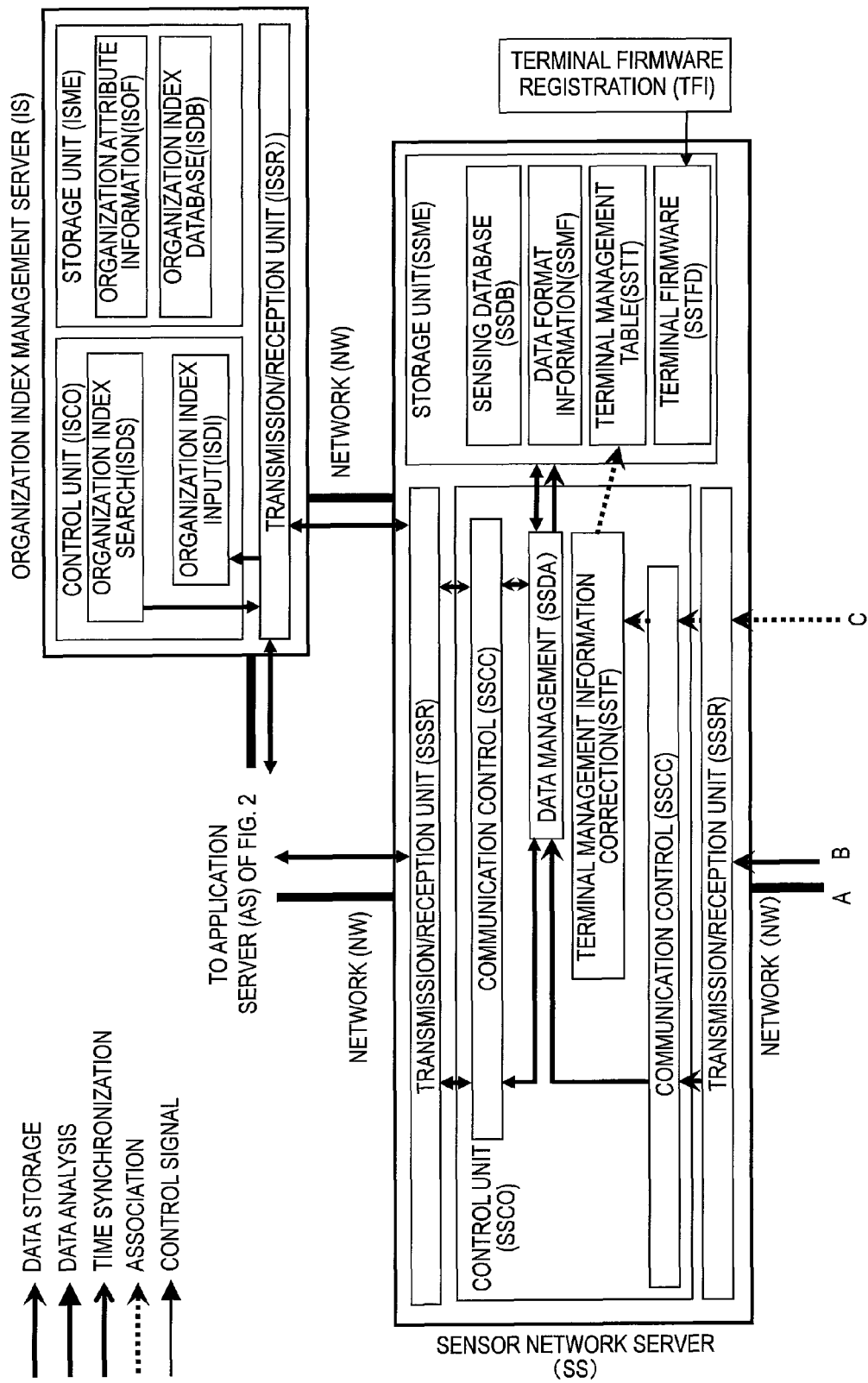
FIGS. 3A and 3B illustrate examples of configurations of an organization index management server, a sensor network server, and a base station.
Figure 3B:
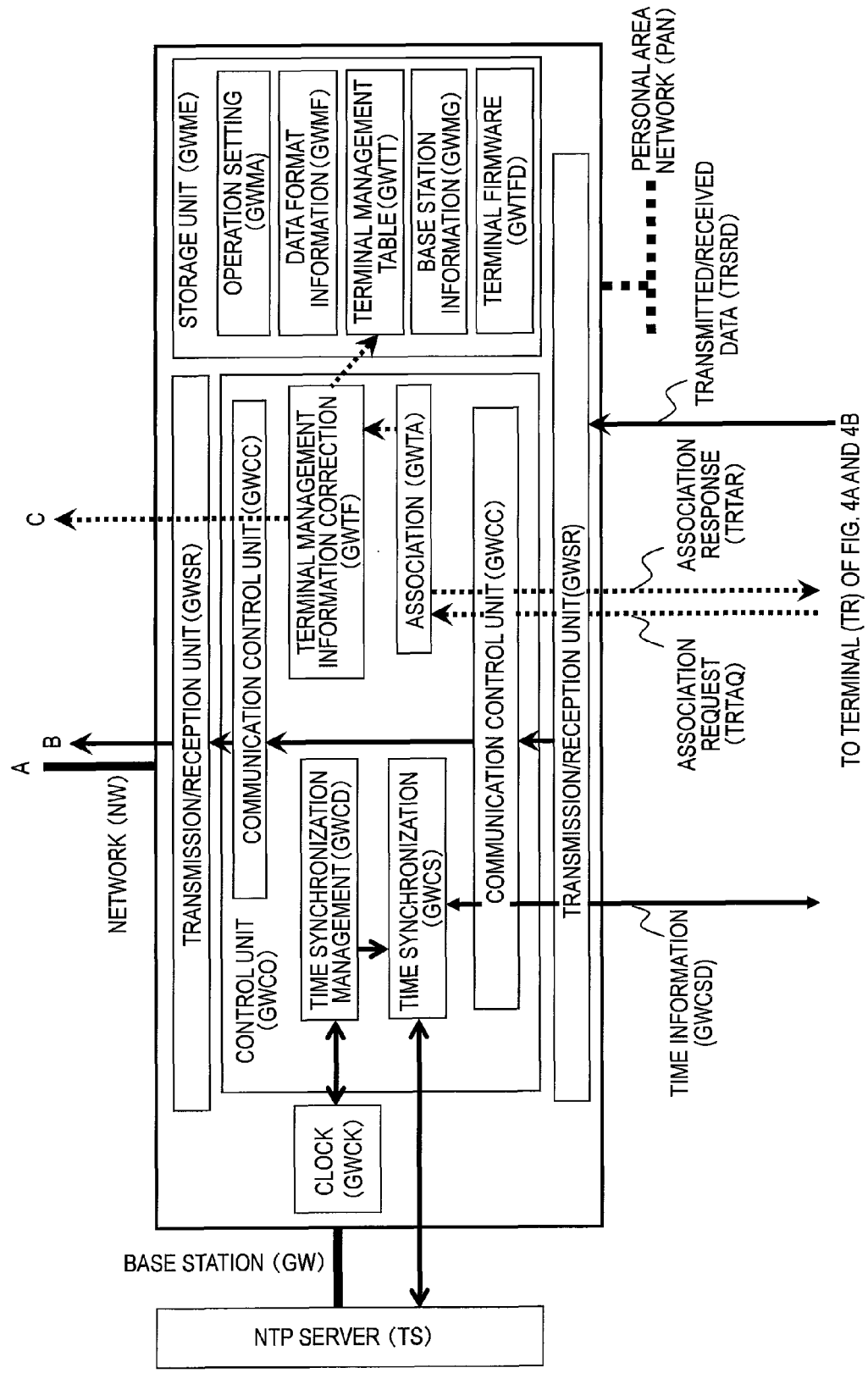

<FIGS. 3A and 3B: Overall System (2) (SS, GW, and IS)>

FIGS. 3A and 3B illustrate configurations according to this embodiment of the sensor network server (SS), the organization index management server (IS), and the base station (GW).

<Sensor Network Server (SS)>

The sensor network server (SS) manages data collected from all the terminals (TRs). Specifically, the sensor network server (SS) stores sensing data transmitted from the base station (GW) in the sensing database (SSDB), and transmits sensing data according to requests from the application server (AS) and the client (CL). Further, the sensor network server (SS) receives a control command from the base station (GW), and returns a result obtained according to the control command, to the base station (GW). When a large number of organizations are managed via the sensor network server (SS), the organization index management server (IS) and the sensor network server (SS) are also connected via the network (NW).

The sensor network server (SS) includes a transmission/reception unit (SSSR), a storage unit (SSME), and a control unit (SSCO). When time synchronization management (not shown) is carried out by the sensor network server (SS), rather than by the base station (GW), the sensor network server (SS) also requires a clock.

The transmission/reception unit (SSSR) transmits and receives data to and from the application server (AS), a questionnaire input clients (QCs), and the client (CL). Specifically, the transmission/reception unit (SSSR) receives sensing data transmitted from the base station (GW) and questionnaire data transmitted from the questionnaire input client (QC), and transmits the sensing data and the questionnaire data to the application server (AS) or the client (CL).

The storage unit (SSME) is formed of a data storage device such as a hard disk, and stores at least the sensing database (SSDB), data format information (SSMF), a terminal management table (SSTT), and terminal firmware (SSTFD). Further, the storage unit (SSME) may store programs to be executed by a CPU (not shown) of the control unit (SSCO).

The sensing database (SSDB) is a database for recording the sensing data acquired by the each terminal (TR), information on the terminals (TRs), information on base stations (GWs) through which the sensing data transmitted from each terminal (TR) has routed, and the like. A column is generated for each element of the data such as an acceleration and a temperature, so as to manage the data. Alternatively, a table may be generated for each element of the data. In either case, all the data is managed while they are associated with terminal information (TRMT) which is an ID of a terminal (TR) which has acquired the data, and information on a time of the acquisition. Specific examples of the acceleration data table and the meeting table in the sensing database (SSDB) are respectively illustrated in FIGS. 10, 11A, and 11B.

The data format information (SSMF) records data formats for communication, a method for distributing sensing data tagged by a base station (GW) so as to be stored in the database, information indicating a method of responding to a request for data, and the like. After reception of data and before transmission of the data, this data format information (SSMF) is referred to, so as to perform conversion of the data format and distribution of the data.

The terminal management table (SSTT) is a table recording which terminal (TR) is under management of which base station (GW). When a new terminal (TR) is added so as to be managed by a base station (GW), the terminal management table (SSTT) is updated.

The terminal firmware (SSTF) stores programs for operating the terminal (TR), and when a terminal firmware registration (TFI) is carried out, the terminal firmware (SSTFD) is updated, and the terminal firmware (SSTFD) thus updated is transmitted through the network (NW) to the base station (GW). The terminal firmware (SSTFD) is further transmitted via a personal network (PAN) to the terminal (TR), to thereby update the firmware in the terminal (TR).

The control unit (SSCO) includes a CPU (not shown), and controls the transmission/reception of the sensing data, and the recording/retrieving on/from the database. Specifically, the CPU executes the program stored in the storage unit (SSME), to thereby carry out processing such as communication control (SSCC), terminal management information modification (SSTF), data management (SSDA), and the like.

The communication control (SSCC) controls timings of wireless or wired communication with the base station (GW), the application server (AS), the questionnaire input client (QC), and the client (CL). Further, the communication control (SSCC) converts a format of data to be received/transmitted, based on the data format information (SSMF) recorded in the storage unit (SSME), into the data format in the sensor network server (SS) or a data format specific to respective opposite parties of communication.

Further, the communication control (SSCC) reads a header portion indicating a type of the data, and distributes the data to a corresponding processing unit. Specifically, the received sensing data is distributed to the data management (SSDA), and a command for modifying terminal management information is distributed to the terminal management information modification (SSTF). A destination of the data to be transmitted is determined as the base station (GW), the application server (AS), the organization index management server (IS), or the client (CL).

When the terminal management information modification (SSTF) receives, from the base station (GW), a command for modifying the terminal management information, the terminal management information modification (SSTF) updates the terminal management table (SSTT).

The data management (SSDA) manages modification, acquisition, and addition of data in the storage unit (SSME). For example, by the data management (SSDA), the sensing data is recorded, based on the tag information, in a proper column provided according to the element of the data in the database. When the sensing data is to be read from the database, necessary data are selected based on the time information and the terminal information, and a processing such as sorting by time is performed.

<Organization Index Management Server (IS)>

The organization index management server (IS) is a server for storing organization indices of many organizations. Though hard disks having a large capacity are necessary for storing entire sensing data of one organization, the organization index management server (IS) stores only results of calculation of organization indices obtained in the past and attribute information of organizations thereof. As a result, indices of many organizations may be stored with a small capacity, and, for comparison between organizations, only the organization indices thereof may be acquired from the organization index management server (IS) without recalculation. When data from many organizations are handled, a sensor network server (SS) is provided for each of the organizations, and sensing data from each organization is stored in the corresponding sensing database. Then, only a result of the obtained organization index is stored in the organization index management server (IS). When old sensing data is no longer necessary, a corresponding sensor network server (SS) is separated from the network. However, indices still remain in the organization index management server (IS), and hence the old organization indices may be used for the analysis of other organizations. Further, in addition to organization indices, personal indices may also be stored in the organization index management server (IS).

The organization index management server (IS) includes a transmission/reception unit (ISSR), a storage unit (ISME), and a control unit (ISCO).

The transmission/reception unit (ISSR) transmits and receives data to and from the sensor network server (SS), the application server (AS), and the client (CL). Specifically, the transmission/reception unit (ISSR) receives requests for an organization index, the requests being transmitted from the application server (AS), the sensor network server (SS), and the client (CL), and transmits organization index data which matches each of the requests.

The storage unit (ISME) is formed of a hard disk, a memory, or an external storage device such as an SD card. The storage unit (ISME) stores an organization index database (ISDB) and organization attribute information (ISOF). The organization index database (ISDB) stores many types of organization index data calculated in the past. Further, the organization attribute information (ISOF) stores detailed attribute information on organizations stored in the organization index database (ISDB). The organization attributes include information such as a business field, number of employees, a distribution of the number of employees for each position, a male/female ratio, and the location, and business information such as profits and stock prices of a subject organization. The organization indices and the organization attribute information store types of data which are considered necessary for subsequent comparison and analysis between organizations. Regarding the organization indices, when another organization index becomes necessary, the organization index may be recalculated from sensing data and may be added to the database (ISDB).

The control unit (ISCO) includes a CPU (not shown), and controls the reading/writing of the organization index data and the organization attribute information.

An organization index search (ISDS) searches, according to contents of a request for an organization index received from the application server (AS) or the sensor network server (SS), matched organization index data and organization attribute information thereon, and transmits the data and the information.

Further, an organization index input (ISDI) carries out processing of associating organization index data calculated by the application server (AS) or the like with attribute information on the organization, and stores the organization index data and the associated attribute information in the storage unit.

<Base Station (GW)>

The base station (GW) serves as an intermediary between the terminal (TR) and the sensor network server (SS). When the terminal (TR) and the base station (GW) are wirelessly connected with each other, a plurality of base stations (GWs) are provided so as to cover areas such as a living room, an office, or the like, with consideration given to the coverage of the wireless communication. When the terminal (TR) and the base station (GW) are connected with each other in a wired form an upper limit of the number of terminals (TRs) to be managed is set, depending on a processing capability of the base station (GW).

The base station (GW) includes a transmission/reception unit (GWSR), a storage unit (GWME), a clock (GWCK), and a control unit (GWCO).

The transmission/reception unit (GWSR) receives, in a wired or wireless form, data from the terminal (TR), and transmits, in a wired or wireless form, the data to the sensor network server (SS). When wireless communication is used for the transmission/reception, the transmission/reception unit (GWSR) includes an antenna for reception of the wireless communication.

The storage unit (GWME) is formed of a hard disk, a memory, or an external storage device such as an SD card. The storage unit (GWME) stores an operation setting (GWMA), data format information (GWMF), a terminal management table (GWTT), base station information (GWMG), and terminal firmware (GWTFD). The operation setting (GWMA) contains information representing how the base station (GW) operates. The data format information (GWMF) includes information indicating data formats for communication and information required for tagging the sensing data. The terminal management table (GWTT) includes terminal information (TRMT) subordinate terminals (TRs) presently associated, and local IDs distributed for managing these terminals (TRs). The base station information (GWMG) contains information such as an own address of the base station (GW). The terminal firmware (GWTFD) stores programs for causing the terminal (TR) to operate. The terminal firmware (GWTFD) receives, when the terminal firmware is updated, new terminal firmware from the sensor network server (SS), and transmits the terminal firmware via the personal area network (PAN) to the terminal (TR).

Further, the storage unit (GWME) may store programs to be executed by a CPU (not shown) of the control unit (GWCO).

The clock (GWCK) stores time information. The time information is updated at constant intervals. Specifically, using time information acquired from a network time protocol (NTP) server (TS) at the constant intervals, the time information of the clock (GWCK) is corrected.

The control unit (GWCO) includes a CPU (not shown). The CPU executes the program stored in the storage unit (GWME), to thereby manage a timing for receiving the sensing data from the terminal (TR), timings for processing the sensing data and for transmission/reception to/from the terminal (TR) and the sensor network server (SS), and a timing for time synchronization. Specifically, the CPU executes the program stored in the storage unit (GWME), to thereby carry out processing such as the wireless communication control/communication control (GWCC), an association (GWTA), a time synchronization management (GWCD), and a time synchronization (GWCS).

The communication control (GWCC) controls timings of wireless or wired communication with the terminal (TR) and the sensor network server (SS). Further, the communication control (GWCC) identifies the type of received data. Specifically, the communication control (GWCC) identifies whether the received data is general sensing data, data for the association, a response to the time synchronization, or the like, based on a header portion of the data, and passes the data to each proper function.

The association (GWTA) carries out an association response (TRTAR) for transmitting, in response to an association request (TRTAQ) transmitted from the terminal (TR), a local ID assigned thereto to the each terminal (TR). When the association is established, the association (GWTA) carries out a terminal management information correction (GWTF) of correcting the terminal management table (GWTT).

The time synchronization management (GWCD) controls an interval and a timing for carrying out the time synchronization, and issues an instruction to carry out the time synchronization. Alternatively, the control unit (SSCO) of the sensor network server (SS) may carry out the time synchronization management (not shown), to thereby transmit an instruction at once to all the base stations (GWs) across the system.

The time synchronization (GWCS) connects to the NTP server (TS) on the network, and requests and acquires the time information. The time synchronization (GWCS) corrects the clock (GWCK), based on the acquired time information. Then, the time synchronization (GWCS) transmits, to the terminal (TR), an instruction of the time synchronization and time information (GWSD), to thereby synchronize the clock (TRCK) in the terminal (TR).

Figure 4A:
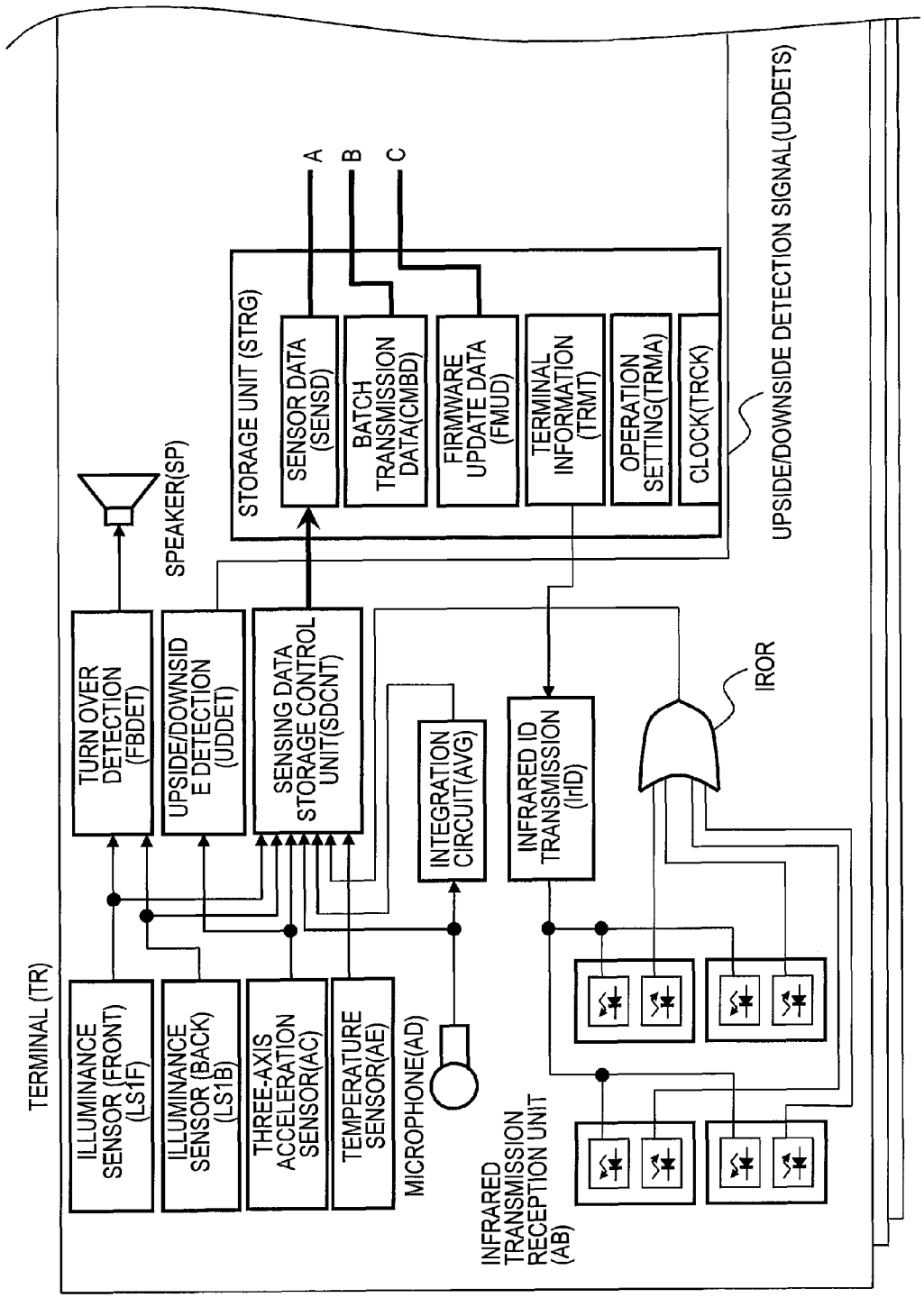
FIGS. 4A and 4B illustrate examples of a configuration of a terminal.
Figure 4B:
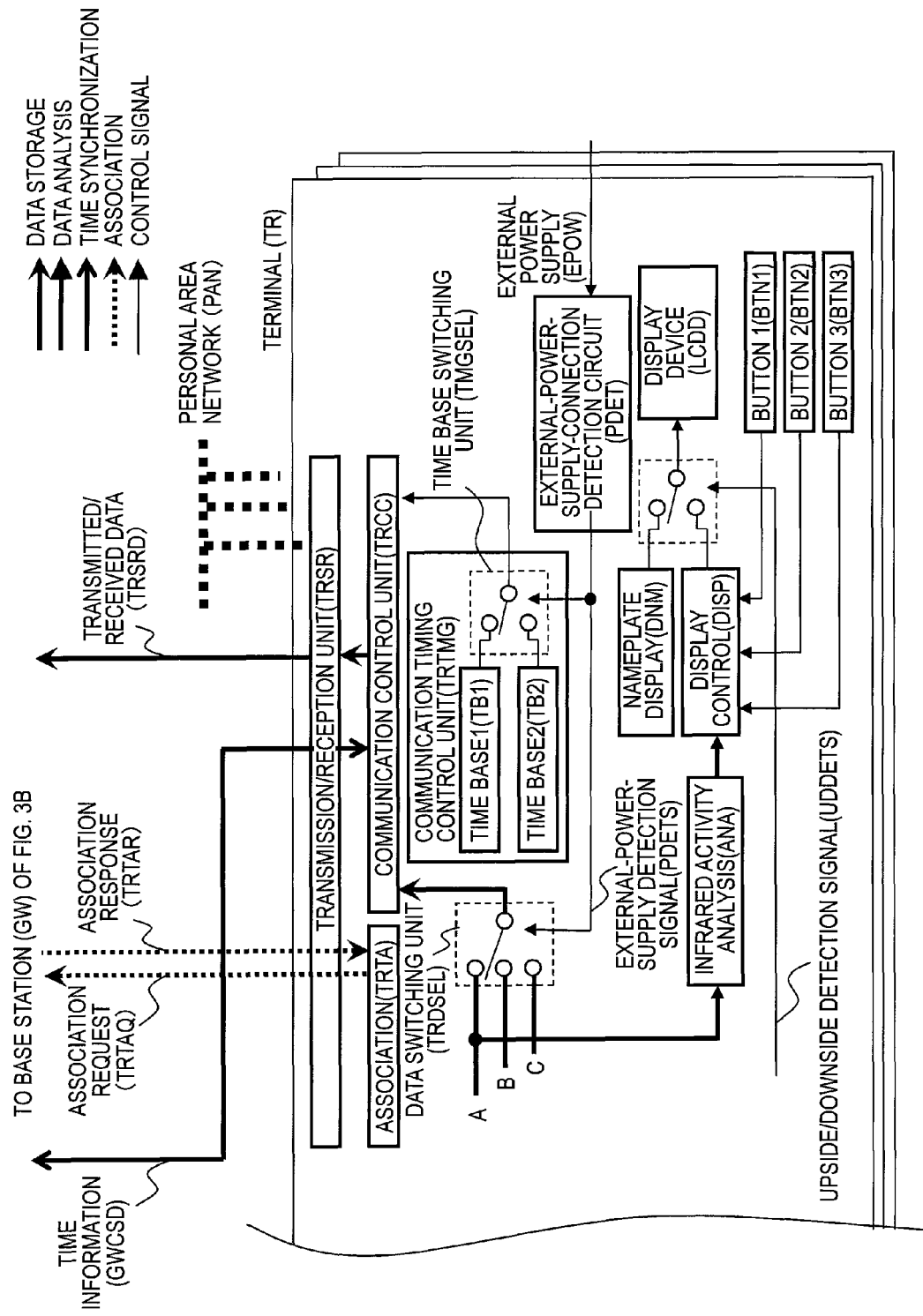

<FIGS. 4A and 4B: Overall System (3) (TR)>

FIGS. 4A and 4B illustrate configurations of the terminal (TR) which is an embodiment of the sensor node. In this embodiment, the terminal (TR) takes a shape of a nameplate, and is intended to be hanged from the neck of a person. However, this configuration is only an example, and the terminal (TR) may take other forms. Generally, this series of the systems include a plurality of terminals (TRs), which are respectively worn by persons belonging to the organization. The terminal (TR) carries various sensors such as a plurality of infrared transmission/reception units (ABs) for detecting a manner of meeting a person, a three-axis acceleration sensor (AC) for detecting an motion of the wearer, a microphone (AD) for detecting a speech of the wearer and ambient sounds, illuminance sensors (LS1F, LS1B) for detecting a front side and a back side of the terminal (TR), and a temperature sensor (AE). These installed sensors are examples, and other sensors for detecting the meeting state and the motions of the wearer may be used.

According to this embodiment, four sets of infrared transmission/reception units are installed. The infrared transmission/reception unit (AB) keeps transmitting the terminal information (TRMT), which is unique identification information of the terminal (TR), periodically toward the front direction. When a person wearing another terminal (TR) comes to an approximately front position (front or obliquely front position), the terminal (TR) and the other terminal (TR) communicate the terminal information (TRMT) via the infrared. As a result, there may be recorded who are meeting each other.

The each infrared transmission/reception unit is generally formed of a combination of an infrared light emission diode for transmitting the infrared, and an infrared phototransistor. An infrared ID transmission unit (IrID) generates the terminal information (TRMT) which is its own ID, and transfers the terminal information (TRMT) to the infrared light emission diode of the infrared transmission/reception module. According to this embodiment, the same data is transmitted to the plurality of infrared transmission/reception modules, and hence all the infrared light emission diodes turn on at the same time. Of course, different data may be output to the plurality of infrared transmission/reception modules at respective independent timings.

Further, data received by the infrared phototransistor of the infrared transmission/reception unit (AB) are logically ORed by a logical addition circuit (IROR). In other words, as long as at least one infrared reception unit receives an ID, the received ID is recognized an ID by the terminal (TR). Of course, there may be provided a configuration including independent circuits for receiving IDs. In this case, it is possible to recognize the transmission/reception states of the respective infrared transmission/reception modules, and hence there may be acquired additional information such as in which direction the opposite terminal is present.

The sensing data (SENSD) detected by the sensor is stored by a sensing data storage control unit (SDCNT) in the storage unit (STRG). The sensing data (SENSD) is made into a transmission packet by the communication control unit (TRCC), and is transmitted by the transmission/reception unit (TRSR) to the base station (GW).

In this case, the communication timing control unit (TRTMG) determines the timing of taking out, from the storage unit (STRG), the sensing data (SENSD), and transmitting the data in the wireless or wired form. The communication timing control unit (TRTMG) includes a plurality of time bases for determining a plurality of timings.

The data stored in the storage unit includes, in addition to the sensing data (SENSD) currently detected by the sensor, bulk transmission data accumulated in the past (CMBD), and firmware update data (FMUD) for updating the firmware which is an operation program of the terminal (TR).

The terminal (TR) according to this embodiment detects, by an external power supply connection detection circuit (PDET), a connection of an external power supply (EPOW), and generates an external power supply detection signal (PDETS). According to the external power supply detection signal (PDETS), a time base switching unit (TMGSEL) switches the transmission timing generated by the timing control unit (TRTMG) and a data switching unit (TRDSEL) switches data to be wirelessly transmitted, which are unique configurations of this terminal (TR). FIGS. 4A and 4B illustrate, as an example, a configuration in which a time base 1 (TB1) and a time base 2 (TB2) are switched by the time base switching unit (TMGSEL) according to the external power supply detection signal (PDETS), so as to switch the transmission timing. In the configuration illustrated in FIGS. 4A and 4B, the data to be communicated is switched among the sensing data (SENSD) acquired from the sensor, the bulk transmission data accumulated in the past (CMBD), and the firmware update data (FMUD), by the data switching unit (TRSEL).

The illuminance sensors (LS1F, LS1B) are respectively mounted on a front face and a back face of the terminal (TR), respectively. Data acquired by the illuminance sensors (LS1F, LS1B) are stored by the sensing data storage control unit (SDCNT) in the storage unit (STRG), and are compared each other by a turn over detection (FBDET). When the nameplate is worn correctly, the illuminance sensor (LS1F) mounted on the front face receives ambient light, while the illuminance sensor (LS1B) mounted on the back face is located between the terminal body and the wearer, and thus does not receive the ambient light. At this time, the illuminance detected by the illuminance sensor (LS1B) takes a larger value than the illuminance detected by the illuminance sensor (LS1F). On the other hand, when the terminal (TR) is turned over, the illuminance sensor (LS1B) receives ambient light, the illuminance sensor (LS1F) faces the wearer, and hence the illuminance detected by the illuminance sensor (LS1B) is larger than the illuminance detected by the illuminance sensor (LS1F).

In this case, the turnover detection unit (FBDET) compares the illuminance detected by the illuminance sensor (LS1F) and the illuminance detected by the illuminance sensor (LS1B), to thereby detect that the nameplate node is turned over, and is thus not worn correctly. The turnover detection (FBDET) detects a turn over, a speaker (SP) is caused to generate a warning sound, to thereby notify the wearer of the turn over.

The microphone (AD) acquires sound information. According to the sound information, it is possible to know an ambient environment such as "noisy" or "silent" environment. Further, by acquiring and analyzing voices of persons, face-to-face communication may be analyzed as to whether, for example, communication is active or stagnant, a conversation is mutual and equal or speech is made only on one side, or the speaking persons are angry or laughing. Further, based on voice information and acceleration information, it is possible to compensate for the loss of the meeting status which may not be detected by the infrared transmission/reception device (AB) due to standing positions of persons or the like.

From the sound acquired by the microphone (AD), both a sound waveform and a signal obtained by integrating the waveform by an integration circuit (AVG) are acquired. The signal obtained by the integration represents an energy of the acquired sound.

The three-axis acceleration sensor (AC) detects accelerations of the node, namely, motions of the node. Thus, it is possible, from the acceleration data, to analyze how hard the person wearing the terminal (TR) moves, and behaviors such as walking. Further, by comparing accelerations detected by multiple terminals (TRs), an activity level of communication, a mutual rhythm, and a mutual correlation among persons wearing the terminals (TRs) may be analyzed.

On the terminal (TR) according to this embodiment, the data acquired by the three-axis acceleration sensor (AC) is stored in the storage unit (STRG) by the sensing data storage control unit (SDCNT), and simultaneously is used by the upside/downside detection circuit (UDDET) to determine the direction of the nameplate. This detection utilizes a fact that the three-axis acceleration sensor (AC) detects two types of gravity, one of which is a change in dynamic accelerations caused by motions of a wearer, and the other of which is a static acceleration caused by the gravity of the earth.

The display device (LCDD) displays, when the terminal (TR) is worn on the chest, personal information such as the division and the name of the wearer. That is, the terminal (TR) serves as the nameplate. On the other hand, when the wearer holds the terminal (TR) by the hand, and faces the display device (LCDD) toward the wearer, the terminal (TR) is flipped vertically. At this time, based on an upside/downside detection signal (UDDETS) generated by the upside/downside detection circuit (UDDET), contents displayed on the display device (LCDD) and the functions of the buttons are switched. This embodiment shows an example in which, according to the value of the upside/downside detection signal (UDDETS), information shown on the display device (LCDD) is switched between an analysis result by an infrared activity analysis (ANA) generated by the display control (DISP) and a nameplate display (DNM).

The infrared transmission/reception unit (AB) communicates the infrared between nodes, which allows detection of whether the terminal (TR) has encountered another terminal (TR), namely, whether a person wearing the terminal (TR) has met a person wearing the other terminal (TR). For this purpose, the terminal (TR) is preferably worn by a front portion of a person. As described above, the terminal (TR) is further provided with sensors such as the three-axis acceleration sensor (AC). The sensing process on the terminal (TR) corresponds to sensing (TRSS1) of FIG. 5A.

There are provided a plurality of terminals (TRs) in many cases, which are respectively linked to near base stations (GWs), to thereby form a personal area network (PAN).

The temperature sensor (AE) of the terminal (TR) acquires the temperature of the location at which the terminal (TR) is present, and the illuminance sensor (LS1F) acquires the illuminance of the terminal (TR) in the front direction. As a result, surrounding environments may be recorded. For example, based on the temperature and the illuminance, a movement of the terminal (TR) from one location to another location and the like may be recognized.

As the input/output device adaptively employed for a wearer, the terminal (TR) includes buttons 1 to 3 (BTN), the display device (LCDD), the speaker (SP), and the like.

The storage unit (STRG) specifically includes a non-volatile storage device such as a hard disk and a flash memory, and records the terminal information (TRMT), which is a unique identifier of the terminal (TR), an interval of the sensing, and operation setting (TRMA) such as contents to be output to the display, and the like. In addition, the storage unit (STRG) may temporality record data, and is thus used to record sensing data.

The clock (TRCK) is a clock for holding the time information (GWCSD) and updates the time information (GWCSD) at constant intervals. The clock is periodically corrected by the time information (GWCSD) transmitted from the base station (GW) so as not to be deviated from that of the other terminals (TRs).

The sensing data storage control unit (SDCNT) controls, according to the operation setting (TRMA) recorded in the storage unit (STRG), the sensing interval and the like of each of the sensors, and manages the acquired data.

The time synchronization information (GWCS) corrects the clock (TRCK) by obtaining time information from the base station (GW). The time synchronization may be carried out immediately after the association to be described later, or according to a time synchronization command transmitted from the base station (GW).

When the communication control unit (TRCC) transmits/receives data, the communication control unit (TRCC) converts the data into a data format adapted to the control of the transmission interval and the wireless transmission/reception. The communication control unit (TRCC) has a wired communication function as necessary, rather than a wireless communication function. The communication control unit (TRCC) may carry out congestion control so as to prevent the transmission timing from overlapping those of other terminals (TRs).

Figure 5A:
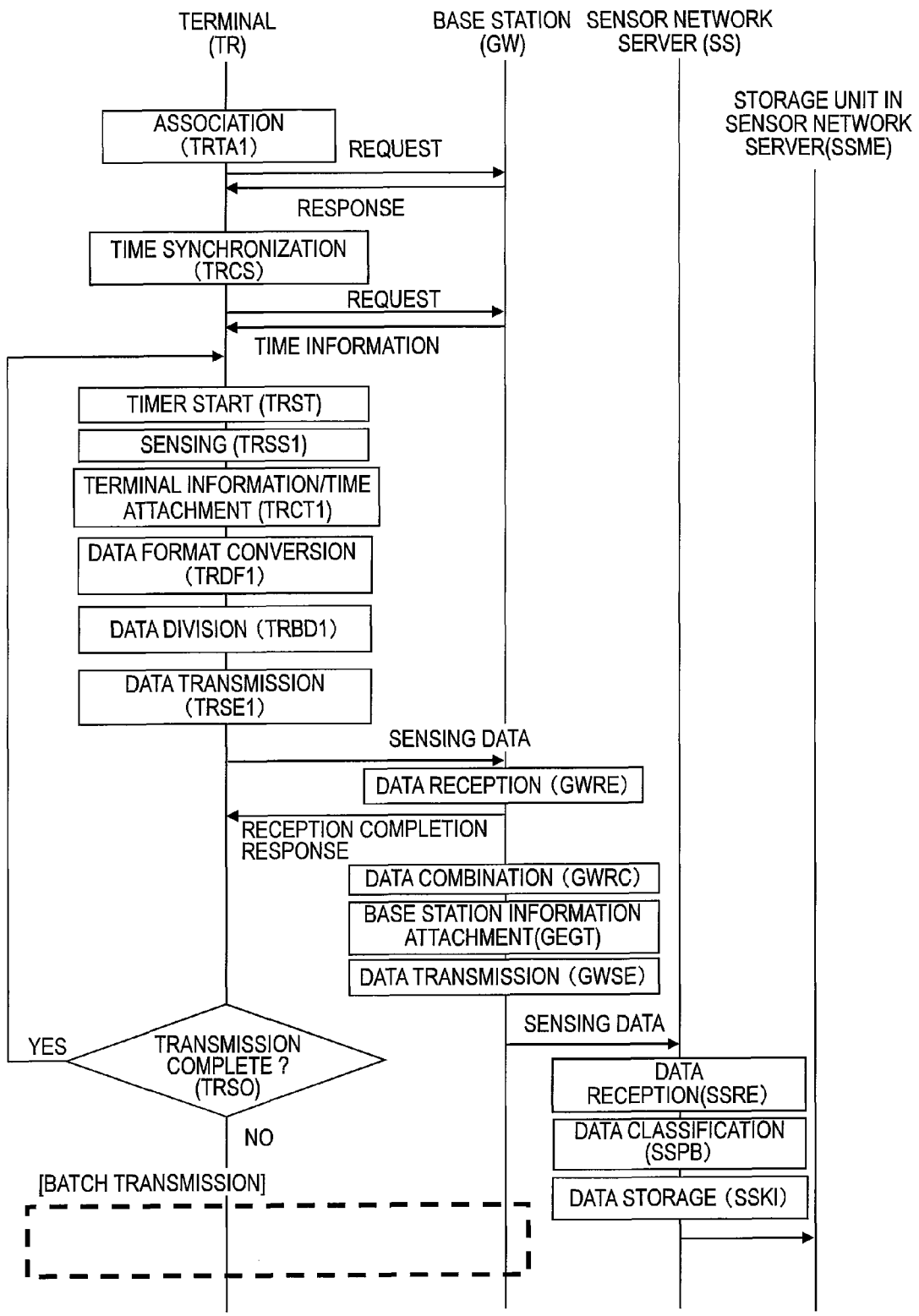
FIGS. 5A and 5B illustrate examples of a sequence until sensing data is stored in the sensor network server.
Figure 5B:
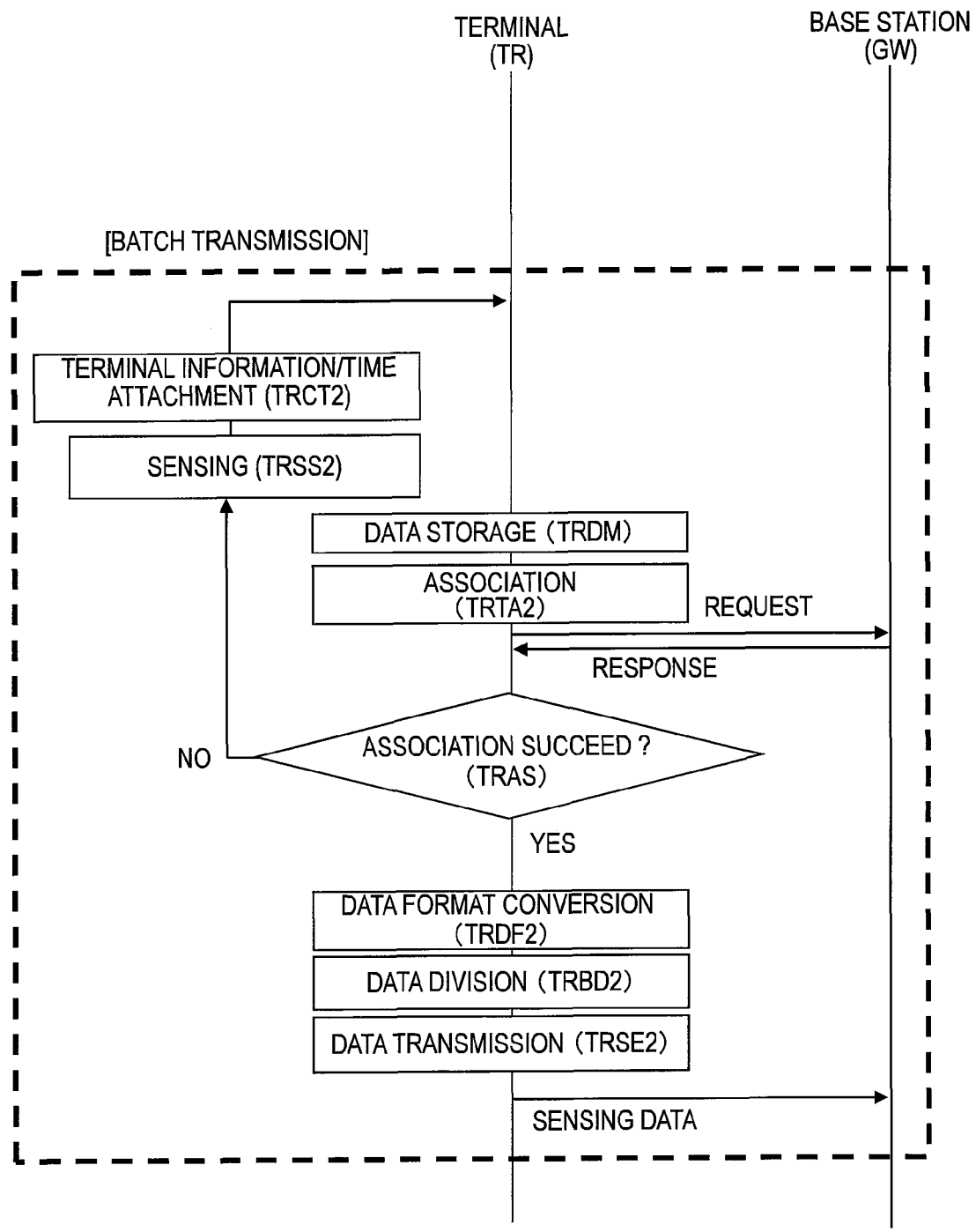

The association (TRTA) transmits/receives the association request (TRTAQ)/the association response (TRTAR), for forming the personal area network (PAN) with the base station (GW) illustrated in FIGS. 5A and 5B, to thereby determine a base station (GW) to which data is to be transmitted. The association (TRTA) is executed when the terminal (TR) is turned on, and when the terminal (TR) has moved, resulting in a disconnection in the transmission/reception to/from a previous base station (GW). As a result of the association (TRTA), the terminal (TR) is associated with a base station (GW), which is within a reach of the wireless signal transmitted from the terminal (TR).

The transmission/reception unit (TRSR) includes an antenna, and transmits/receives a wireless signal. If necessary, the transmission/reception unit (TRSR) may carry out the transmission/reception via a connector for the wired communication. Data (TRSRD) transmitted/received by the transmission/reception unit (TRSR) is transferred via the personal area network (PAN) to/from the base station (GW).

<FIGS. 5A and 5B: Data Storage Sequence>

FIGS. 5A and 5B are sequence diagrams illustrating steps of storing the sensing data carried out according to the embodiment of this invention.

First, when the terminal (TR) is turned on, and the terminal (TR) is not in association with the base station (GW), the terminal (TR) carries out the association (TRTA1). The association is to define that the terminal (TR) is in communication with one certain base station (GW). A transmission destination of data may be determined by means of the association, so that the terminal (TR) may reliably transmit data.

When the terminal (TR) receives the association response from the base station (GW), and the association is successful, the terminal (TR) then carries out the time synchronization (TRCS). In the time synchronization (TRCS), the terminal (TR) receives the time information from the base station (GW), and sets the clock (TRCK) in the terminal (TR). The base station (GW) periodically connects to an NTP server (TS), to thereby correct the time. Therefore, among all the terminals (TRs), the time is synchronized. As a result, when the analysis is later carried out, the time information accompanied by the sensing data may be referred to, to thereby analyze mutual body expressions or communication of sound information in communication occurring at the same time between persons.

Various sensors such as the three-axis acceleration sensor (AC) and the temperature sensor (AE) of the terminal (TR) are activated by a timer starting at constant intervals of 10 seconds, for example, and sense (TRSS1) the accelerations, sounds, the temperature, the illuminance, and the like. The terminal (TR) transmits/receives the terminal ID which is one piece of the terminal information (TRMT) via the infrared, so as to detect the meeting state. The various sensors of the terminal (TR) may not be activated by the timer start (TRST), and may always carry out the sensing. However, the activation at the constant intervals may efficiently use the power supply, to thereby enable a continuous use of the terminal (TR) for a long period without charging.

The terminal (TR) attaches (TRCT1), to the sensing data, the time information of the clock (TRCK) and the terminal information (TRMT). When the data is analyzed, a person wearing the terminal (TR) is identified based on the terminal information (TRMT).

In the data format conversion (TRDF1), the terminal (TR) adds the tag information such as the sensing conditions to the sensing data, and converts the sensing data into a specified wireless transmission format. This format is held in common with the data format information (GWMF) in the base station (GW) and the data format information (SSMF) in the sensor network server (SS). The converted data is then transmitted to the base station (GW).

When a large quantity of continuous data such as the acceleration data and the sound data are transmitted, the terminal (TR), by means of data division (TRBD1), limit the number of data to be transmitted at once. As a result, a risk of missing data in the transmission process decreases.

The data transmission (TRSE1) transmits the data to the associated base station (GW) via the transmission/reception unit (TRSR), in compliance with the wireless transmission standard.

When the base station (GW) receives the data from the terminal (TR) (GWRE), the base station (GW) returns a reception completion response to the terminal (TR). The terminal (TR), which has received the response, determines that the transmission completion (TRSO) has been attained.

When the transmission completion (TRSO) has not been reached after a certain period (that is, the terminal (TR) has not received the response), the terminal (TR) determines that the data transmission failed. In this case, the data is stored in the terminal (TR), and, the data is transmitted in a batch when the transmission state is established again. As a result, even when a person wearing the terminal (TR) has moved to a location at which the wireless communication is not available, or when the data is not received by the base station (GW) due to a failure thereof, the data may be acquired without disconnection. As a result, a sufficient quantity of data may be acquired, and hence properties of the organization may be analyzed. This mechanism of storing data the transmission of which has failed in the terminal (TR), and transmitting the data again is referred to as batch transmission.

A description is now given of the batch transmission. The terminal (TR) stores (TRDM) data which has not been successfully transmitted, and, after a certain period, requests the association (TRTA2) again. In this case, when the terminal (TR) receives the association response from the base station (GW), and the association has thus been successful (TRAS), the terminal (TR) carries out the data format conversion (TRDF2), the data division (TRBD2), and the data transmission (TRSE2). These processing steps are respectively the same as the data format conversion (TRDF1), the data division (TRBD1), and the data transmission (TRSE1). It should be noted that, during the data transmission (TRSE2), the congestion control is performed so as to prevent the wireless transmission from overlapping. Then, the processing returns to the normal processing.

When the successful association (TRAS) has not been achieved, the terminal (TR) periodically carries out the sensing (TRSS2) and the attachment (TRCT2) of the terminal information and the time information. The sensing (TRSS2) and the attachment (TRCT2) of the terminal information and the time information are respectively the same as the sensing (TRSS1) and the attachment (TRCT1) of the terminal information and the time information. The data acquired by this processing is stored in the terminal (TR) until the association with the base station (GW) succeeds (TRAS). The sensing data stored in the terminal (TR) is transmitted in a batch to the base station (GW) when a stable environment for the transmission/reception to/from the base station (GW) is established such as after the successful association, or during the charging within the wireless communication area.

Further, the sensing data transmitted from the terminal (TR) is received (GWRE) by the base station (GW). The base station (GW) determines whether the received data is a divided data or not based on the divided frame number accompanying the sensing data. When the data is divided, the base station (GW) carries out data combination (GWRC), to thereby connect divided data into continuous data. Further, the base station (GW) attaches (GWGT) the base station information (GWMG), which is a unique number of the base station, to the sensing data and transmits (GWSE) the data via the network (NW) to the sensor network server (SS). The base station information (GWMG) may be used as information indicating a rough position of the terminal (TR) at that time for the data analysis.

When the sensor network server (SS) receives (SSRE) the data from the base station (GW), the sensor network server (SS), in the data management (SSDA), classifies the received data into respective elements such as the time, terminal information, acceleration, infrared, and temperature (SSPB). This classification is carried out by referring to the format recorded as the data format information (SSMF). The classified data is stored (SSKI) in a proper column in a record (row) in the sensing database (SSDB). By storing data corresponding to the same time in the same record, search by the time and the terminal information (TRMT) is enabled. In this case, as necessary a table may be generated for each piece of the terminal information (TRMT).

Figure 6A:
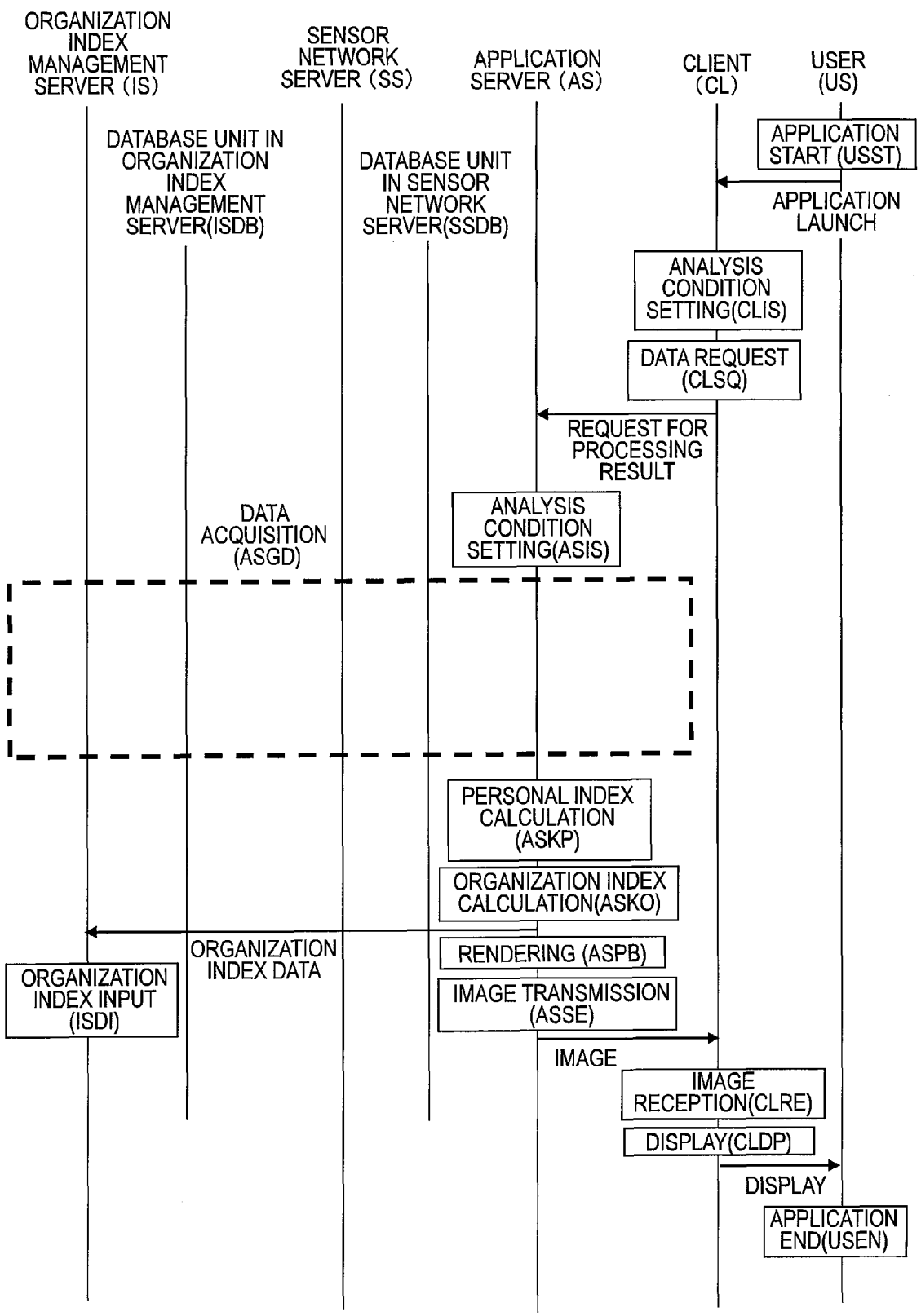
FIGS. 6A and 6B illustrate examples of a sequence from a launch of an application to a presentation of an analysis result to a user.
Figure 6B:
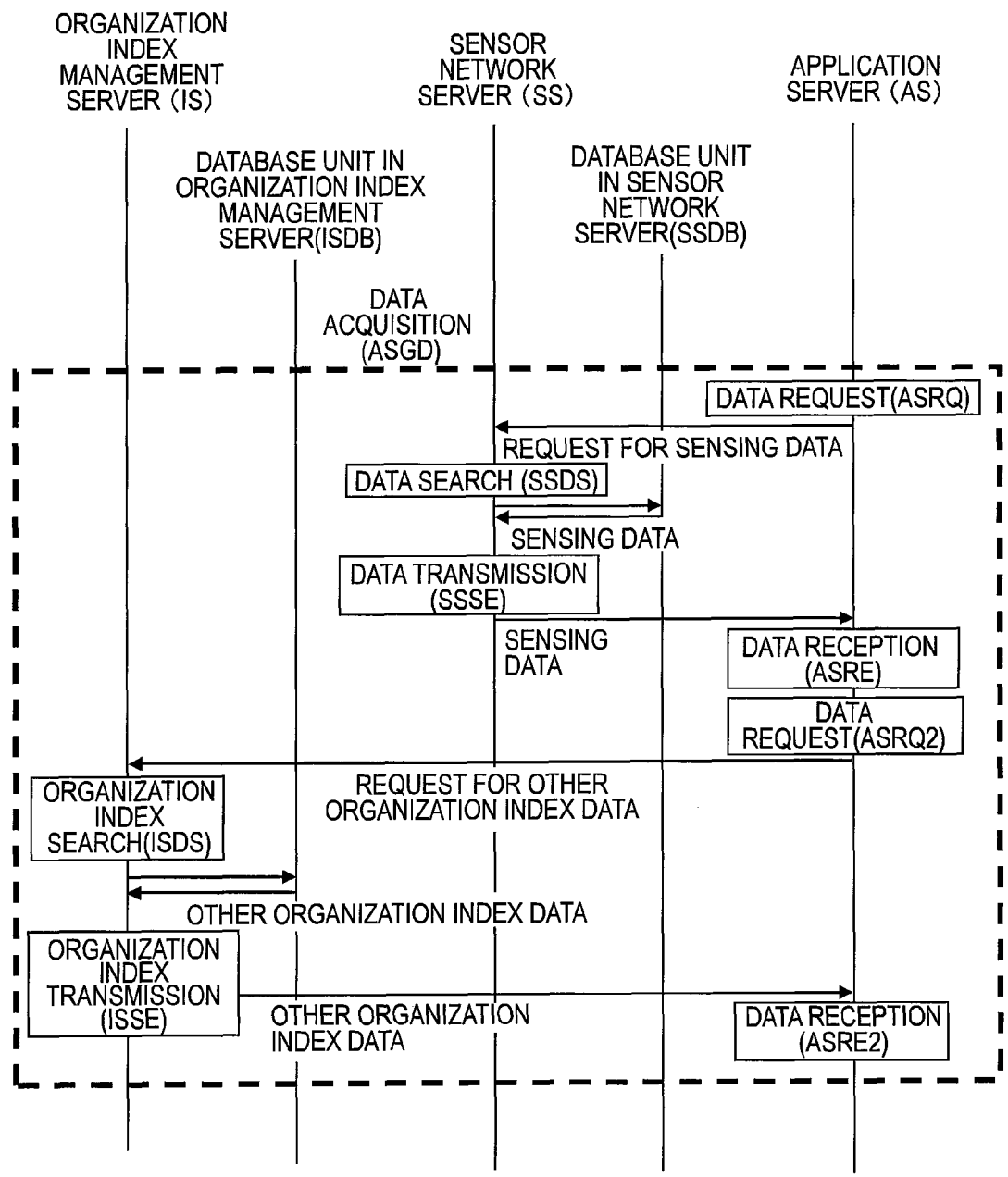

<FIGS. 6A and 6B: Sequence Diagram of Data Analysis>

FIGS. 6A and 6B illustrate the data analysis, namely a sequence in which an organization index is calculated using the sensing data, and the result is presented to the user (US).

An application start (USST) is an activation, by the user (US), of a network diagram display application in the client (CL).

In an analysis condition setting (CLIS), the client (CL) prompts the user (US) to set information required for presenting a chart. The client (CL) displays information on a setting window stored in the client (CL), or receives and displays information on a setting window from the application server (AS), and acquires, from an input of the user (US), time of data to be analyzed, terminal information, and condition setting for display mode. An example of analysis condition setting window (CLISWD) is illustrated in FIG. 7. Conditions set on this occasion are stored as the analysis setting information (CLMT) in the storage unit (CLME).

In a data request (CLSQ), the client (CL) specifies the period of the data and a member to be analyzed based on the analysis condition setting (CLIS), and requests data or image from the application server (AS). The storage unit (CLME) stores information necessary for acquiring sensing data such as the name, the address, and the like of the application server (AS) to be searched. The client (CL) generates a request command for the data, and converts the command into the transmission format intended for the application server (AS). The command converted into the transmission format is transmitted via the transmission/reception unit (CLSR) to the application server (AS).

The application server (AS) receives the request from the client (CL), sets (ASISs) the analysis conditions inside the application server (AS), and records the conditions in the analysis condition information (ASMJ) in the storage unit (ASME). Further, the application server (AS) transmits, to the sensor network server (SS), the range of the time of the data to be acquired and the ID of the terminal (TR), to thereby make a request (ASRQ) for the sensing data. The storage unit (ASME) stores information required for acquiring data signals such as the name, the address, the database name, the table name, and the like of the sensor network server (SS) to be searched.

The sensor network server (SS) generates a search command based on the request received from the application server (AS), searches (SSDS) the sensing database (SSDB), and acquires the necessary sensing data. Then, the sensor network server (SS) transmits (SSSE) the sensing data to the application server (AS). The application server (AS) receives (ASRE) the data, and temporality stores (ASSS) the data in the storage unit (ASME).

Further, when index data of other organizations are necessary for comparison, the application server (AS) requests (ASRQ2) the index data of the other organizations directly from the organization index management server (IS) or via the sensor network server (SS). The organization index management server (IS) carries out an organization index search (ISDS), and selects the required organization index data and the organization attribute information from the storage unit (ISME). The organization index management server (IS) transmits (ISSE) the acquired data, and the acquired data is received (ASRE2) by the application server (AS).

Further, when a personal index is calculated from business indices other than the sensing data such as the amount of sales, the number of patents, the number of meetings, and the like, the application server (AS) transmits, to the business information management server (GS), a time range of the data to be acquired and an ID of an organization member who is subject to the data acquisition, to thereby make a request for transmission of the business index data corresponding to the time and the ID. The business information management server (GS) carries out a business index search, selects the required business index data from the storage unit, and transmits the data, and the application server (AS) receives the data.

The flow from the data request (ASRQ) to the data reception (ASRE) in a case where index data of other organizations is not necessary, or the flow from the data request (ASRQ) to the data reception (ASRE2) in a case where index data of other organization is necessary, corresponds to the data acquisition (ASGD) in FIG. 2.

Then, in the application server (AS), processing steps corresponding to a personal index calculation (ASKP), an organization index calculation (ASKO), and rendering (ASPB) are sequentially carried out. Detailed steps of the processing are illustrated in a flowchart of FIG. 8. A program carrying out this processing is stored in the storage unit (ASME) and is executed by the control unit (ASCO), and an image is produced.

Further, the value of the organization index calculated on this occasion may be input (ISDI), along with the organization attribute information, to the organization index management server (IS).

The generated image is transmitted (ASSE), the client (CL) receives (CLRE) the image, and displays (CLDP) the image on its output device such as the display device (CLOD). Finally, in application end (USEN), the user (US) closes the application.

<FIG. 7: Analysis Condition Setting Window>

FIG. 7 is an example of the analysis condition setting window (CLISWD) displayed to prompt the user (US) to set the conditions in the analysis condition setting (CLIS) on the client (CL).

On the analysis condition setting window (CLISWD), setting for the period of data used for the analysis, namely the analyzed period (CLISPT), an analyzed organization setting (CLISPM), and an image display size setting (CLISPS) are carried out, and, further, the analysis condition setting (CLISPD) is carried out.

The analyzed period setting (CLISPT) sets dates in text boxes (PT01 to 03, PT11 to 13), to thereby specify data acquired by the terminal (TR) within this range as the subject of the calculation. If necessary, text boxes for setting a range of time may be added.

To the window of the analyzed organization setting (CLISPM), organization names and user names read from the user ID correspondence table (ASUIT) of the application server (AS) are reflected. The user (US), who carries out the settings, specifies data of which organization is analyzed by checking or clearing respective checkboxes (PM01 to PM07). Both organizations in a relationship in which one contains the other, for example, both a certain enterprise and one section thereof, may be specified. Further, some members may overlap. For this purpose, on the analyzed organization setting (CLISPM) window, the organization may be displayed in a hierarchy.

In the display size setting (CUSPS), the size of display for a generated image is specified by inputs to textboxes (PS01 and PS02). According to this embodiment, though it is assumed that an image displayed on the screen is rectangular, the image may take other shapes. The vertical length of the image is input to the textbox (PS01) and the horizontal length thereof is input to the textbox (PS02). As a unit of the input value, a certain unit of length such as pixel or centimeter is specified.

In the analysis condition setting (CLISPD), settings such as selection of an index to be calculated as the organization index (PD01 to PD05), selection of an index used for the weighting (PD11 to PD13), and selection of display mode (PD21 to PD23) are carried out. Other indices may be freely used by storing an algorithm unique to the user (US) in the analysis algorithm (ASMA).

When all the inputs have been completed, finally, the user (US) clicks a display start button (CLISST). As a result, the analysis conditions are determined, are recorded in the analysis setting information (CLMT), and are transmitted to the application server (AS).

Figure 8:
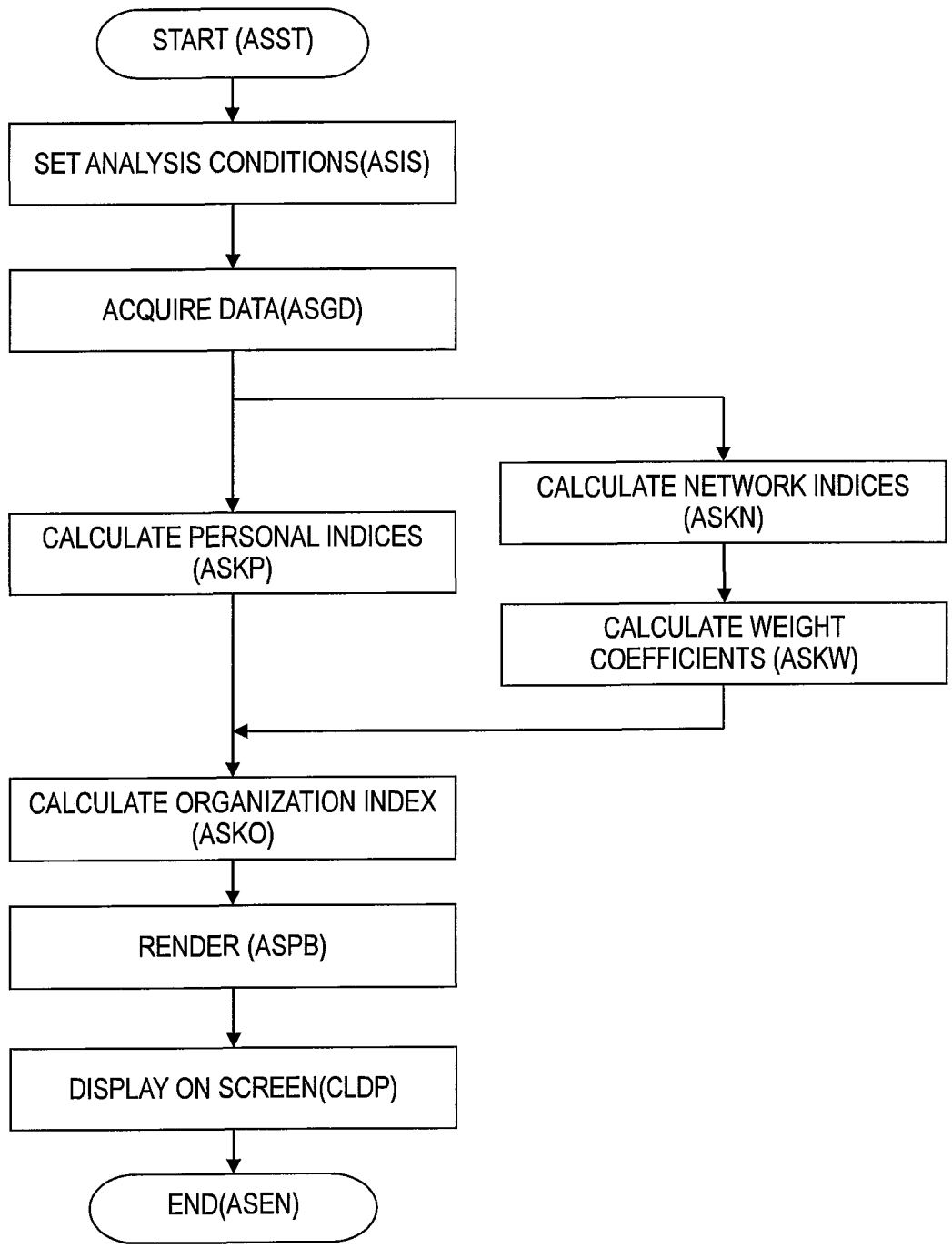
FIG. 8 is a flowchart illustrating processing carried out to calculate an organization index.

<FIG. 8: Organization Index Calculation Flowchart>

FIG. 8 is a flowchart illustrating a rough flow of the processing from the launch of the application to the presentation of the display screen to the user (US) according to the first embodiment of this invention.

After the start (ASST) of the application, the application carries out the analysis condition setting (ASIS) and then the data acquisition (ASGD). In parallel with the personal index calculation (ASKP) from the obtained data, the network index calculation (ASKN) and the weight coefficient calculation (ASKW) are carried out. In this case, when a personal index to be obtained relates to a network index, the network index calculation (ASKN) may be carried out first, and then the personal index calculation (ASKP) and the weight coefficient calculation (ASKW) may be carried out in parallel. Then, according to the obtained personal indices and weight coefficients for respective individuals, the organization index calculation (ASKO) is carried out. Then, the organization index is rendered in a graph or a chart (ASPB), and the rendered image is displayed (CLDP) on the screen to end (ASEN) the application. When the image is rendered (ASPB) to display a comparison with other organizations, other organization index data is acquired from the organization index management server (IS) in the data acquisition (ASGD), and is simultaneously displayed.

Equation 1 shows a calculation when the cohesion is selected as the index in the organization index calculation (ASKO). The organization index based on the cohesion is a sum of personal cohesions multiplied by respective weighting coefficients for all persons belonging to an organization.

Further, Equation 2 shows a calculation when the reach is selected as the weight coefficient in the weight index calculation (ASKN). The weight coefficient is obtained by dividing an individual reach by a sum of reaches of all persons belonging to an organization.

Though the description has been given of an example in which the cohesion is used as the index, and the reach is used as the weight coefficient, it is apparent that the calculation may be similarly carried out with other index and weight coefficient.

Calculation of organization index (when cohesion is used as index)

Cohesion of organization (organization index): (Equation 1)

$$C = \sum_i (w_i * C_i)$$

Cohesion of person $I$ (personal index): $C_i$

Weight coefficient of person $i$: $w_i$

Calculation of Weight Coefficient (when Reach is Used as Weight Coefficient)

Weight coefficient of person $i$: $w_i = \dfrac{R_i}{\sum_i R_j}$ (Equation 2)

Reach of person: $R_i$

<FIG. 9: User ID Correspondence Table>

FIG. 9 is an example of the user ID correspondence table (ASUIT) maintained in the storage unit (ASME) of the application server (AS). In the user ID correspondence table (ASUIT), user numbers (ASUIT1), user names (ASUIT2), terminal IDs (ASUIT3), and departments (ASUIT4) and sections (ASUIT5) to which the users belong are recorded in association with each other. The user number (ASUIT1) is a serial number assigned to an existing user. Further, the user name (ASUIT2) is a notation of the name or a nickname of the user (US) displayed when needed in an analysis result or the analysis condition setting window (CLISWD), and the terminal ID (ASUIT3) represents terminal information on the terminal (TR) owned by the user (US). The user (US) and the terminal ID (ASUIT3) basically correspond to each other in one-to-one fashion. As a result, when a client specifies an analysis subject, or an analysis is carried out at a set time, sensing data acquired from a terminal (TR) corresponding to the analysis subject may be obtained from the sensor network server (SS) and may be analyzed as information representing behaviors of the analysis subject. Further, the department (ASUIT4) and the section (ASUIT5) to which the user (US) belongs are information on the organization to which the user (US) belongs, and are information referred to when an analysis is carried out for each organization and members belonging to the organization are determined.

Though, in FIG. 9, the information on the user (US) and the organization to which the user (US) belongs is defined in the tabular form, the information may be displayed in a hierarchy using the XML or the like. In this case, the information may be represented in the organizational hierarchy such that a department A is under a corporation A and a section A1 is under the department A, and the user name and the terminal ID of persons may be described in a corresponding organization. The same person may belong to a plurality of organizations in reality, and hence a plurality of organization may correspond to a single user.

<FIG. 10: Acceleration Data Table>

FIG. 10 illustrates an example (SSDB_ACC_1002) of the acceleration data table. This table is present in the sensing database (SSDB) in the sensor network server (SS). The table is generated for each person, and acceleration data in three axes, that is, X axis (DBAX), Y axis (DBAY), and Z axis (DBAZ) are stored in association with the time information (DBTM) at a sampling cycle (every 0.02 seconds, for example). It should be noted that raw numerical values detected by the acceleration sensor may be stored, or values converted into the unit [G] may be stored. The acceleration data table is generated for each member, and the table stores the acceleration data in association with the information on the time of sensing. It should be noted that instead of providing a table for each person, the tables may be unified by adding a column indicating the user ID.

By analyzing the sensing data relating to the behavior of the user (US) based on the acceleration data table, a personal index relating to motion and psychological states, and activeness in communication of the user (US) may be calculated.

<FIGS. 11A and 11B: Meeting Table>

The sensing database (SSDB) records a plurality of types of sensing data of a plurality of members, of which FIGS. 11A and 11B illustrate examples of the table summarizing the meeting data acquired by means of the transmission/reception of the infrared. A meeting table (SSDB_IR_1002) illustrated in FIG. 11A is a table that collects data acquired by a terminal (TR) having the terminal ID of 1002. Similarly, a meeting table (SSDB_IR_1003) illustrated in FIG. 11B is a table that collects data acquired by a terminal (TR) having the terminal ID of 1003. It should be noted that, when a column for infrared-receiving-side IDs is added, it is not necessary to provide the table for each terminal (TR) from which the data is acquired. Further, other data such as the acceleration and temperature may be stored in the same table.

The meeting tables illustrated in FIGS. 11A and 11B are examples in which the tables contain ten sets (DBR1-DBR10, DBN1-DBN10) of times (DBTM) at which a terminal (TR) transmits data, infrared-sending-side IDs (DBR1), and numbers of receptions (DBN1) from the infrared-sending-side IDs. This table shows, in a case where the data is transmitted once in ten seconds, how many times the infrared has been received from which terminal (TR) in ten seconds after the previous transmission. Even when the terminal (TR) on the transmission side meets a plurality of terminals (TRs), the table may contains up to ten terminals. The number of sets may be freely set. When the meeting, namely a reception of the infrared has not occurred, the value in the table is null. Further, though the times in FIGS. 11A and 11B are indicated down to milliseconds, any format may be used for the time as long as the time is represented in a unified format.

<FIG. 12: Meeting Matrix>

A matrix indicating periods of a meeting between arbitrary members is referred to as meeting matrix (ASMM), and FIG. 12 illustrates an example thereof. The meeting matrix is referred to as adjacency matrix in the field of the network analysis. The meeting matrix (ASMM) is based on the meeting table (SSDB_IR), and total meeting times between an arbitrary combination of members are calculated, and are organized in a matrix form. In the meeting matrix illustrated in FIG. 12, an element (MM2_3) and a symmetrical element (MM3_2) show that a user having a user number 2 and a user having a user number 3 have been meeting for fifty minutes.

A file format for the meeting matrix may be a text, or each column in a database may be assigned to a combination of members. When the total meeting time is obtained from the meeting table (SSDB_IR), instead of simply summing the meeting times, values obtained by making a correction regarding to times other than actual meeting times may be summed.

The meeting matrix (ASMM) shows total values of the meeting times during a period to be analyzed, and, when the personal index and the network index for the weighting coefficient are calculated, they are calculated based on the meeting matrix (ASMM). Further, though the meeting matrix (ASMM) is a symmetrical matrix in FIG. 12, the meeting matrix (ASMM) may be an asymmetrical matrix depending on the content of the analysis.

Figure 13:
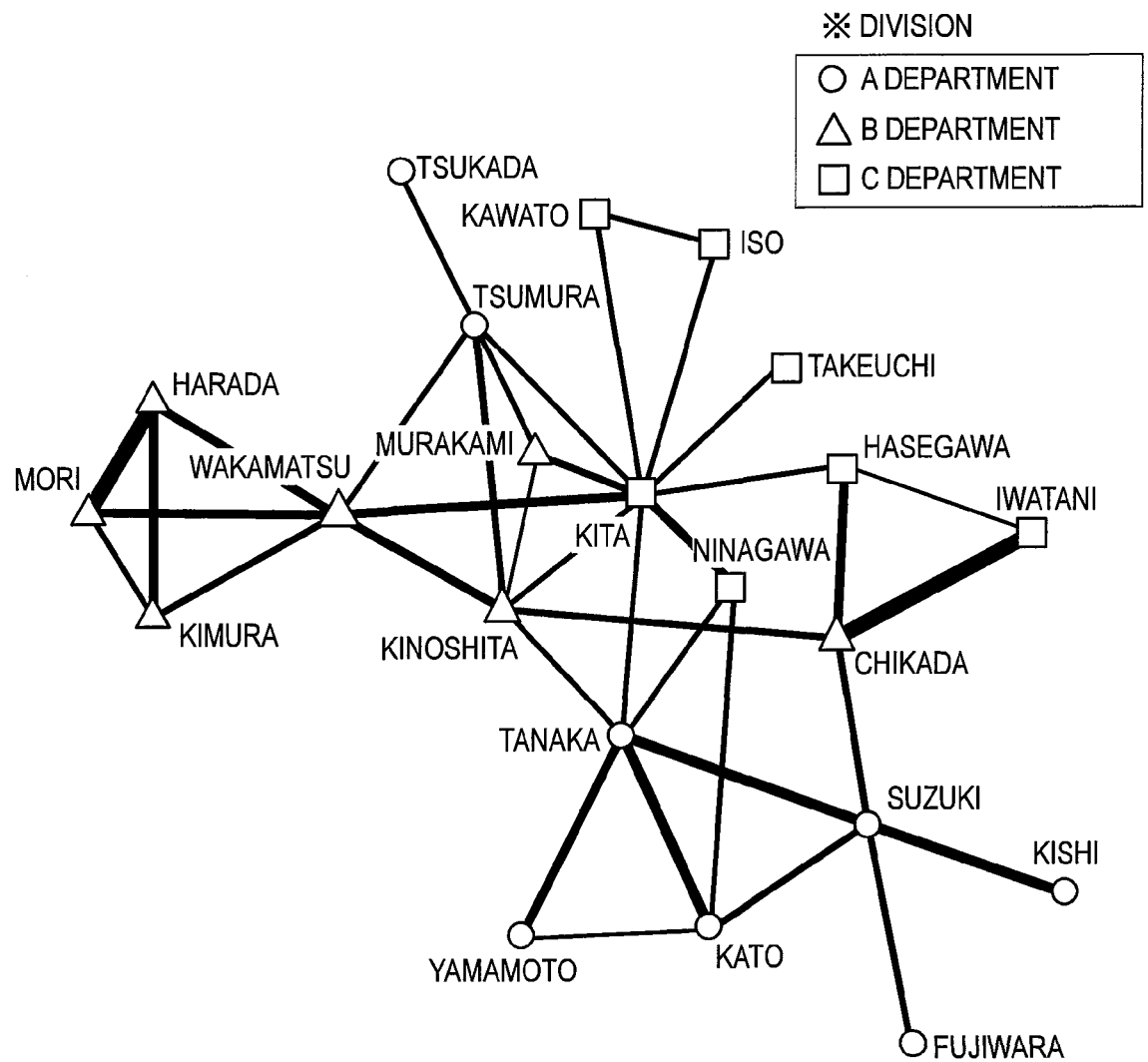
FIG. 13 illustrates an example of a network structure of an organization.

<FIG. 13: Network Diagram>

FIG. 13 illustrates an example of a network rendered based on the meeting matrix (ASMM). The network diagram is a rendering method for providing an overview of which persons communicate with each other across an organization. The method of generation may employ a publicly known method such as the spring model. A person is associated with a node, and presence/absence of communication between persons is associated with presence/absence of a link.

A network index may be directly calculated from the meeting matrix, and thus, rendering the network diagram is not essential, but is a visualization method effective for a human to understand the network structure of an organization. It should be noted that when an element of the meeting matrix is equal to or more than a set threshold, namely, meetings have continued for more than the threshold period, it is determined that a link is present between persons, which is represented as a line. For the sake of visual recognition, nodes which are connected by a link may be arranged close to each other, but the positions of the nodes are irrelevant in obtaining a network index. Whether nodes are linked to each other or not is used to calculate the network index.

The network index is calculated based on the presence/absence of a link, namely an element is equal to or more than the threshold in the meeting matrix. Examples of the network index include the cohesion, degree, reach, and betweenness, and a description is given of an overview thereof.

Figure 14A:
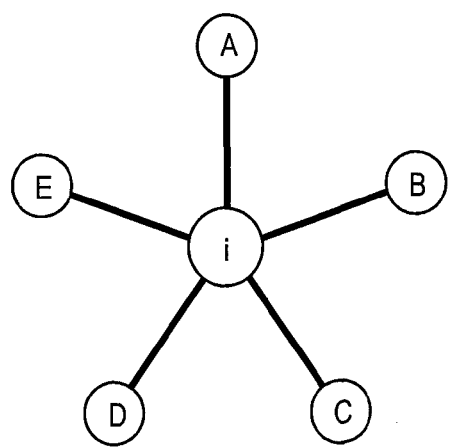
FIGS. 14A to 14C illustrate examples of cohesions.
Figure 14B:
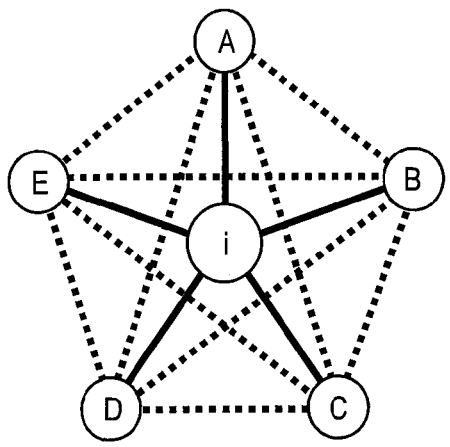
Figure 14C:
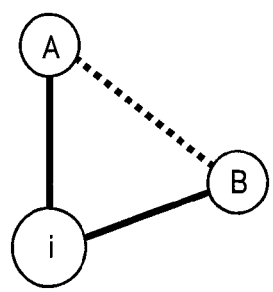

<FIGS. 14A to 14C: Cohesion>

FIGS. 14A to 14C illustrate the cohesion. The cohesion is an index indicating a degree of cooperation with a neighborhood of a person i. "A neighborhood of a person i" implies a range of persons who are directly linked to the person i in the network across an entire organization, and is referred to as "ego-centric network" of the person i in the jargon of the network analysis. FIGS. 14A to 14C are ego-centric networks of the person i extracted from a network of an organization. As illustrated in FIG. 14A, when there are no links between persons in the neighborhood of the person i, the network is the star type around the person i, and the cohesion is low. When, as illustrated in FIG. 14B, all the persons in the neighborhood are linked with each other, the network is the mesh type, and the cohesion is high.

A method of calculating the cohesion $C_i$ of the person i is represented by Equation 3. It should be noted that a degree is the number of persons linked to the person i. An indirect link refers to a link which is not directly connected to the person i. As illustrated in FIG. 14C, when the number of indirect links increases by one in the ego-centric network, the number of triangles formed by the subject person and the other two persons increase by one. In other words, the maximum number of indirect links in the ego-centric network of the person i is the maximum number of triangles which the person i may form, and the actual indirect link number Li is the number of actual triangles around the person i. Thus, the fraction Li/Li MAX of Equation 3 represents a ratio of triangles formed by the person i. Further, the cohesion Ci obtained by multiplying the ratio of the triangles by (Ni−1) and adding one thereto implies an average link number of a person linked to the person i in the ego-centric network (including the link to the person i). It should be noted that when the degree is 0 or 1, the coherence is 1.

In research by the inventors, a relationship between a temporal change in the cohesion and a quality of business reports in a certain organization was investigated, and it was found that, in synchronism with a 1.5 times increase in the coherence in half a year, a creativity index of the business reports has increased by 1.8 times. In this way, it is reported that a positive correlation exists between the cohesion and the productivity. Therefore, it is useful to use the cohesion as the index for evaluating an organization.

$$\text{Coherence of person } i\text{: } C = \frac{L_i}{L_{i\_MAX}} * (N_i - 1) + 1 \qquad \text{(Equation 3)}$$

Degree of person $i$: $N_i$

Maximum number of indirect links in ego-centric network of person $i$:

$$L_{i\_MAX} = \frac{N_i(N_i - 1)}{2}$$

Actual number of indirect links in ego-centric network of person $i$: $L_i$

<FIGS. 15A to 15C: Degree, Reach, and Betweenness>

FIGS. 15A to 15C illustrate the network indices (degree, reach, and betweenness). The degree means the number of persons directly connected by a link to a person i of interest as illustrated in FIG. 15A. A range of directly connected persons is referred to as 1 step.

Further, a reach should be described as "N-step reach" in a strict sense, and the range of steps may be freely set, and here, as illustrated in FIG. 15B, the number of persons reached in two steps is defined as reach. The reach in two steps means the number of persons reached by two or less links from the person i of interest. In other words, the degree may be called as one-step reach. The reach may be considered as a range of persons to whom information is transmitted from a certain person, or a range of persons in the neighborhood from whom information may reach to the certain person.

Further, FIG. 15C illustrates the betweenness. The betweenness is the number of cases in which, for all combinations (j, k) of persons in an network, a person i is present on a route via the minimum number of steps on the network diagram. A person in a position bridging between closely-linked clusters has a very high betweenness because the shortest line connecting persons in the different clusters always passes the person, and a person positioned at an end of a cluster or a network has a low betweenness. When there are n shortest routes between persons j and k, each of them is counted as 1/n.

In order to weight a personal index, the network index such as the above-mentioned degree, reach, betweenness, cohesion, or the like may be used. The index used for the weighting should be selected depending on what type of cooperation makes a person offering the cooperation to be considered important in an organization. When the degree is used as the weighting coefficient, a person who is in direct face-to-face communication with many persons is considered as an important person. Further, when the reach is used as the weighting coefficient, a person who is at such a position as to exert influence on many persons (in two steps) is considered as an important person. Further, when the betweenness is used as the weighting coefficient, a person who is indispensable for information transmission in an organization is considered as an important person. When the cohesion is used as the weighting coefficient, a person who is at a center of close cooperation of neighboring persons is considered as an important person.

Depending on the purpose, a network index may be freely selected. However, irrespective of the selection of the network index, as long as the network index is used for the weighting, a person in meaningful relationship with other persons is considered as important person. As a result, a person who is not in meaningful relationship with other persons and hence has a low network index may be considered to have a low degree of commitment to the organization, and is given a low weight in the calculation of the organization index. As a result, even when a personal index of a person who is essentially involved in other organization, or stays in the organization in a short period is an outlier, the outlier has small influence on the organization index. Therefore, a stable index which is hardly influenced by an outlier of a person who is less involved in the organization, and by the definition of range of members of the organization may be calculated.

<FIG. 16: Personal Index Table>

FIG. 16 illustrates an example of the personal index table (ASPI) in the storage unit (ASME) of the application server (AS). The personal index table (ASPI) stores a result of personal indices calculated by the personal index calculation (ASKP) executed by the control unit (ASCO) of the application server (AS). Though only necessary indices may be calculated, FIG. 16 illustrates an example in which many types of indices are obtained. The personal index table (ASPI) stores results (PT02 to PT07) of calculation of the personal indices for each member of a subject organization from the sensing data and the like, in association with a personal ID (PT01). Out of the obtained indices, network indices such as the degree, reach, cohesion, and betweenness may be directly used as indices or may be used for weighting other indices.

Figure 36:
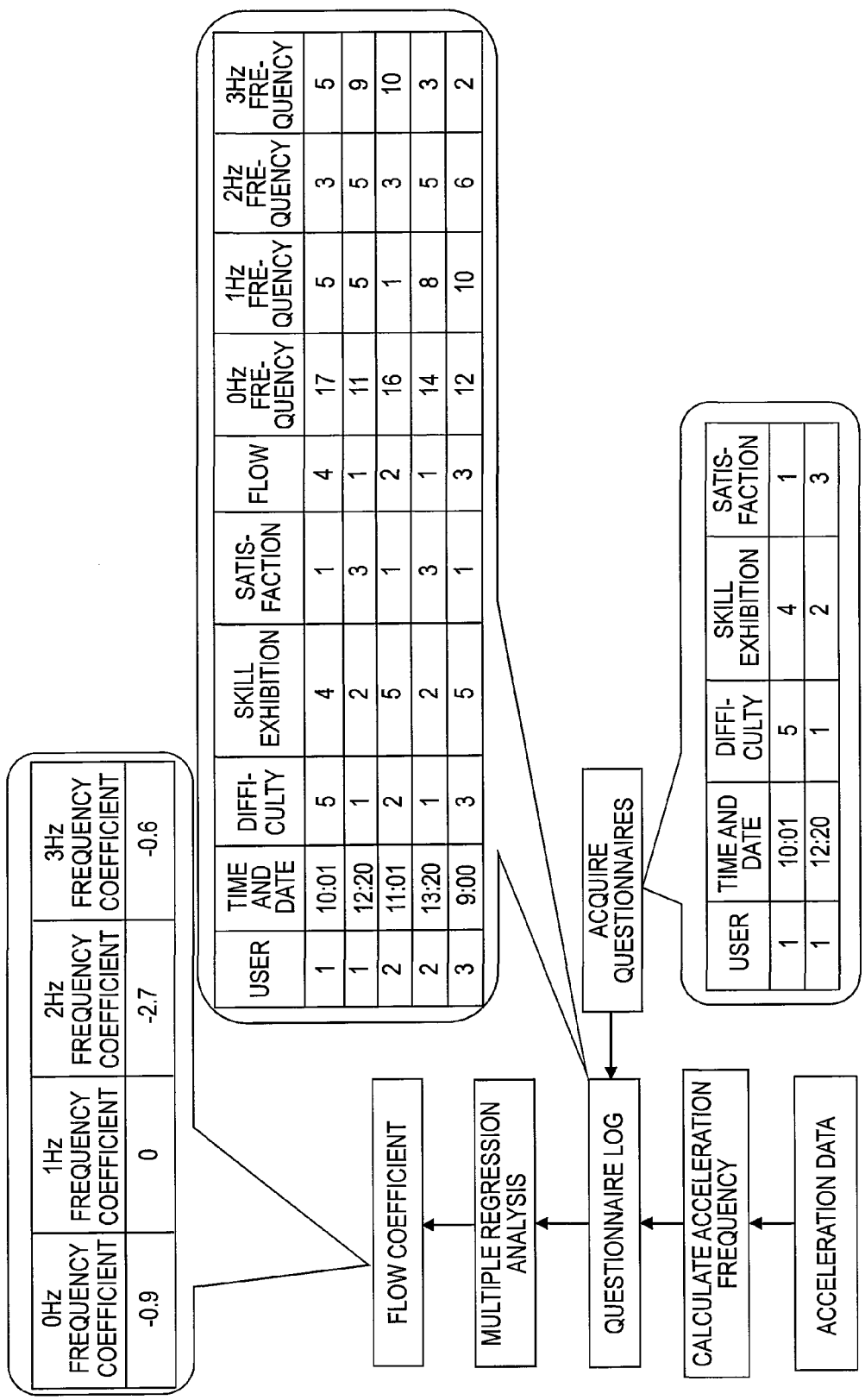
FIG. 36 is a flowchart illustrating an example of processing of calculating a flow level.

<FIG. 36: Flow Level>

A flow is a psychological term that indicates a state in which a person is exhibiting skills in a difficulty, and is considered as a good state in which a personal satisfaction and an increase in productivity may be expected. As a method of estimating the flow level of workers, difficulty and degree of skill-exhibition are obtained at a certain moment by means of a questionnaire, and when both of them are high, a flow state is considered to be present. According to the method illustrated in FIG. 36, it is possible to obtain an estimate of the flow level from the values of the sensors.

First, before an actual operation, the following processing illustrated in FIG. 36 are carried out as preprocessing, to thereby learn which behavior (frequency) increases as the flow increases. First, while the respective users are wearing the sensor nodes, during the working, answers to a questionnaire are irregularly obtained. In order to synchronize a time of reply to the questionnaire and the sensing data, a signal is irregularly output from the sensor node. For example, the sensor node generates a beep sound irregularly, and asks the users to answer the state of that moment. By recording the time when the beep sound is generated in the data acquired by the sensor node, the questionnaire and the data may be synchronized on the sensor network server (SS). A result written on the questionnaire by the user (US) is converted into electronic form manually or by means of the OCR, and then stored as a questionnaire log in the storage unit of the sensor network server (SS).

In FIG. 36, acceleration frequency calculation is performed to calculate how frequently data of the respective frequencies appear around the time of reply to the questionnaire, and the calculation result is stored along with answers to the questionnaire. For example, according to the first data in FIG. 36, a user 1 replies in data replied at 10:01 that a difficulty is 5, and a skill exhibition degree is 4. In this specification, smaller one of the difficulty and the skill exhibition degree is considered as the flow level. Then, from data around that time, frequencies of appearance of the respective frequencies are calculated and stored. Specifically, for data in a total of 30 minutes, which is 15 minutes both before and after the beep, the acceleration frequency is calculated for every minute. As a result, the number of data corresponding to 0 Hz is 17, which corresponds to 17 minutes. When this is applied to all the data of all the users, what acceleration frequency increases as the flow level becomes high may be statistically estimated. In this case, while the flow level is considered as the objective variable, and frequencies of appearance of the respective frequencies are considered as explanatory variables, multiple regression analysis is carried out. As a result, flow coefficients summarizing weights for the frequencies of appearance of the respective frequencies are obtained.

Using the flow coefficients obtained by this preprocessing, a flow level at a certain time point is calculated. Specifically, for acceleration data of each user, acceleration frequency calculation is carried out, a frequency for every one minute is determined in 30 minutes, which is 15 minutes before and after a certain time point, and a frequency distribution is obtained. It is assumed that 0 Hz appears 20 times, 1 Hz appears 5 times, 2 Hz appears 3 times, and 3 Hz appears twice. To this result, a flow level is calculated by, for each frequency, multiplying the flow coefficient representing a weight for the frequency of appearance of the frequencies, and summing the products. Specifically, a flow level is obtained $20 \times (-0.9) + 5 \times 0 + 3 \times (-2.7) + 2 \times (-0.6) + 30 = 2.7$. In this case, the last term 30 is a residual obtained when the multiple regression analysis BMKB is carried out.

When the flow level in a certain period is calculated on the application server (AS), the transmission/reception unit (ASSR) receives, from the sensor network server (SS), the acceleration data in the predetermined period, and the personal index calculation (ASKP) refers to the analysis algorithm (ASMA) stored in the storage unit (ASME) and calculates the flow level for every minute as mentioned above, for example. Then, by summing the flow levels in the predetermined period, the flow level of the predetermined period may be calculated.

<FIG. 17: Organization Index Table>

FIG. 17 illustrates an example of the organization index table (ASOI) in the storage unit (ASME) of the application server (AS). The organization index table (ASOI) stores a result of the organization indices of subject organizations calculated by the organization index calculation (ASKO) executed by the control unit (ASCO) of the application server (AS), and organization indices of other organizations for comparison acquired from the organization index management server (IS). Though only necessary indices may be stored in the table, FIG. 17 illustrates an example in which many types of indices are obtained. The data stored in the organization index table (ASOI) are obtained by weighing personal indices by a certain network index. The organization index table (ASOI) stores the organization indices (OT02 to OT07) of the analyzed organization and other organizations in association with the organization IDs (OT01s).

Figure 18A:
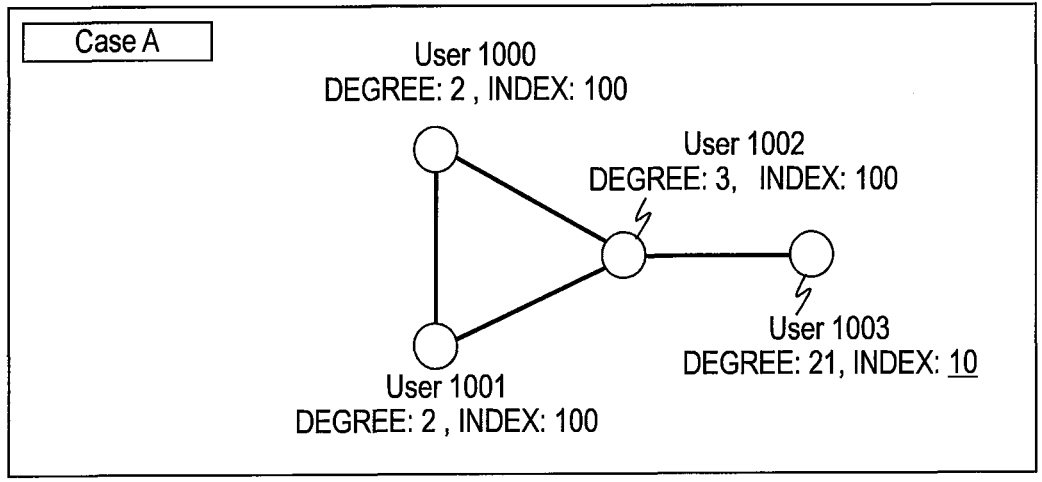
FIGS. 18A to 18C illustrate examples of a difference between an organization index obtained by weighting and an organization index obtained by variance/average.
Figure 18B:
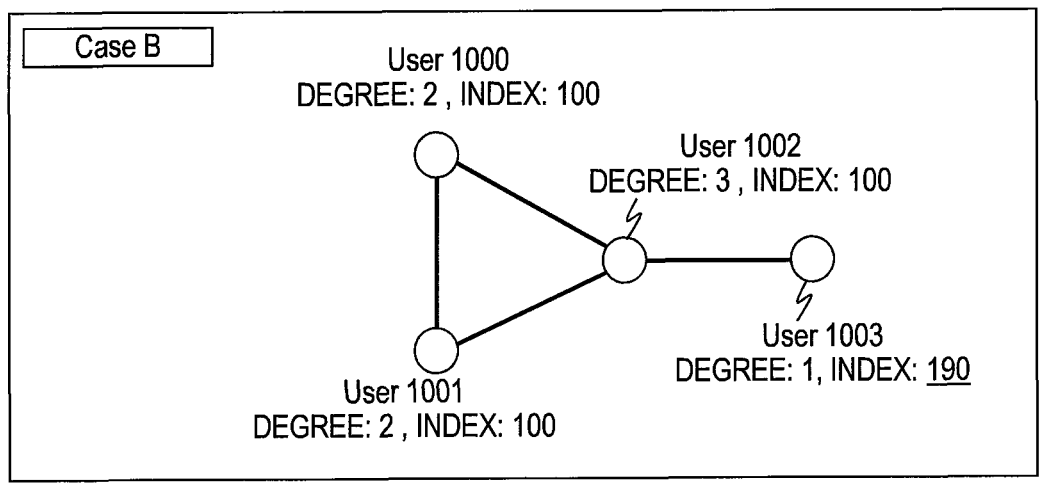
Figure 18C:
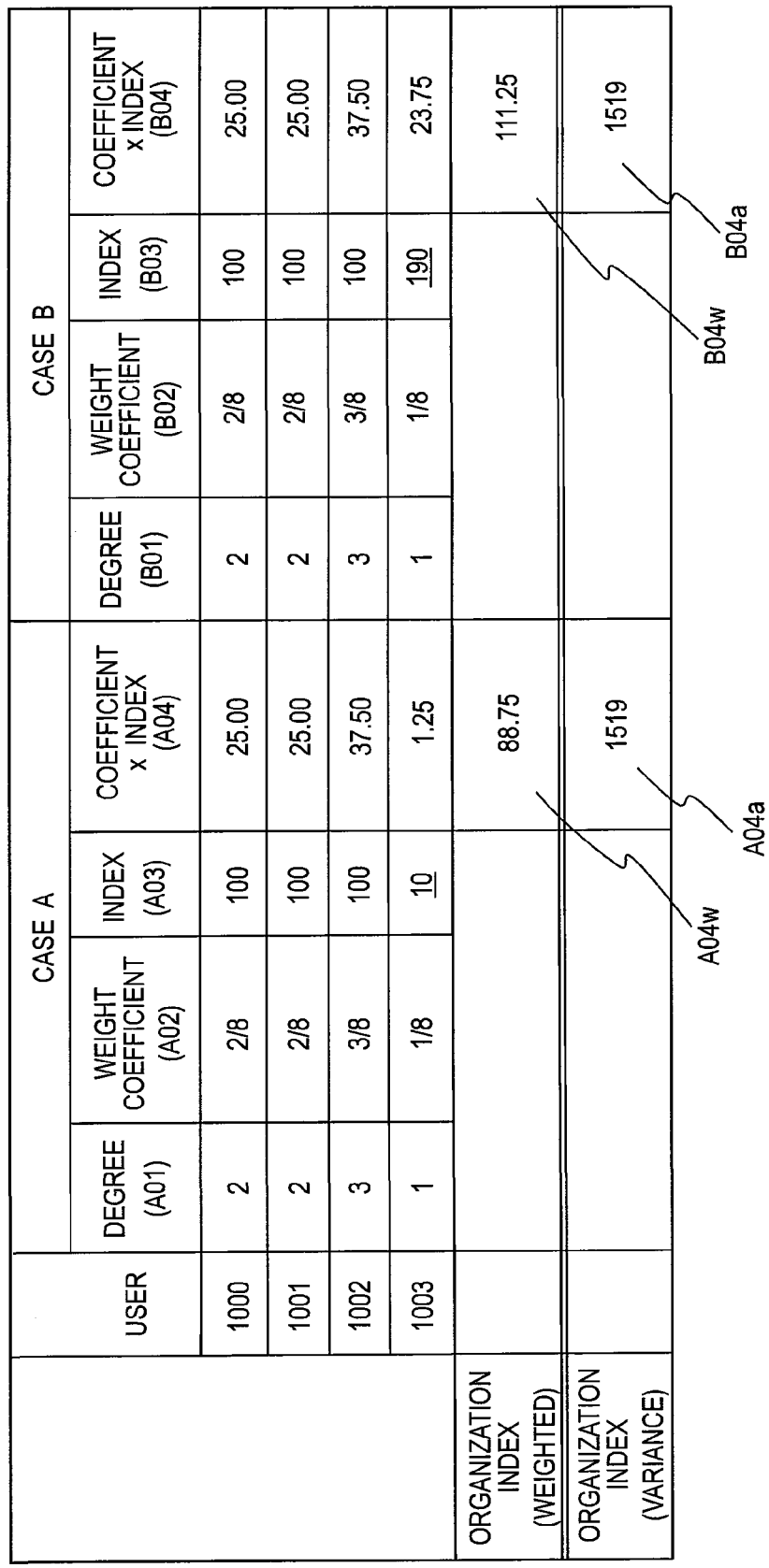

<FIGS. 18A to 18C: Effects by Weighting>

In order to describe effects of the method according to this invention, FIGS. 18A and 18B illustrate examples of two types of an organization (Case A and Case B). For the sake of description, network structures thereof are simplified, and differences between indices are set to extreme values. In FIGS. 18A and 18B, four persons (User 1000 to User 1003) belong to the organization, and, for each of the members, a personal index is obtained. This index relates to a psychological state of an individual such as the flow level. The User 1000 has a flow level of 100 and a degree of 2, and the other users are in the same state. The network structures of the four persons are the same between Case A and Case B, and these cases are different only in the value of the index of User 1003 at an end of the network. In this organization, while User 1000 to User 1002 are communicating with one another and are major players in the organization, User 1003 is connected only to one person, and does not commit to this organization so much.

In order to obtain the organization index of this organization, a description is given of a case in which the degree, which is one of network indices, is interpreted as an index indicating involvement to the organization, and the personal index is weighted by the degree. The weight coefficient (A02, B02) of the each member is obtained as in Equation 2 by dividing the degree by the sum of the degrees of all the members. A sum of values (A04, B04) each obtained by multiplying the weight coefficient by the value of the personal index (A03, B04) is the organization index (A04w, B04W) (FIG. 18C).

On the other hand, when the variance of the personal indices is set to the organization index, the values (A04a, BO4a) thereof are 1519 for both of Case A and Case B, but when User 1003 is excluded, they are 0. In other words, it is considered that, when the variance is used, the organization index is largely affected by the outlier of the unimportant person in an organization.

Further, when the average of the personal indices of all the members is set to the organization index, the values thereof are 77.5 and 122.5 respectively for Case A and Case B. When the average is used as the organization index, the difference between Case A and Case B is 45, but the difference according to this embodiment is 22.5. In other words, it is considered that the organization index based on the average is more affected by the outlier of the unimportant person in the organization. When User 1003 is defined as a non-member of the organization, both the organization index based on the average and the organization index according to this embodiment take a value of 100. However, it is difficult to determine whether User 1003 is important for the organization or not and whether the personal index of User 1003 is an outlier or not, and setting thresholds thereof may lead to an arbitrary organization index.

Thus, by the method according to this embodiment, namely by weighting the personal index by the network index, a stable organization index which is hardly influenced by an outlier of a person who is not committing to the organization so much, and is hardly influenced by a defined range of organization members may be calculated. Therefore, the reliability of the organization index increases, and thus, the organization index is effective for comparison of organization indices between organizations different in the number of persons, and a long-term time-series analysis of the same organization.

<Combination of Index and Weighting Method>

A description is now given of how to select a combination of an index used as the organization index and an index used for the weighting.

<Cohesion×Weight by Reach>

When the coherence is used as the organization index, the reach is selected by default as the index used for the weighting. This is because the cohesion is based on the network structure as illustrated in FIG. 13, and as an index used for the weighting, an index which is based on the importance in the network of an organization and has a low correlation with the cohesion is preferable. The weighting by the network index is to consider a person who has a close relationship with members in an organization as an important person in the organization, and it is considered that the cohesion of the overall organization is higher in a case in which the cohesions of such persons are higher than a case in which the cohesions are low.

Considering the degree, the reach, and the betweenness as candidates of the network index used for weighting the cohesion, distributions of these indices were investigated from data of 172 persons in an actual organization.

Figure 26A:
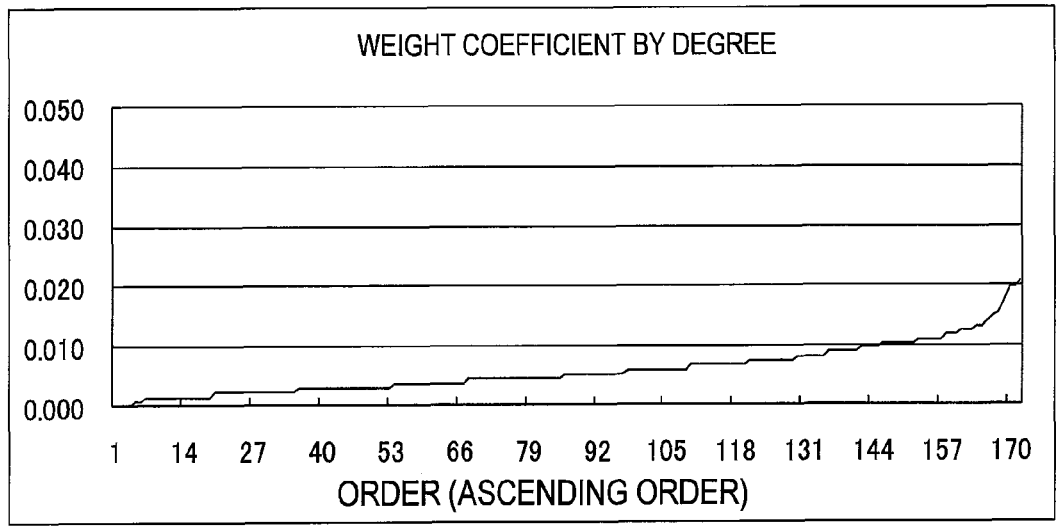
FIGS. 26A to 26C illustrate results of distribution of weighting coefficients based on the degree, the reach, and the betweenness in an actual organization.
Figure 26B:
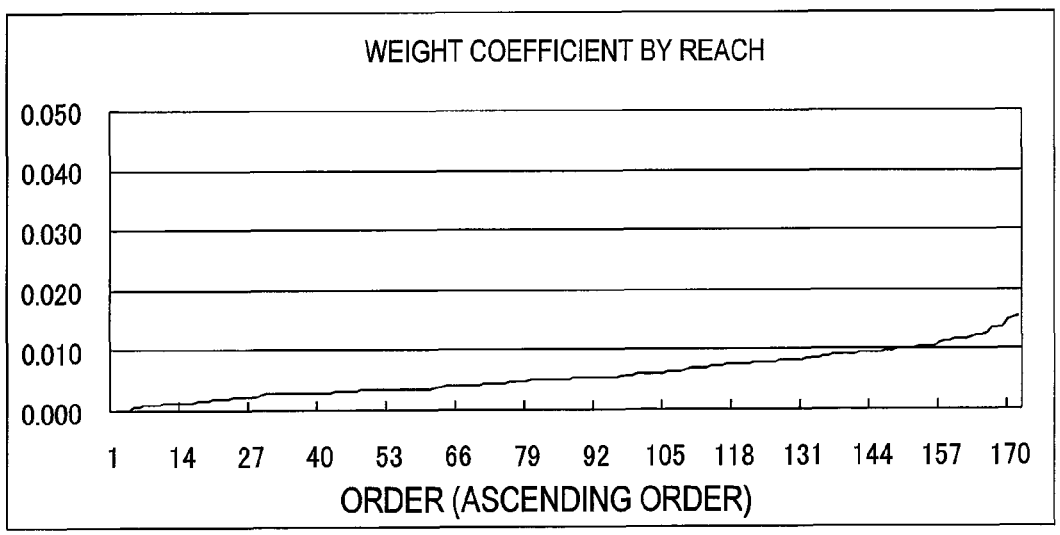
Figure 26C:
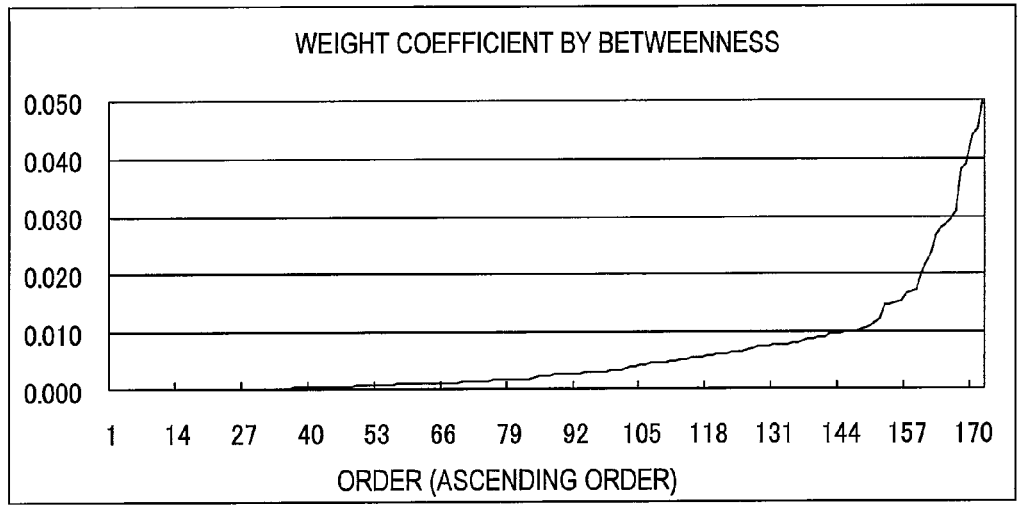
Figure 27:
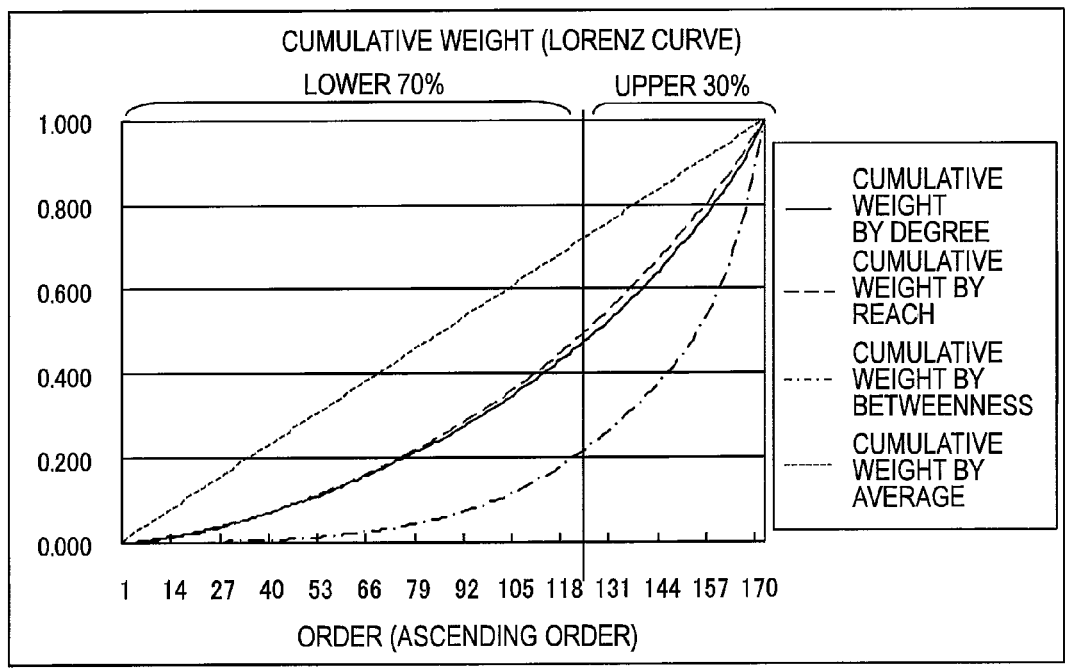
FIG. 27 illustrates a result of the distributions of the weighting coefficients based on the degree, the reach, and the betweenness in the actual organization.

FIGS. 26A to 26C illustrate the distributions when the weight coefficients are obtained respectively based on the degree, the reach, and the betweenness. In any case, the sum of the 172 weight coefficients is always one. Horizontal axis represents the orders of the weight coefficients in the ascending order. According to these graphs, while the weight coefficients based on the degree in FIG. 26A and the reach in FIG. 26B present distributions having a gentle slope, the weight coefficients based on the betweenness in FIG. 26C present a distribution having a steep slope for the 144th and subsequent weight coefficients. FIG. 27 illustrates accumulated weights in the ascending order. This cumulative graph is referred to as Lorenz curve, and as the distribution slopes more downward, the difference among the values becomes larger. When a simple average is used for the weighting coefficients, all the persons have the same value, and thus, the Lorenz curve presents a straight line. Further, for the weighting coefficients based on the degree and the reach, the Lorenz curves slope downward, and thus, members considered important have slight differences from members considered not so. Further, the Lorenz curve for the weight coefficients based on the betweenness is a large downward slope, and thus, the weights among the members have large differences. According to FIG. 27, for the members up to 120th in the ascending order (70% of the total members), the sum of the weight coefficients is only 0.2 (20%). In other words, the personal indices based on the betweennesses of the upper 30% members determine 80% of the organization index. In terms of the betweenness, while a person in the center of the network diagram has a very large value, a person at the end of the network diagram has a value of zero, resulting in this distribution presenting the extreme differences. According to a result of FIG. 27, when the betweenness is used as the weighting coefficients, the personal indices of 70% of the members are almost neglected, which is considered too extreme to be the index for evaluating an organization, and the betweenness is thus not suited as the candidate of the weight coefficient.

Figure 28:
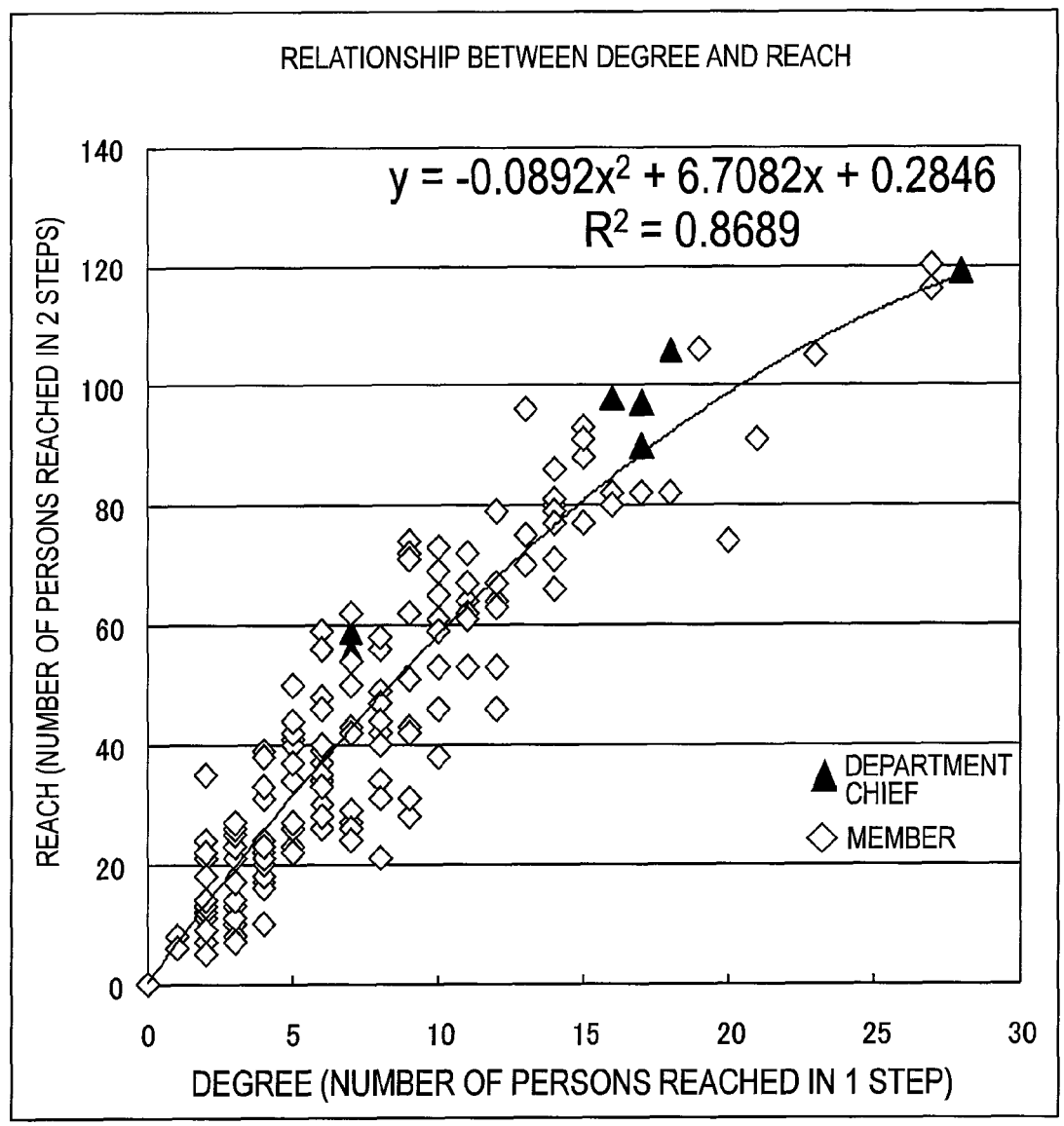
FIG. 28 illustrates a result of distributions of the degree and the reach in an actual organization.

Now, which of the degree and the reach more properly reflects a degree of involvement in an organization is studied. For this purpose, FIG. 28 illustrates a scatter diagram in which the degree and the reach of the each member are assigned to the both axes in the same organization illustrated in FIGS. 26A to 26C and FIG. 27.

As an example of a person who is strongly involved in an organization, data of department chiefs, who are mangers of the organization, are referred to. In FIG. 28, from an overall distribution, it is recognized that the degree and the reach have a strong correlation. This is because the degree may be considered as the reach limited to one step, hence the degree and the reach are indices having the same significance, and are different only in domain of definition. Further, even for a person having a very high degree, the reach thereof is peaked at around 120 persons. This means that, in the network, approximately 50 persons out of the total 172 persons are at locations at which information is not easily reached in two steps. As a result, the distribution of the degree and the reach of FIG. 28 is approximated by a second-order function having the gradient becoming milder rightward. An approximate curve is illustrated in a line in FIG. 28. In the distribution of FIG. 28, seven department chiefs are distributed at three locations where the degree and the reach are high, low, and medium. However, what is common to all of them is that they are above the approximate curve. This means that compared with a distribution of the other members, the department chiefs occupy positions in the network at which the reach is high with respect to the degree. While the degree does not increase unless a person himself or herself directly converses with members, the reach increases when members with whom the person has directly conversed further converse with many other members. In other words, it is interpreted that the department chief, who is often busy, may widely transmit/collect information by selecting and efficiently communicating with key persons who are linked to many members in the organization, without directly conversing with many members. This characteristic may be found as well in other organizations. Based on these tendencies, it is considered that the reach rather than the degree more properly reflects the degree of the influence imposed on the organization, and hence the reach is used as the weight coefficients for obtaining the cohesion.

<Flow Level×Weight Base On Residence Time>

Further, when the flow level is used as the organization index, in an initial setting, a residence time is selected as the index used for the weighting. The flow level is data relating to minor motions of the body, which serves as, for example, an index obtained by acquiring characteristic values from the sensing data of the acceleration, and an index representing an absorbed psychological state. According to the flow level, an organization which has many members who enjoy and are absorbed in working is considered as a good organization, and the organization index thereof is then calculated. In this case, basically, the user (US) is wearing the terminal (TR) only in a period when the user (US) is in the office, and hence the flow level of the individual thus calculated is an index reflecting a psychological state in the office. Therefore, even when a person who hardly stays in the office reaches a high flow level during a short staying period, it is hard to say that the flow level is high from an organizational point of view. When the organization index is calculated by averaging flow levels, which are personal indices, the index of a person having a short residence time and that of a person having a long residence time are treated equally. Thus, by weighting the flow level by the office residence time of each member, the flow level of the organization, namely, whether members enjoy working in the organization may be evaluated.

In order to calculate the residence time of an individual, data in the acceleration data table (SSDB_ACC) or the meeting table (SSDB_IR) is used. A table storing other sensing data may be used. The terminal (TR) determines whether the terminal (TR) is inserted into a charger or not by means of the external power supply connection detection circuit (PDET), and when the terminal (TR) is inserted, the terminal (TR) does not carry out sensing using the sensors. Namely, on various data tables, data at this time is not present. Using this fact, in a table such as the acceleration data table (SSDB_ACC) of FIG. 10, the residence time per day is calculated by referring to the time (DBTM). In this case, due to an error on the transmission, data corresponding to one row may be missing, and hence, as long as data is stored once in each divided period of for example, five or ten minutes, which is longer than the sensing interval, it is considered that the wearer was in the office, and processing is carried out accordingly. Further, there may be a state where the terminal (TR) is not worn by the user (US), and is not inserted into the charger. For example, this is the case in which the user (US) has left the terminal (TR) on a desk and has gone home. In order not to count this case as a residence time, by referring to the acceleration data table (SSDB_ACC), in a divided period of, for example, five or ten minutes, which is longer than the sensing interval, an acceleration rhythm is obtained. When the acceleration rhythm is equal to or less than a certain value, namely, the terminal (TR) is hardly vibrating, processing is carried out so as not to count this period as the residence time. This utilizes a fact that a state in which a human wears the terminal (TR) while the terminal (TR) hardly vibrates seldom occurs.

In this way, an implementation may be provided as illustrated in FIG. 7, in which a user (US) does not select the index for weighting, but the reach is automatically selected when the personal index is the cohesion in consideration of the actual state of the organization, and, using weight coefficients calculated from the reach, the organization index is calculated. Further, an implementation may be provided, in which, when the personal index is the flow level, the residence time is automatically selected, and, using weight coefficients calculated from the residence time, the organization index is calculated. As a result, based on the cohesion and the flow level having a positive correlation with the productivity of an organization, stable indices which are hardly influenced by outliers of persons who are not much involved in the organization, and are hardly influenced by a defined range of members of the organization may be calculated.

<FIGS. 19 to 25: Examples of Applications>

FIGS. 19 to 21, and 23 to 25 illustrate examples of an application for displaying an organization index as the result of the calculation.

Figure 19:
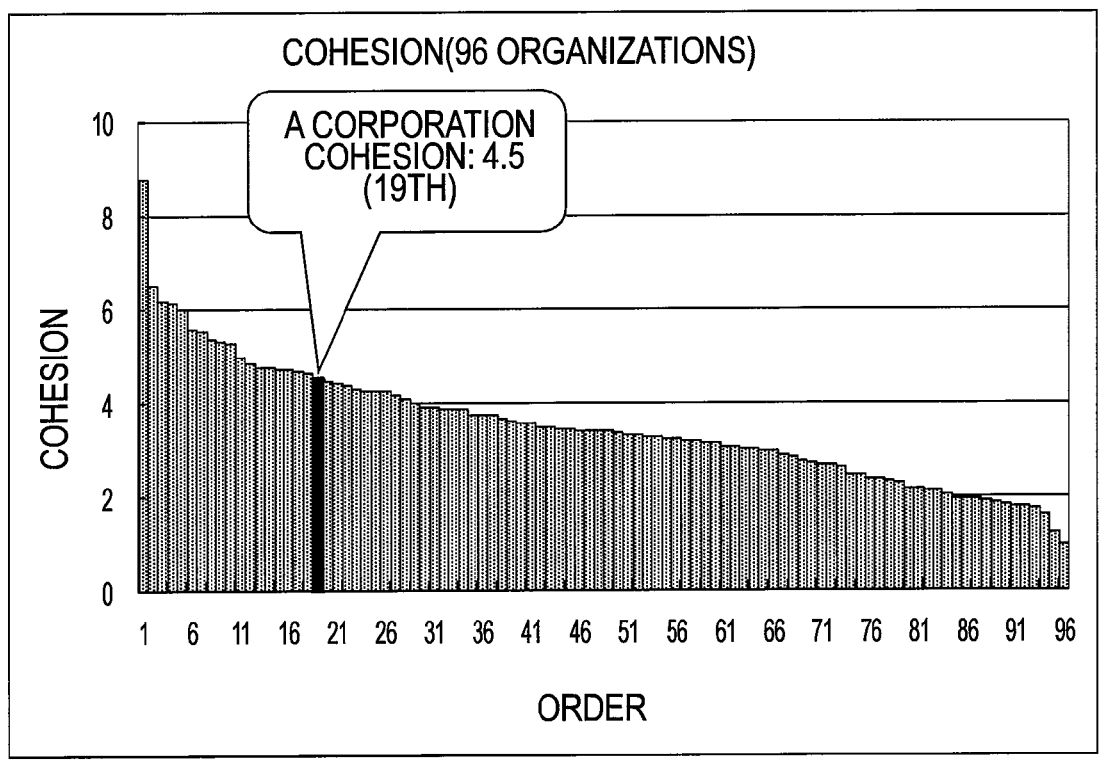
FIG. 19 illustrates an example of a display of organization indices.

FIG. 19 is an example displayed as a bar chart on the display device while the organization index (cohesion in this example) is compared with the organization indices of other organizations acquired from the organization index management server (IS). The cohesion is assigned to the vertical axis, the order is assigned to the horizontal axis, the organizations are arranged in the descending order of the cohesion, and a symbol indicating the subject organization is plotted on the bar chart, to thereby indicate the relative location of the subject organization. In this bar chart, indices of a plurality of organizations in a hierarchy, such as an index of an entire corporation A and an index of a department A, which is one division of the corporation A, may be present as indices of independent organizations. By this display method, comparison with other organizations may be realized, to thereby enable a quantitative analysis of relative strength and weakness of the organization.

Figure 20:
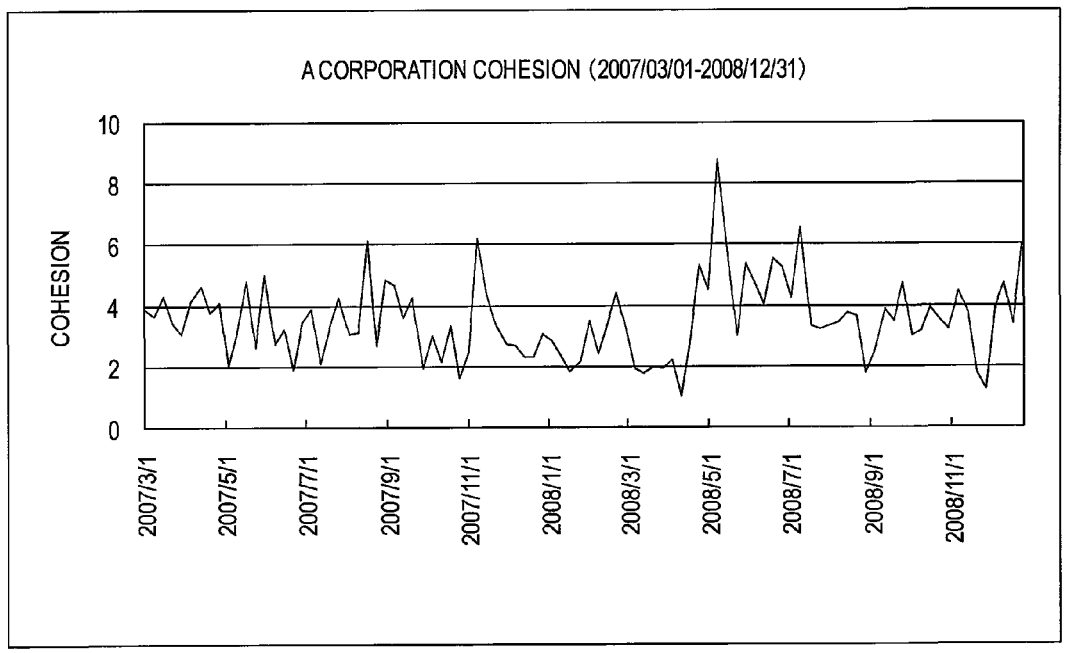
FIG. 20 illustrates an example of a display of an organization index.

FIG. 20 is an example displayed as a line chart showing an organization index (cohesion in this example) as a time-series change in the same organization. The weighting is applied based on the network index, and thus, even when the number of members in the organization and a definition of the members change, for example, when a personnel change is made, the organization may be considered as remained the same, and may be continuously analyzed. This chart is effective for collating the organization index and events in the organization, analyzing what event causes an increase in organization index, and planning improvement measures for increasing the organization index.

Figure 21:
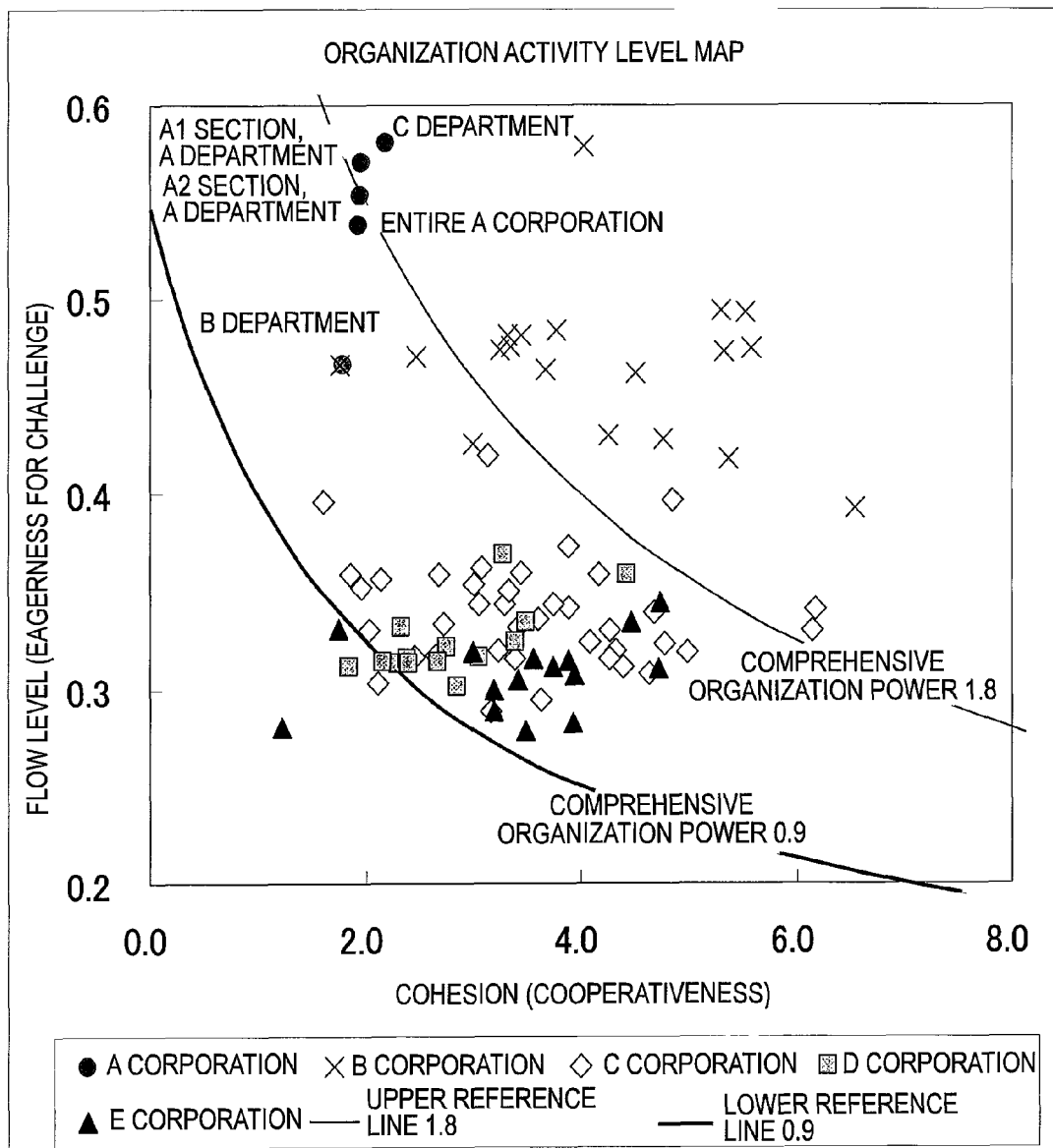
FIG. 21 illustrates an example of a display of organization indices.

FIG. 21 is an example of a two-dimensional map where two types of organization index are assigned to both the axes, and data on a plurality of organizations are mapped as a scatter diagram. In this example, as the organization indices, the cohesion is assigned to the horizontal axis, and the flow level is assigned to the vertical axis. The flow level is data relating to minor motions of the body, which serves as, for example, an index obtained by acquiring characteristic values from the sensing data of the acceleration, and an index closely related to an absorbed psychological state. The cohesion represents a properness of a cooperating structure in the organization, and the flow level represents how much members of the organization are challenging and are absorbed in a new task. In an organization high in both of them, abilities of individuals are maximally exerted by being absorbed in the task, to thereby promote a growth thereof, and the proper cooperation promotes proper circulations of knowledge in the organization, and generation of new knowledge. Thus, by the scatter diagram having the two types of organization index for which a higher value is desirable assigned to both the axes, strengths and weaknesses of a subject organization may be compared with those of other organizations, and may be recognized relatively.

In the example illustrated in FIG. 21, one corporation and organizations under this corporation (departments, sections, and teams) are respectively plotted as individual organizations. It should be noted that organizations belonging to the same corporation are plotted as the same symbols. According to this result, the corporation A is high in flow level and low in cohesion compared with other corporations. In other words, it is recognized that though abilities of individuals are exerted, a cooperation in the organization is not properly provided. Further, in the corporation C, though many organizations are high in cooperativeness, the flow levels thereof are not high. It is suspected that the communication is too frequent for individuals to have chances of working with concentration. Further, the corporation B is high both in cohesion and flow level, and is evaluated as an organization in which a well-balanced proper management is provided.

In this way, it is possible to generate a new comprehensive index based on two independent indices for both of which a higher value is desirable, and to treat the new index as the organization index along with other organization indices. For example, in the example of FIG. 21, a hyperbolic curve is rendered to adapt to the distribution of the organizations. When the index combining the flow level and the cohesion is referred to as "comprehensive organization power", it is expressed as:

Comprehensive organization power=(Cohesion+α)*
(Flow level+β)(α,β:constants)

It is possible to render a line on which the comprehensive organization power is constant in the map. As a result, it is possible to find an organization high in index combining two axes, to further analyze the organization as a preferable example of organization management, and to utilize the analysis for improving management of other organizations.

Figure 22:
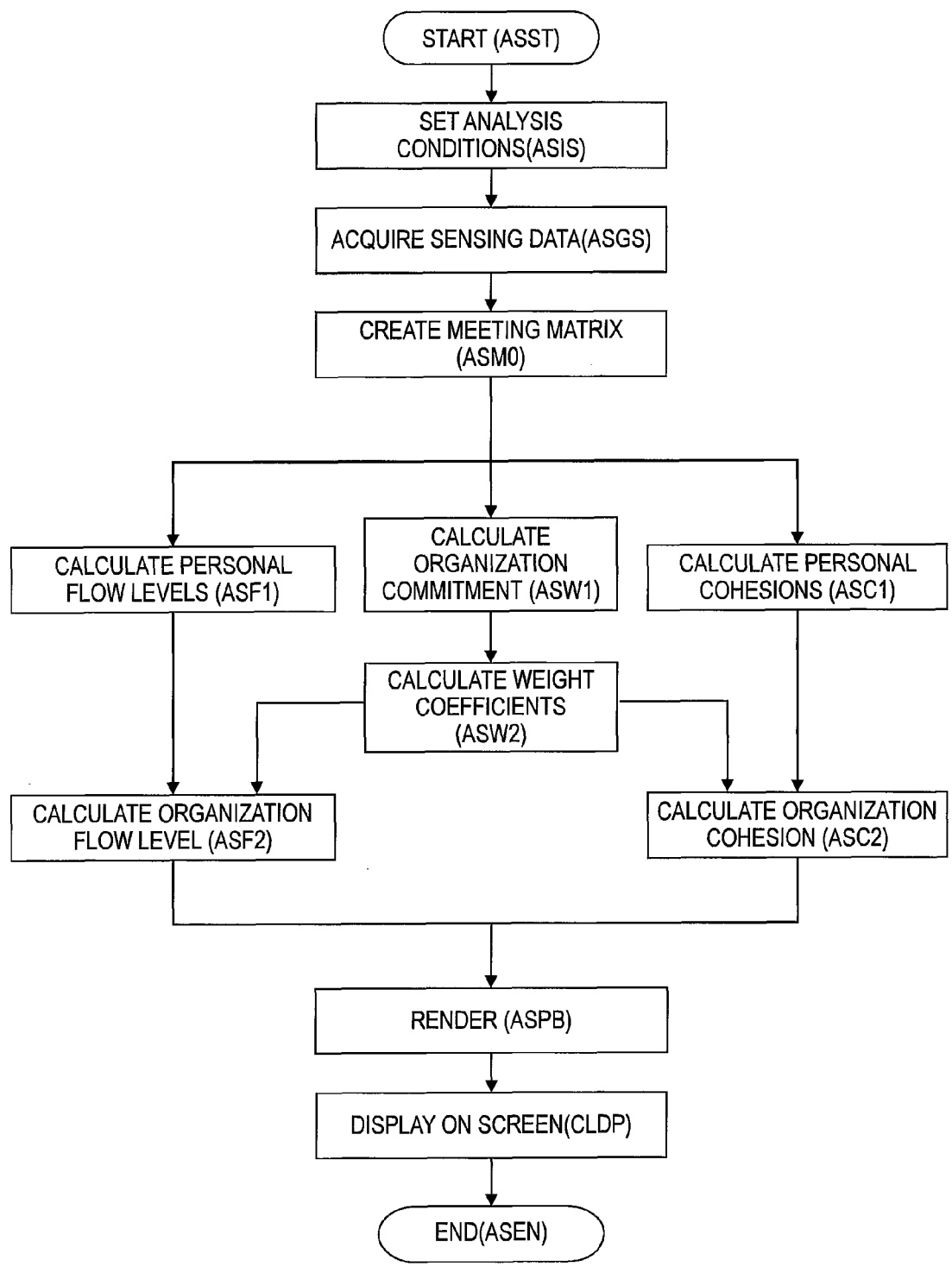
FIG. 22 is a flowchart illustrating an example of processing carried out to display organization indices.

FIG. 22 illustrates a flowchart for generating the two-dimensional map of the organization indices of FIG. 21. This example shows a case in which, as the organization indices, the cohesion and the flow level are used, and, for the weighting, the reach is used for the cohesion, and the residence time is used for the flow level. Though general steps for calculating the indices are the same as those of FIG. 8, in order to calculate the two types of organization index, three types of processing are carried out in parallel, such as a personal cohesion calculation (ASC1), a personal flow level calculation (ASF1), and a weight coefficient calculation (ASW2). Then, using the obtained weight coefficients, an organization cohesion calculation (ASC2) and an organization flow level calculation (ASF2) are carried out. Network indices used for the weight coefficients are preferably the same as those for the two types of organization index. This is because using difference indices results in different interpretations of organization indices.

As an overall flow, after a start (ASST), analysis conditions are set (ASIS). Though the method of setting is the same as that carried out using the analysis condition setting window (CLISWD) of FIG. 7, in the analysis condition setting (CLISPD), selecting the two types of organization index is necessary. Then, in a sensing data acquisition (ASGS), sensing data used for calculating the cohesion and the flow level and data on the cohesions and the flow levels of other organizations are acquired. Then, based on the meeting data, the meeting matrix (ASMM) is generated (ASMO). In the personal flow level calculation (ASF1), from the acceleration data, the characteristic values are calculated for the individuals, to thereby obtain values of personal flow levels. In the personal cohesion calculation (ASC1), from the meeting matrix (ASMM), an ego-centric network is extracted around each individual, to thereby calculate the cohesion. In an organization commitment index calculation (ASW1), based on the meeting matrix (ASMM), the reach is calculated by counting the number of persons reached in two steps from each individual. Further, from the meeting table or the acceleration data table, the residence time in the office is calculated for each individual. Further, based on the reach and the residence time of the individual, the weight coefficient of the each member is calculated (ASW2). Using the weight coefficients, processing of the organization flow level calculation (ASF2), and processing of the organization cohesion calculation (ASC2) are carried out, to thereby obtain values corresponding to both the axes of the two-dimensional map. Then, in a rendering (ASPB) for visualizing the organization indices, the values and the data on the other organizations acquired from the organization index management server (IS) are plotted, are displayed on the screen (CLDP), and the processing ends (ASEN).

Figure 23:
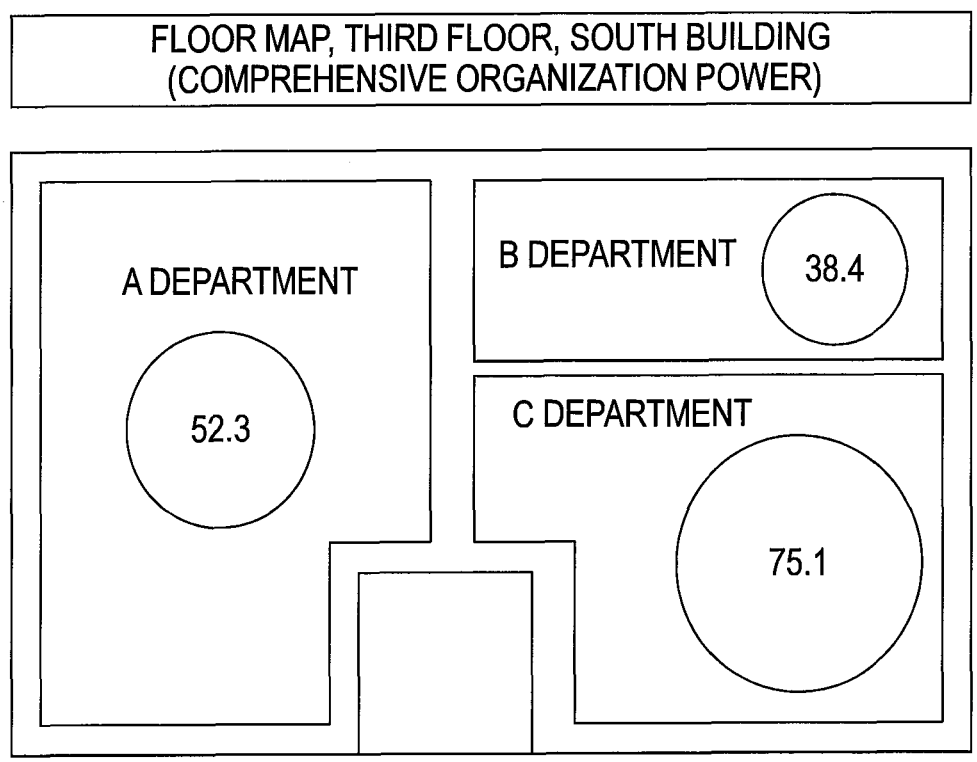
FIG. 23 illustrates an example of a display of a comprehensive organization power.

FIG. 23 illustrates an example of a comparison of organization indices (comprehensive organization powers in this example) among a plurality of organizations in association with a map of a floor on which an office of these organizations exists. The floor map of the office is stored in advance in the storage unit (ASME) of the application server (AS). In the rendering (ASPB), by associating the organization indices stored in the organization index table (ASOI) and the floor map, the values of the indices represented by circles having a larger size may be displayed on the display device (LCDD) as the index of the organization becomes higher. Persons relating to an organization often recognize a division of interest while the division is associated with the office arrangement, and thus, this method enables the persons to more intuitively recognize the organization index of the division of interest. Further, according to the size of the circle, differences among the divisions may be easily recognized. In addition to the floor map, organizations may be mapped to their locations on maps of a plurality of floors, a map of an entire building, and maps of Japan and the world.

Figure 24:
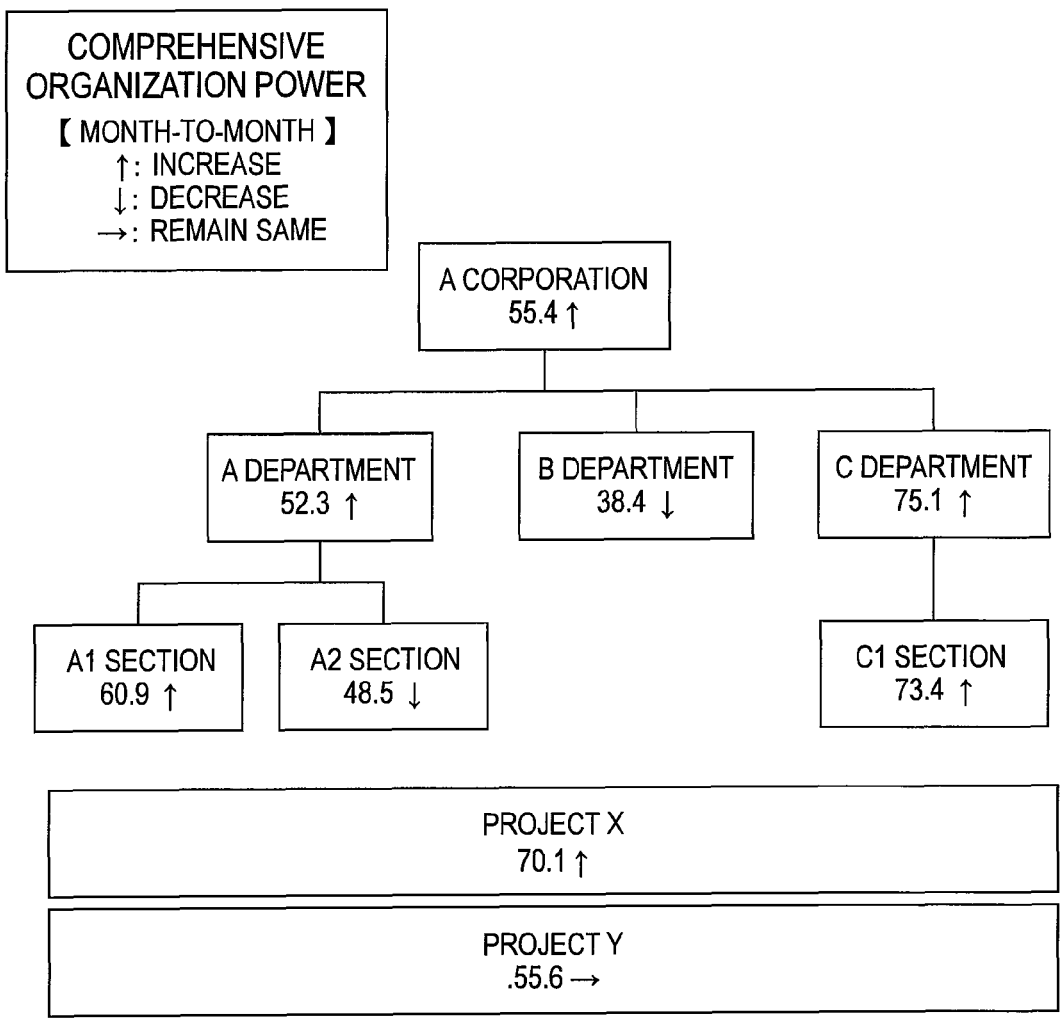
FIG. 24 illustrates an example of a display of the comprehensive organization power.

FIG. 24 illustrates an example in which organization indices (comprehensive organization powers in this example) of a plurality of lower organizations under one corporation are associated with a hierarchical organization diagram. Data representing the organization structure is stored in advance in the storage unit (ASME) of the application server (AS). In the rendering (ASPB), by associating comprehensive organization powers in a predetermined period stored in the organization index table (ASOI) and data indicating the organization structure, changes of the comprehensive organization powers may be displayed on the display device (LCDD) along with the hierarchical organization diagram. By this display, it is possible to calculate the organization indices respectively for the upper organizations and lower organizations as independent organizations. By associating the indices to the organization diagram per organization, the indices are viewed while the relationships among the organizations are naturally recognized. Cross-division projects in which members from various divisions are gathered are displayed at a bottom portion of FIG. 24. In the example illustrated in FIG. 24, in addition to the values of the organization indices in a period of the analysis, arrows are used to show changes from those of the previous month. Based on these arrows, divisions currently having an increased organization index, those currently having a decreased organization index, and those currently having the same organization index are recognized.

Figure 25:
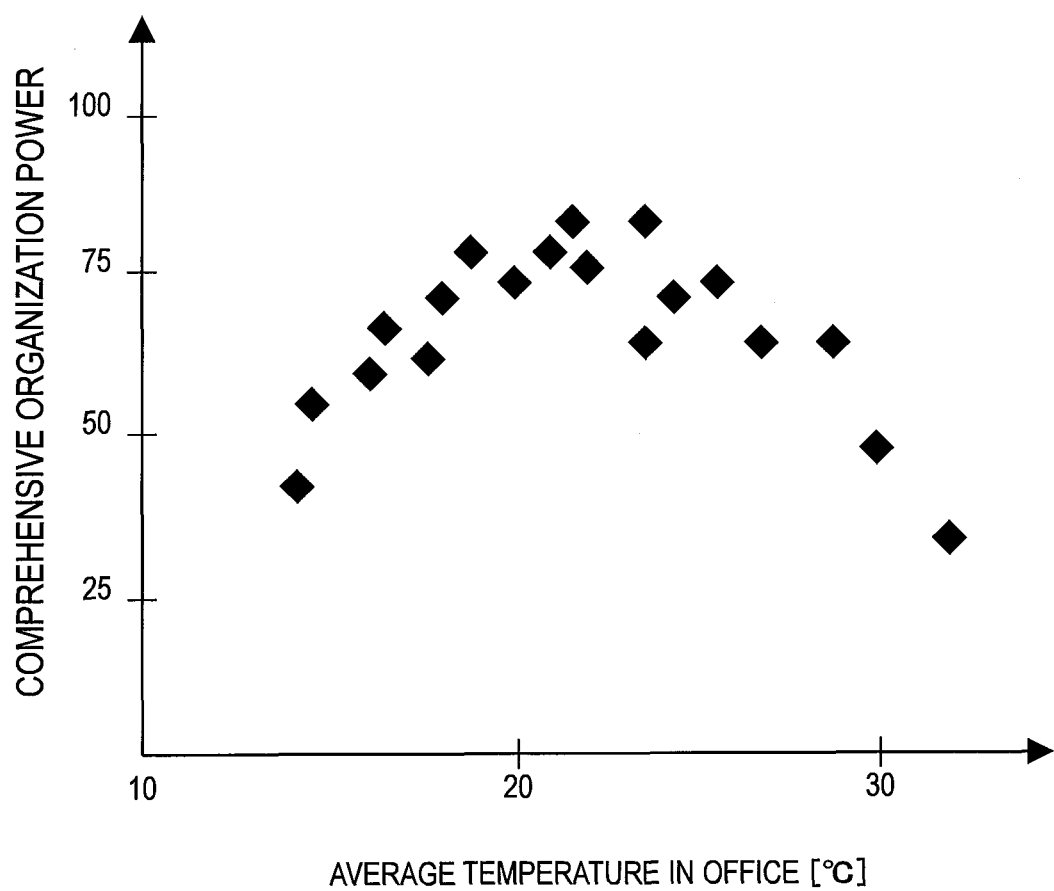
FIG. 25 illustrates an example of a display of the comprehensive organization power.

FIG. 25 illustrates an example of analysis using an organization index (comprehensive organization power in this example). By analyzing an organization index calculated according to this embodiment in addition to values relating to environments and achievements of an organization and different from the organization index, methods of increasing the organization index may be found. In the example illustrated in FIG. 25, an average temperature in an office, which is a value relating to an environment of the organization and the comprehensive organization power are assigned to the two axes, and are plotted in a scattered diagram. As a result, a room temperature suited to increase the comprehensive organization power, namely, both the flow levels and the cohesions of members may be known.

In this way, by using the correlation analysis and the multivariate analysis applied to various variables relating to an organization and an organization index based on behavior sensing data, it is possible to find a method of increasing the organization index, and to find an organization index useful for increasing productivity.

Second Embodiment

A description is given of a second embodiment of this invention referring to the drawings.

In order to calculate a sufficiently reliable organization index, original sensing data need to be stored without missing data in the sensor network server (SS). In general, as a cause of missing data acquired by a terminal (TR) of a sensor network, there is a problem with the wireless communication. A possible distance of wireless communication is finite, and when the distance between a terminal (TR) and a base station (GW) is more than a predetermined distance, the communication is not available. Further, under an environment high in noise, or due to an obstacle on communication path, the communicable distance decreases. This embodiment proposes a method of assigning, to a cradle (charger), functions of the base station (GW), and causing the cradle-type base station (GW) to transmit/receive data to/from a plurality of terminals (TRs) without a wireless communication. As a result, sensing data acquired by the terminal (TR) may be collected in the sensor network server (SS) without missing the data, to thereby calculate a highly reliable organization index.

Further, in order to calculate an organization index appropriately indicating characteristics of an organization having many members, it is necessary to prepare many terminals, and collect sensing data without missing the data therefrom. When data is collected wirelessly, it is necessary to sufficiently check, in advance, a location to install a base station so that the wireless communication covers locations where users mainly reside, but when the scale of the organization is large, this requires a very large amount of labor and time. Further, though there is a method of assigning, to one terminal (TR), one cradle-type base station (GW), and connecting the base station (GW) to the sensor network server (SS) in a wired or wireless manner, to thereby collect data, many terminals (TRs) are necessary in an organization having many members, and it is thus very difficult to install as many cradle-type base stations (GWs) as the terminals (TRs) and perform connection setting thereof.

According to this embodiment, by employing a cradle-type base station (GW) having a plurality of connectors, the one cradle-type base station (GW) collects data from a plurality of terminals (TRs), to thereby largely reduce labor and time required for the installation and connection setting. As a result, data from a large-scale organization may be collected, and an organization index may be obtained.

Figure 29A:
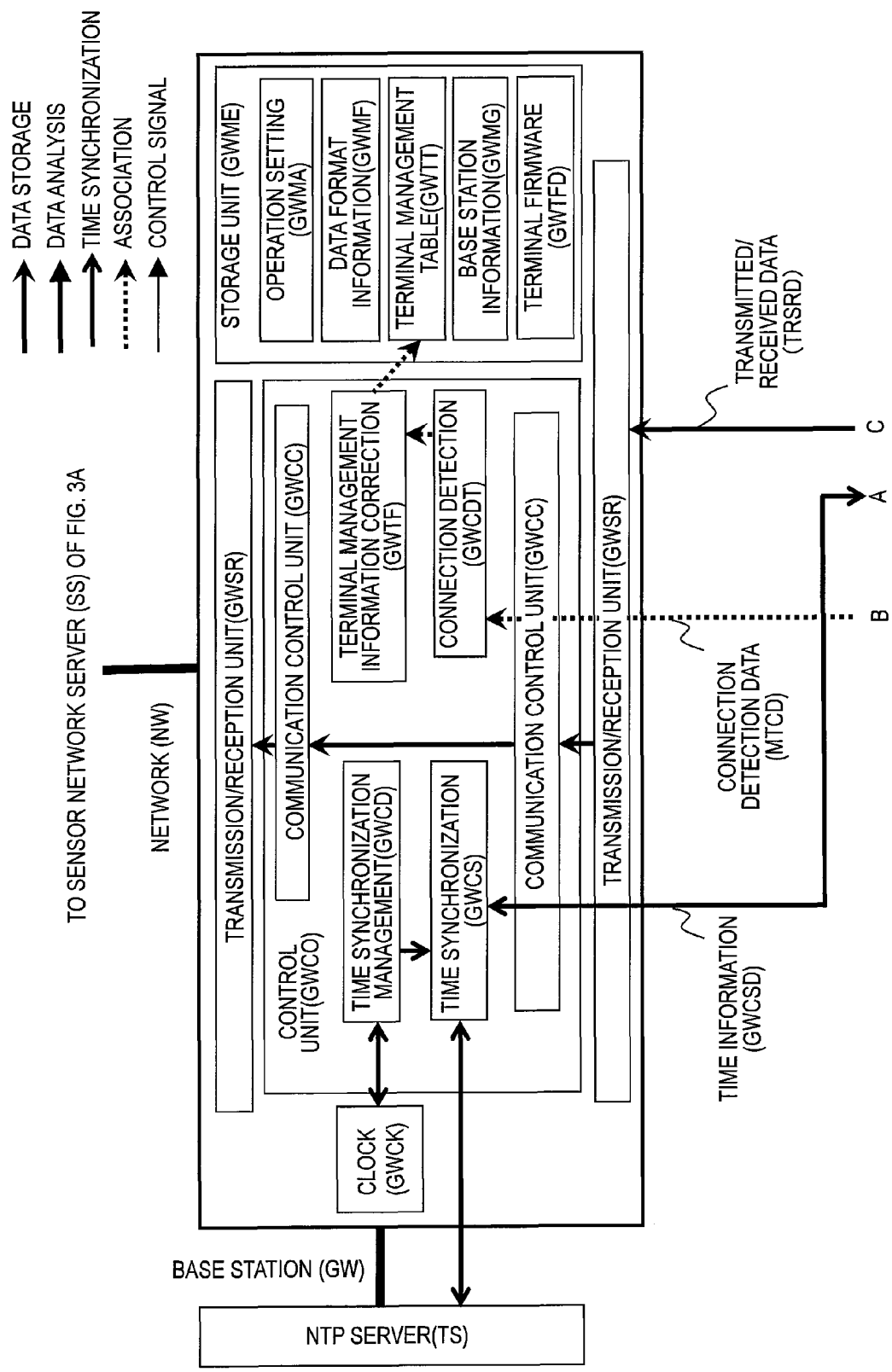
FIGS. 29A to 29C illustrate examples of configurations of a cradle-type base station and a terminal.
Figure 29B:
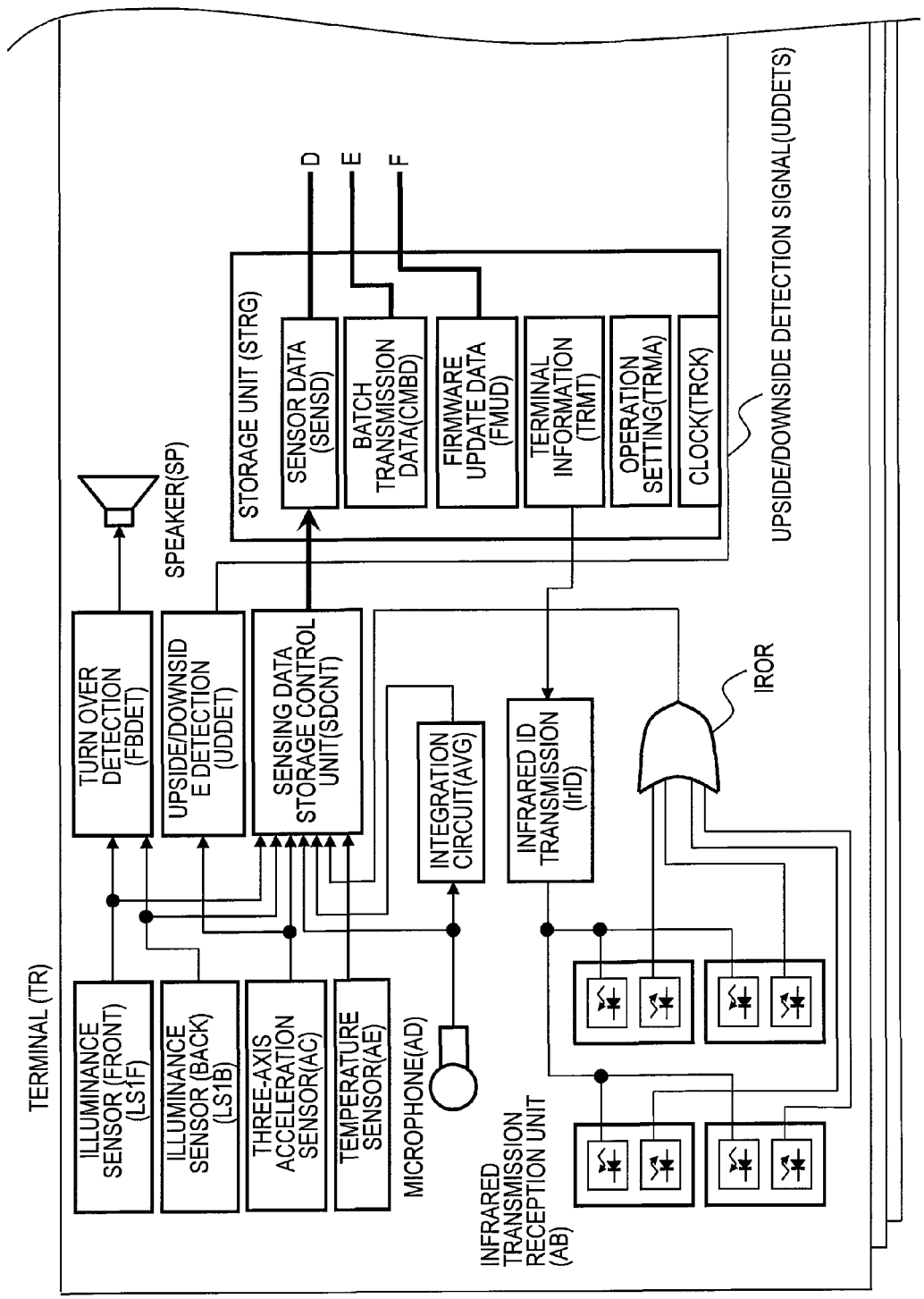
Figure 29C:
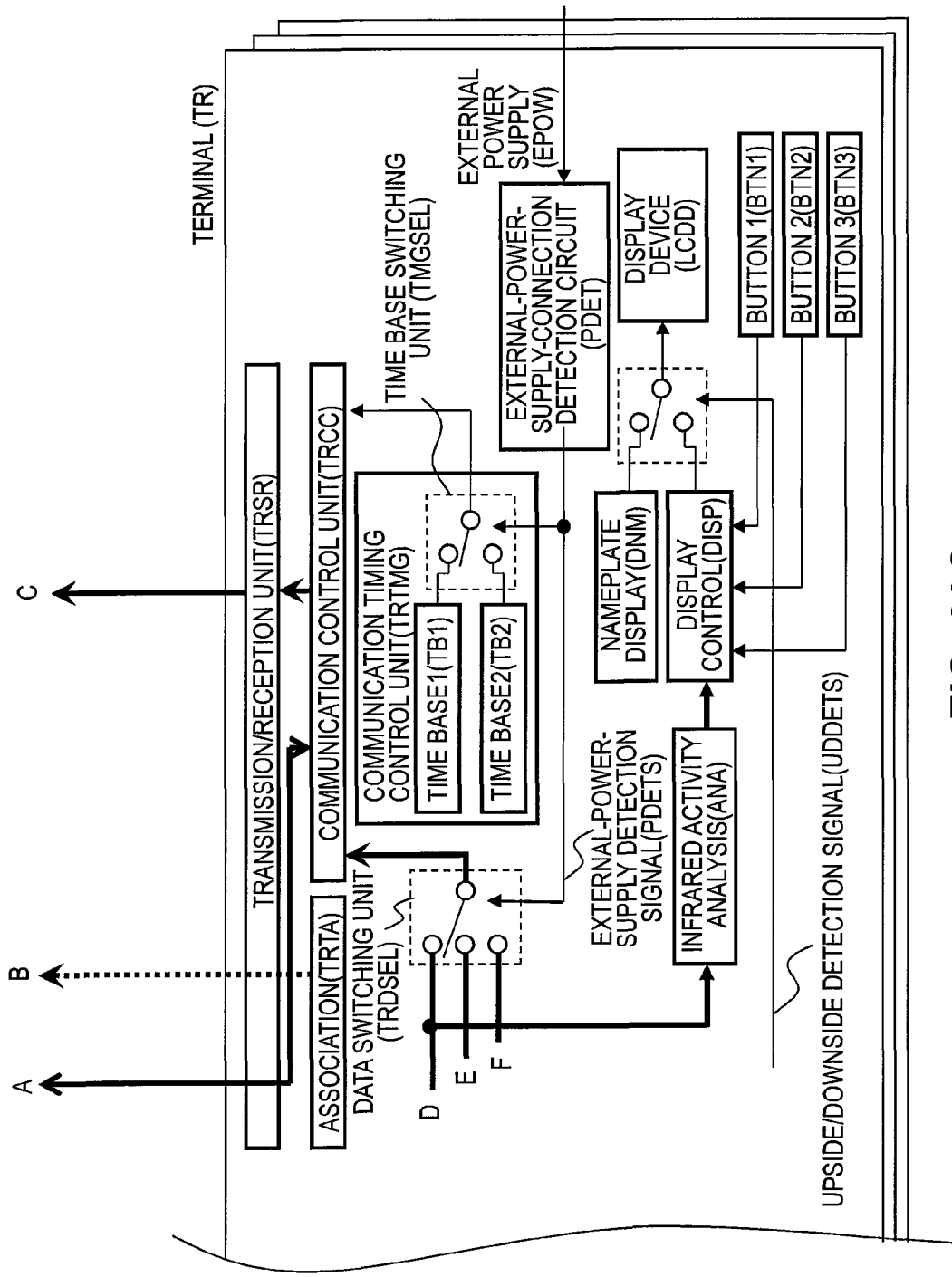

FIGS. 29A to 29C are block diagrams illustrating an overall configuration of a sensor network system for realizing the second embodiment of this invention, and illustrate configurations of the base station (GW) and the terminal (TR) in the sensor network system. This embodiment is different from the first embodiment only in a method of association between the terminal (TR) and the base station (GW), and the other system configurations remain the same as those illustrated in FIGS. 2 to 4B, to thereby collect the sensing data and calculating organization indices.

The cradle-type base station (GW) receives connection detection data (MTCD) (GWCDT) when the terminal (TR) is connected to the base station (GW) (TRCD). As a result, the base station (GW) corrects the terminal management information (GWTF), recognizes the terminal (TR) under management of the base station (GW), and is associated with the terminal (TR).

Figure 30:
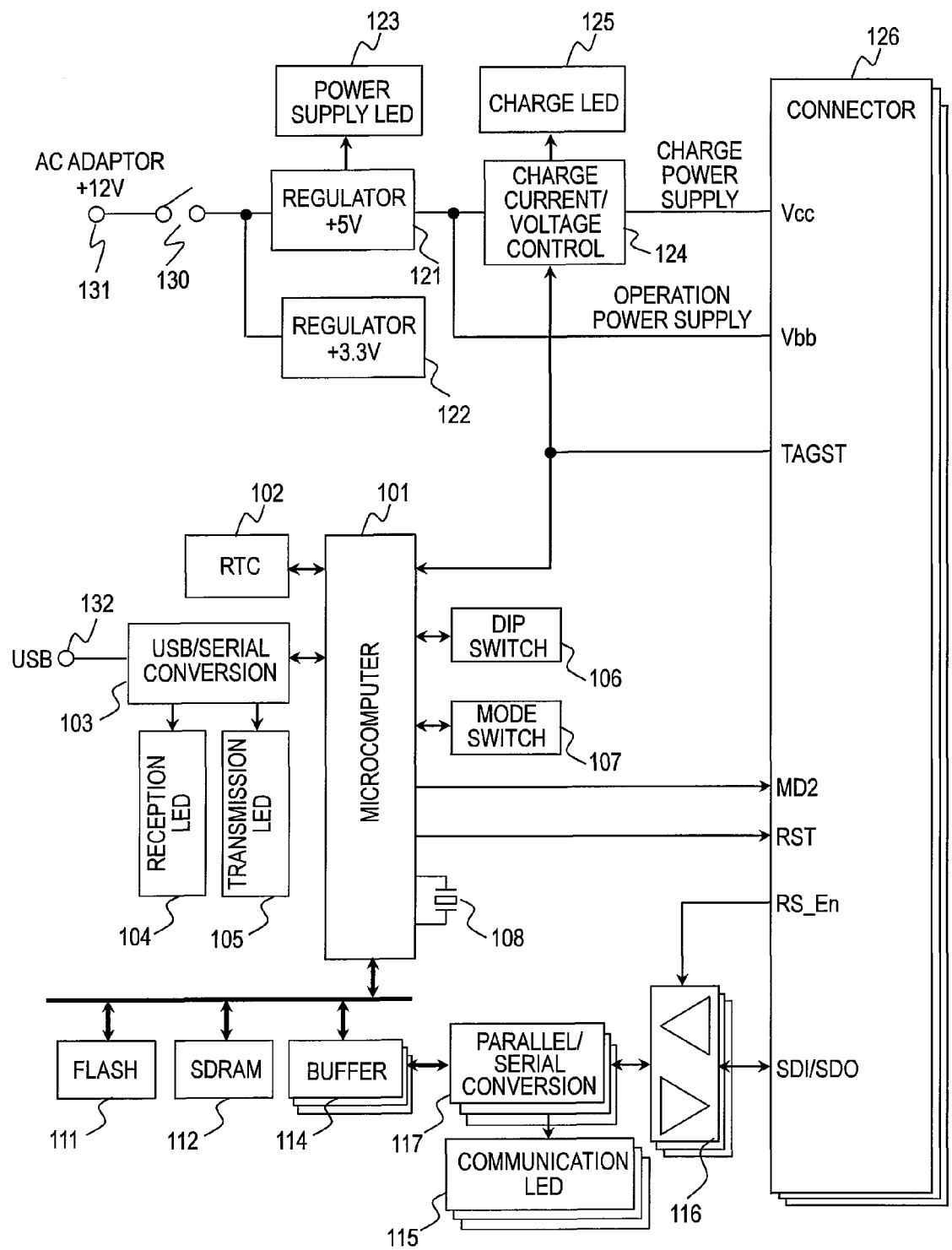
FIG. 30 illustrates a specific example of a hardware configuration of the cradle-type base station.

FIG. 30 illustrates a configuration of the cradle-type base station (GW) according to the second embodiment. For major external connections, an AC adaptor connection plug 131, a USB connector 132 for communication with the sensor network server (SS), and a plurality of connectors 126 to be connected to the terminals (TRs) are provided. As these connectors, commercially available connectors may be used.

The AC adaptor connection plug 131 receives a DC voltage of 12 V, and a regulator 121 supplies a charge voltage and an operation power when the terminal (TR) is connected. Further, a regulator 122 supplies an operation power to the cradle-type base station (GW).

The operation of the cradle-type base station (GW) is controlled by the control unit (GWCO), which is a microcomputer 101 corresponding to a CPU, and the cradle-type base station (GW) includes an RTC 102 corresponding to the above-mentioned clock (GWCK), which is a time measurement unit for the time synchronization. The communication with the sensor network server (SS) is carried out via the USB, and, between the USB connector 132 and the microcomputer 101, a USB/serial conversion unit 103 is provided.

A DIP switch 106 serving as an ID setting unit for setting an ID of the cradle-type base station (GW) is provided, and, when a plurality of cradle-type base stations (GWs) are connected to the sensor network server (SS), each of the cradle-type base stations (GWs) may be identified.

A mode switch 107 is used to switch the operation of the cradle-type base station (GW). For example, the mode switch 107 switches among a mode for writing setting information to the terminal (TR), a mode for collecting data from the terminal (TR), and the like.

The communication with the terminals (TRs) is carried out via buffers 114 which are a plurality of primary storage units for temporarily storing data, parallel/serial conversion units 117, and bidirectional tri-state buffers 116. The number of pins of the connector 126 is limited, and thus, a serial communication is carried out, via the parallel/serial conversion units 117, with the terminals (TRs).

The terminal (TR) includes a battery with a small capacity for the sake of reduction in weight. As a result, the terminal (TR) has to operate at low power consumption, and the operation clock frequency is low. When data is collected from a plurality of terminals (TRs) having the low operation clock frequency, there poses a problem that the collection may not be completed after a wearer inserts the terminal (TR) into the cradle-type base station (GW) when the person goes home until the person pulls off the terminal (TR) from the cradle-type base station (GW) next day in the office. Therefore, according to this embodiment, by temporarily accumulating the data from the terminals (TRs) in the buffers 114, the microcomputer 101 may collect the data at high speed from the plurality of buffers 114 in a predetermined order of the connection of the terminals (TRs). According to this embodiment, the data collection may be finished in a short period, which is approximately two or three hours.

When the terminal (TR) is connected, the cradle-type base station (GW) detects the connection based on a TAGST signal of the connector 126, a charge current/voltage control unit 124 for carrying out charge current/voltage control starts charging, and based on the time from the RTC 102, the microcomputer 101 starts the time synchronization with the terminal (TR) and the collection of the sensing data from the terminal (TR). When the terminal (TR) is connected to the cradle-type base station (GW), the terminal (TR) operates with the operation power supplied from the regulator 121. As described later, the connection to the terminal (TR) may be released during the data collection. When firmware of the terminal (TR) is rewritten, MD2 and RST signals of the connector 126 are controlled.

When a certain delay occurs during the communication between the terminal (TR) and the sensor network server (SS), an SDRAM 112 may accumulate data. Alternatively, a FLASH 111 may accumulate the data. The FLASH 111 provides an advantage that, when the power supply to the cradle-type base station (GW) is interrupted, contents in the memory are not cleared. As a result, for example, even when a problem such as an interruption of the power supply to the sensor network server (SS) occurs, the data of the terminal (TR) may be safely collected.

Figure 31:
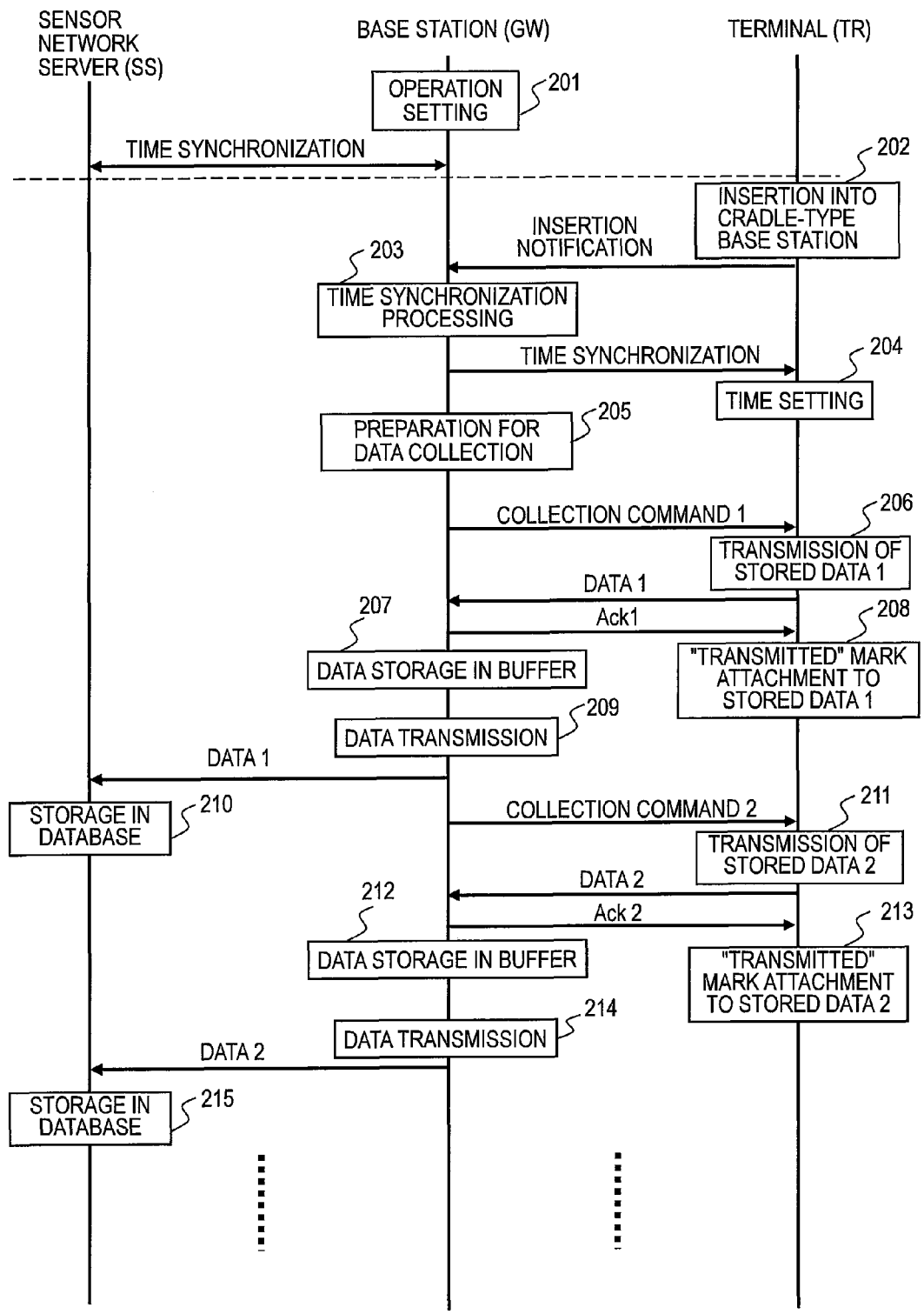
FIG. 31 illustrates an example of a processing sequence when the terminal is attached to the cradle-type base station.

FIG. 31 illustrates a processing sequence when the terminal (TR) is connected to the cradle-type base station (GW).

First, the time is synchronized between the cradle-type base station (GW) and the sensor network server (SS). As a result, even when a plurality of cradle-type base stations (GWs) are present, the time on the terminal (TR) does not present a lag.

When the terminal (TR) is connected to the cradle-type base station (GW) (202), an insertion notification is transmitted to the cradle-type base station (GW). The microcomputer 101 of the cradle-type base station (GW) carries out a time synchronization (203), and transmits a synchronized time to the terminal (TR). The terminal (TR) sets the time (204).

Then, the microcomputer 101 of the cradle-type base station (GW) carries out preparation for data collection (205), and transmits a collection command 1 to the terminal (TR). The terminal (TR) transmits a packet of stored data 1. When the cradle-type base station (GW) receives the data, the cradle-type base station (GW) returns Ack 1 to the terminal (TR), and stores the data in the buffer (207). When the terminal (TR) receives the Ack 1, the terminal (TR) attaches a "transmitted" mark to the stored data 1 stored in the storage unit (MTME) (208). The cradle-type base station (GW) transmits the data 1 to the sensor network server (SS) (209), and the sensor network server (SS) stores the transmitted data in the database (DSDB). The processing 206 to the processing 210 are repeated until the stored data in the terminal (TR) no longer exist.

The cradle-type base station (GW) returns Ack after receiving the data, and the terminal (TR) sets the data to the transmitted state after receiving the Ack. Thus, even when the terminal (TR) is detached from the cradle-type base station (GW) in the middle of processing, data which is not received by the cradle-type base station (GW) is not set to the transmitted state. Thus, in the next data collection, the transmission starts from transmission of data which has not been transmitted.

When the terminal (TR) is detached from the cradle-type base station (GW) in the middle of the processing, the same data may be transmitted twice depending on the timing, and hence the sensor network server (SS) may delete the redundant data.

The terminal (TR) may be detached from the cradle-type base station (GW) in the middle of the processing possibly when a wearer wants to go home and inserts the terminal (TR) into the cradle-type base station (GW) but remembers a task to do, and hence detaches the terminal (TR) from the cradle-type base station (GW) to start working again.

According to the configuration of this embodiment, even when the terminal (TR) is detached from the cradle-type base station (GW) in the middle of the data collection, no problem arises.

Figure 32:
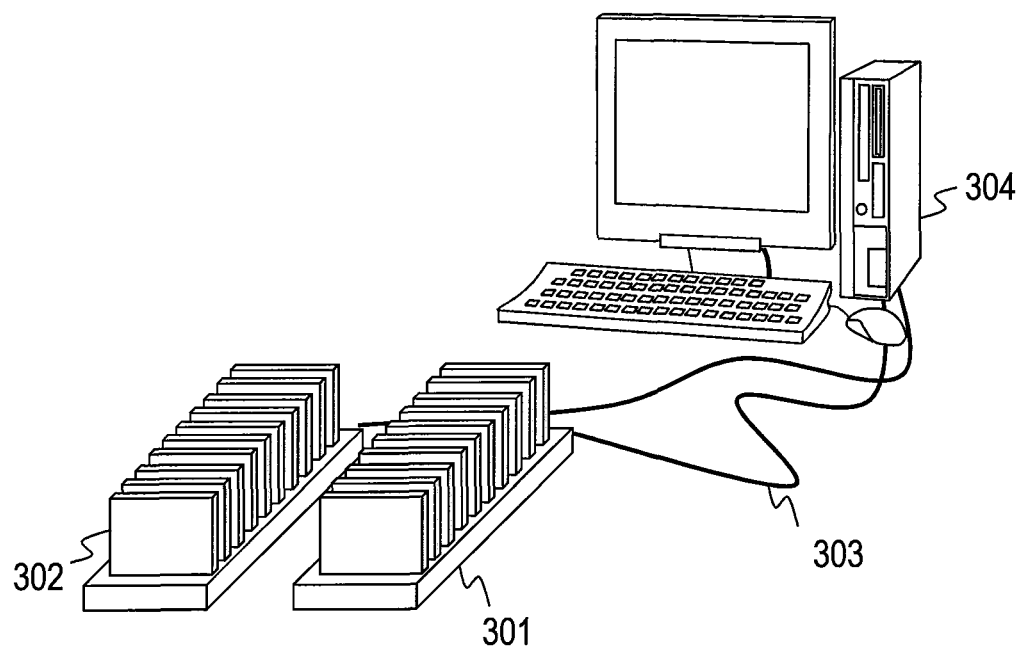
FIG. 32 illustrates an example of a form of usage in which a plurality of terminals are inserted into a plurality of cradle-type base stations for collecting data.

FIG. 32 illustrates a form of usage in which a plurality of terminals (TRs) are inserted into a plurality of cradle-type base stations (GWs) for collecting data. In this case, reference numeral 301 denotes the cradle-type base station (GW); 302, the terminal (TR); 303, a USB cable connected to the USB connector 132; and 304, the sensor network server (SS).

An ID of the cradle-type base station (GW) 301 may be set by the DIP switch 106 of the cradle-type base station (GW) 301. Based on the ID, the sensor network server (SS) 304 identifies the respective cradles for the communication. Though FIG. 32 illustrates an example in which two cradle-type base stations (GWs) are connected, by using a USB hub, several tens of cradle-type base stations (GWs) may be connected.

According to this embodiment, a plurality of terminals (TRs) may be connected to a cradle-type base station (GW), a plurality of cradle-type base stations (GWs) may be connected to the sensor network server (SS), and thus, even if the number of the terminals (TRs) increases, the centralized management may be provided.

Figure 33:
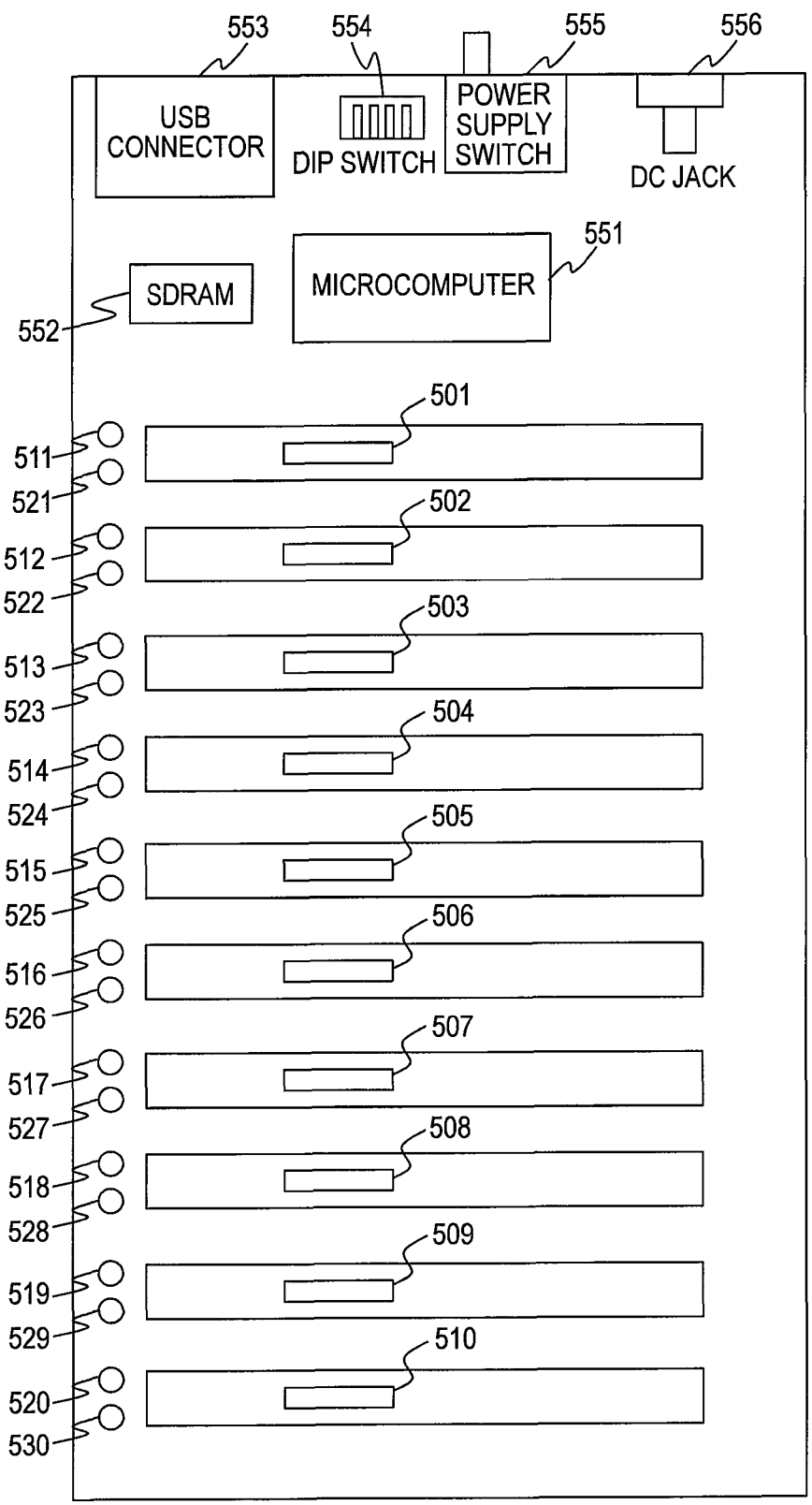
FIG. 33 illustrates an example of components mounted on a printed circuit board of the cradle-type base station.

FIG. 33 is a component mount diagram of a printed circuit board of the cradle-type base station (GW) according to this embodiment. Reference numerals 501 to 510 denote connectors for connection to the terminal (TR); 511 to 520, LEDs which are turned on when the terminal (TR) is being charged; 521 to 530, LEDs which flash when the communication with the terminal (TR) is being carried out; 551, the microcomputer for controlling the processing in the cradle-type base station (GW); 552, a memory for temporarily storing collected data; 553, the USB connector for connection to the sensor network server (SS); 554, the DIP switch for setting the ID of the cradle-type base station (GW); 555, a power supply switch; and 556, a DC jack. In this case, a configuration example in which ten terminals (TRs) may be connected is described. According to this embodiment, a plurality of terminals (TRs) may be connected while occupying a small area.

Figure 34:
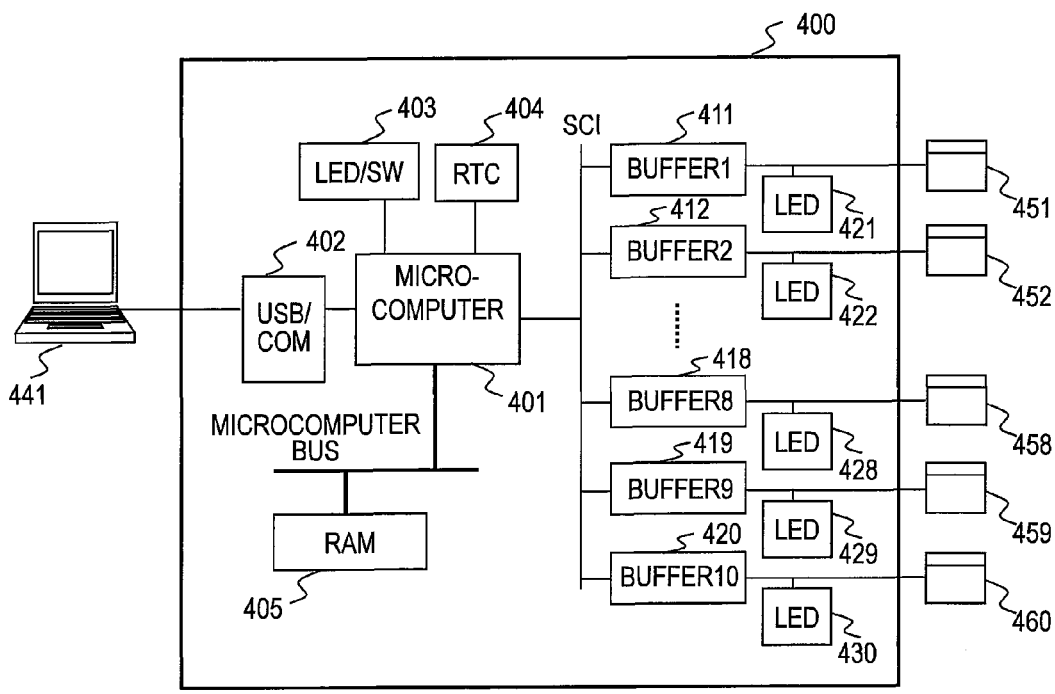
FIG. 34 illustrates an example of an efficient data collection by the cradle-type base station.

FIG. 34 illustrates that, from a plurality of terminals (TRs), data may be efficiently collected by the cradle-type base station (GW) of this embodiment. Reference numerals 451 to 460 denote the terminals (TRs); 400, the cradle-type base station (GW); and 441, the sensor network server (SS).

The cradle-type base station (GW) 400 includes buffers 411 to 420 for temporarily storing as many data as the number of the terminals (TRs) 451 to 460 to be connected. As a result, the data transfer between the terminals (TRs) 451 to 460 and the buffers 411 to 420 may be processed in parallel. A microcomputer 401 operates at higher speed compared with the terminal (TR), and hence the microcomputer 401 may process, in a predetermined order, the data collection at high speed from the buffers 411 to 420.

If the buffers 411 to 420 are not provided, for the communication between the microcomputer 401 and the terminals (TRs) 451 to 460, it is necessary to sequentially switch the terminals (TRs) 451 to 460 for the communication, and, due to the terminals (TRs) operating at low speed, the transfer to the sensor network server (SS) 441 may not be processed at high speed.

According to this embodiment, by providing the buffers 411 to 420 corresponding to the terminals (TRs) 451 to 460, the data collection may be carried out at high speed.

Figure 35:
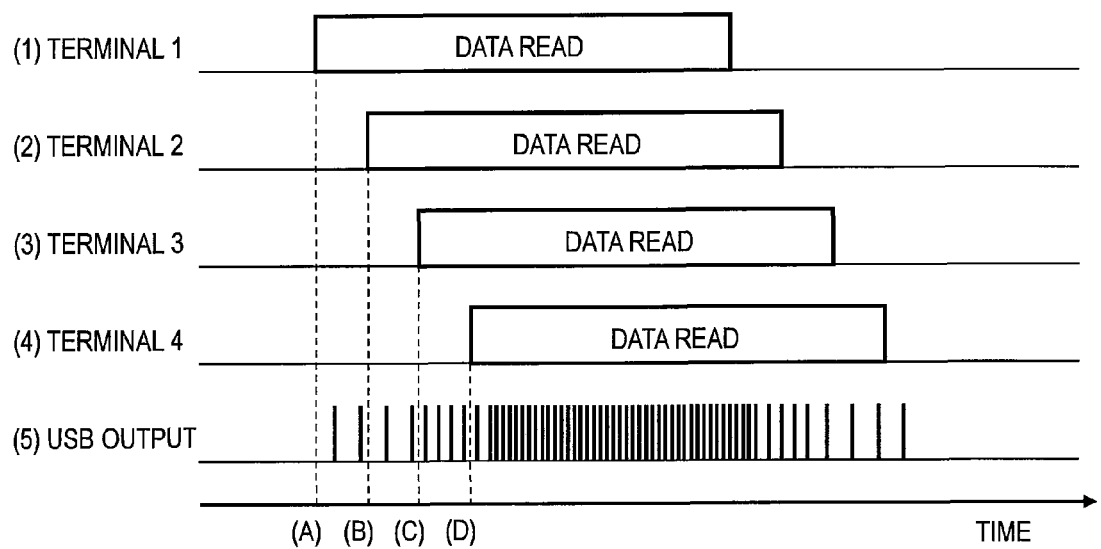
FIG. 35 illustrates an example of timings at which the cradle-type base station collects data from the plurality of terminals and transmits the data to the sensor network server.

FIG. 35 illustrates timings at which the cradle-type base station (GW) collects data from a plurality of terminals (TRs), and transmits the data to the sensor network server (SS). The microcomputer 401, a USB/COM 402, an LED/SW 403, an RTC 404, the buffers 411 to 420, and LEDs 421 to 430 respectively correspond to the microcomputer 101, the USB connector 132 and the USB/serial conversion unit 103, LEDs 104 and 105 and SWs 106 and 107, the RTC 102, the buffers 114, and communication LEDs 115 of FIG. 30. It should be noted that the buffers 411 to 420 also have the functions of the parallel/serial conversion units 117.

In this case, at a time (A), a terminal 1 is connected, at a time (B), a terminal 2 is connected, at a time (C), a terminal 3 is connected, and at a time (D), a terminal 4 is connected, which respectively write data to the corresponding buffers 411 to 420. The data collection from the terminal 1 starts from the time (A). When the terminal is connected, the data collection starts accordingly, and the data collections from the respective terminals proceed in parallel as illustrated in (1) to (4) of FIG. 35. The data of the respective mobile terminals 1 to 4 from the buffers 411 to 420 are sequentially transmitted in a time division manner from the USB/COM 402 to the sensor network server (SS). Though the communication between the terminal (TR) and the cradle-type base station (GW) is the low speed communication, the transmission to the sensor network server (SS) is at high speed. Hence, when the number of connected terminals (TRs) is small, the USB output interval is long, and when the number of the connected terminals (TRs) is large, the USB output interval is short. At such timings, the sensor network server (SS) may collect, at high speed, the transmitted data of the terminals (TRs) operating at low speed.

In this way, according to the second embodiment of this invention, using the sensing data collected without missing, more reliable organization indices may be calculated, and an organization may be properly evaluated. Further, by using the cradle-type base station (GW) having a plurality of connectors, a labor required for installing the cradle-type base stations (GWs) may be saved, data from a large-scale organization having many members may be acquired, and organization indices may be easily calculated.

The embodiments of this invention have been described above, but it is apparent to those skilled in the art that this invention is not limited to the above-mentioned embodiments, may be modified and embodied in various ways, and the above-mentioned embodiments may be properly combined.

This invention may be applied to a consulting industry for supporting increases in productivity through, for example, personnel management and project management.

What is claimed is:

1. An organization evaluation device for evaluating a first organization formed of a plurality of persons, comprising:
 a processor;
 a memory; and
 a plurality of terminals, each of which has a sensor and a wireless transmitter/receiver, and is worn by each of the plurality of persons;
 a transceiver that receives acceleration data detected by the sensor and meeting data indicating a meeting between persons detected by the wireless transmitter/receiver;
 wherein the memory stores the acceleration data and the meeting data;
 wherein the processor is configured to
  calculate a time spent for each meeting between any two persons from the meeting data stored in the memory;
  calculate, from at least one of an acceleration frequency calculated from the acceleration data and the meeting data stored in the memory and a business index of each of the plurality of persons, a flow level as a personal index of each of the plurality of persons;
  calculate a weight coefficient indicating a degree of involvement of each of the plurality of persons in the first organization; and
  calculate an organization index of the first organization, and
  indicate the organization index of the first organization,
  consider, in a meeting matrix, that only pairs of persons who have had meetings for a time equal to or longer than a predetermined threshold are linked to define a network structure of the first organization, and calculate the weight coefficient by calculating a network index based on a meeting matrix indicating a linkage between each of the plurality of persons and other persons in the first organization, and divide the network index by a sum of the network indices of the plurality of persons;
  calculate the organization index of the first organization by obtaining a weighted average of a plurality of the personal indices, which are stored in the memory, using the weight coefficient; and
  output the organization index of the first organization and an organization index of a second organization, which is calculated by the same method of calculating the organization index of the first organization, in numerical values or in a chart for comparison to a display device, which is part of the organization evaluation device, connected to the organization evaluation device.

2. The organization evaluation device according to claim 1, wherein:
 the wireless transmitter/receiver is an infrared transmitter/receiver.

3. The organization evaluation device according to claim 2, wherein the processor further calculates the weight coefficient by calculating a reach indicating a number of persons reached in a predetermined number of steps in a network structure of the first organization from the meeting data, and dividing the reach by a sum of the reaches of the plurality of persons.

4. The organization evaluation device according to claim 2, wherein:
 the processor further calculates the weight coefficient by calculating a reach indicating a number of persons reached in a predetermined number of steps in a network structure of the first organization from the meeting data, and dividing the reach by a sum of the reaches of the plurality of persons;
 the processor further calculates a cohesion indicating a degree of cooperation with a neighborhood of each of the plurality of persons in the network structure from the meeting data; and
 the processor further calculates the organization index by obtaining a weighted average of a plurality of the cohesions using the weight coefficient calculated from the reach.

5. The organization evaluation device according to claim 1, wherein:
 the processor further calculates a flow level indicating a degree of absorption of each of the plurality of persons from the acceleration data;
 the processor further calculates the weight coefficient by calculating a residence time of a user of the terminal from the acceleration data, and dividing the residence time by a sum of a plurality of the residence times; and
 the processor further calculates the organization index by obtaining a weighted average of a plurality of the flow levels using the weight coefficient calculated from the residence time.

6. The organization evaluation device according to claim 1, wherein:
 the organization evaluation device is connected, via a network, to an organization index management server storing the organization indices of a plurality of organizations;
 the transceiver receives the organization index of the second organization different from the first organization from the organization index management server; and
 the processor plots a symbol indicating the first organization on a coordinate plane having the organization indices and the order in the organization indices of the first organization and the second organization as two axes, and outputs the plot to the display device connected to the organization evaluation device.

7. The organization evaluation device according to claim 1, wherein:
 a plurality of types of weight indices used for the weight coefficient and a plurality of types of the personal indices are displayed on a display device, which is part of the organization evaluation device, connected to the organization evaluation device;
 the processor calculates, based on one weight index selected, via an input unit, from the plurality of types of the weight indices displayed on the display device; and the processor calculates one personal index selected via the input unit from the plurality of types of the personal indices displayed on the display device.

8. An organization evaluation device for evaluating an organization formed of a plurality of persons, comprising:
   a processor;
   a memory;
   a plurality of terminal, each of which has a sensor and a wireless transmitter/receiver, and is worn by each of the plurality of persons; and
   a transceiver that receives acceleration data detected by an acceleration sensor of a terminal worn by each of the plurality of persons, and meeting data detected by an infrared sensor of the terminal;
   wherein the memory stores the meeting data, the acceleration data and the infrared data;
   wherein the processor is configured to
      calculate a time spent for each meeting between any two persons from the meeting data stored in the memory;
      calculate a cohesion indicating a degree of cooperation with a neighborhood of each of the plurality of persons in a network structure of the organization from the meeting data, and calculating a flow level indicating a degree of absorption of each of the plurality of persons from the acceleration data;
      calculate a weight coefficient by calculating a reach indicating a number of persons reached in a predetermined number of steps in the network structure from the meeting data, and dividing the reach by a sum of the reaches of the plurality of persons;
      calculate a cohesion of the organization by obtaining a weighted average of a plurality of the cohesions, which are stored in the memory, using the weight coefficient, and calculate a flow level of the organization based on a plurality of the flow levels, which are stored in the memory;
      plot a symbol indicating the organization on a coordinate plane having the cohesion of the organization and the flow level of the organization as two axes, and outputting the plot to a display device, which is part of the organization evaluation device, connected to the organization evaluation device;
      consider, in a meeting matrix, that only pairs of persons who have had meetings for a time equal to or longer than a predetermined threshold are linked to define a network structure of the organization; and
      calculate a network index indicating a linkage between each of the plurality of persons and other persons in the organization, and divide the network index by a sum of the network indices of the plurality of persons.

9. An organization evaluation system for evaluating a first organization formed of a plurality of persons, the organization evaluation system comprising:
   terminals worn by the plurality of persons; and
   a processing device, wherein:
   each of the terminals includes a sensor for detecting acceleration data, a wireless transmitter/receiver for detecting a meeting between persons, and a transmission unit for transmitting the acceleration data and meeting data indicating the meeting between persons to the processing device;
   the processing device comprising:
      a reception unit for receiving the acceleration data and the meeting data from the terminals;
      a sensing data storage unit for storing the acceleration data and the meeting data;
      a meeting matrix calculation module for calculating a time spent for each meeting between any two of the plurality of persons from the meeting data stored in the sensing data storage unit;
      a personal index calculation module for calculating, from at least one of the acceleration data and the meeting data stored in the sensing data storage unit and a business index of each of the plurality of persons, a flow level as a personal index of each of the plurality of persons;
      a weight coefficient calculation module for calculating a weight coefficient indicating a degree of involvement of each of the plurality of persons in the first organization; and
      an organization index calculation module for calculating an organization index of the first organization,
      an organization index rendering module for indicating the organization index of the first organization;
   the weight coefficient calculation module considers, in the meeting matrix, that only pairs of persons who have had meetings for a time equal to or longer than a predetermined threshold are linked to define a network structure of the first organization, and calculates the weight coefficient by calculating a network index indicating a linkage between each of the plurality of persons and other persons in the first organization, and dividing the network index by a sum of the network indices of the plurality of persons;
   the organization index calculation module calculates the organization index of the first organization by obtaining a weighted average of a plurality of the personal indices stored in a personal index storage unit using the weighted coefficient; and
   the organization index rendering module outputs the organization index of the first organization and an organization index of a second organization, which is calculated in a same manner as the organization index of the first organization, in numerical values or in a chart for comparison to a display device connected to the processing device.

10. The organization evaluation system according to claim 9, wherein:
    the wireless transmitter/receiver is an infrared transmitter/receiver.

11. The organization evaluation system according to claim 10, wherein:
    the weight coefficient calculation module further calculates the weight coefficient by calculating a reach indicating a number of persons reached in a predetermined number of steps in the network structure of the first organization from the meeting data, and dividing the reach by a sum of the reaches of the plurality of persons.

12. The organization evaluation system according to claim 10, wherein:
    the weight coefficient calculation module further calculates the weight coefficient by calculating a reach indicating a number of persons reached in a predetermined number of steps in the network structure of the first organization from the meeting data, and dividing the reach by a sum of the reaches of the plurality of persons;
    the personal index calculation module further calculates a cohesion indicating a degree of cooperation with a neighborhood of each of the plurality of persons in the network structure from the meeting data; and
    the organization index calculation module further calculates the organization index by obtaining a weighted average of a plurality of the cohesions using the weight coefficient calculated from the reach.

13. The organization evaluation system according to claim 9, further comprising a collection device for collecting the data indicating the meeting data transmitted by the terminal, wherein:
the collection device comprises:
a plurality of connectors respectively connected to a plurality of the terminals for receiving the data indicating the meeting data;
a processing unit; and
a plurality of buffers provided respectively between the plurality of connectors and the processing unit for temporality storing the data indicating the meeting data; and
the processing unit reads in a predetermined order the data indicating the meeting data that have been accumulated from the plurality of buffers respectively corresponding to the plurality of terminals.

* * * * *